(12) United States Patent
Lee et al.

(10) Patent No.: US 11,470,882 B2
(45) Date of Patent: Oct. 18, 2022

(54) DEVICE FOR HOLDING SMOKING MEMBER, AND SMOKING MEMBER SYSTEM

(71) Applicant: KT&G CORPORATION, Daejeon (KR)

(72) Inventors: Jong Sub Lee, Seongnam-si (KR); Dae Nam Han, Daejeon (KR); Jang Uk Lee, Seoul (KR); Jung Ho Han, Daejeon (KR); Hun Il Lim, Seoul (KR); Jin Young Yoon, Seoul (KR); Young Lea Kim, Seoul (KR); Ji Soo Jang, Seoul (KR); Wang Seop Lim, Anyang-si (KR); Moon Bong Lee, Seoul (KR); Soung Ho Ju, Daejeon (KR); Du Jin Park, Seoul (KR); Seong Won Yoon, Yongin-si (KR)

(73) Assignee: KT&G CORPORATION, Daejeon (KR)

( * ) Notice: Subject to any disclaimer, the term of this patent is extended or adjusted under 35 U.S.C. 154(b) by 415 days.

(21) Appl. No.: 16/604,443

(22) PCT Filed: Apr. 10, 2018

(86) PCT No.: PCT/KR2018/004171
§ 371 (c)(1),
(2) Date: Oct. 10, 2019

(87) PCT Pub. No.: WO2018/190600
PCT Pub. Date: Oct. 18, 2018

(65) Prior Publication Data
US 2020/0154776 A1    May 21, 2020

(30) Foreign Application Priority Data

Apr. 11, 2017  (KR) .................. 10-2017-0046938
Jun. 19, 2017  (KR) .................. 10-2017-0077586
Jul. 3, 2017   (KR) .................. 10-2017-0084388

(51) Int. Cl.
*A24F 13/00*    (2006.01)
*A24F 40/46*    (2020.01)
(Continued)

(52) U.S. Cl.
CPC .............. *A24F 40/46* (2020.01); *A24F 40/20* (2020.01); *A24F 40/40* (2020.01); *A24F 40/48* (2020.01);
(Continued)

(58) Field of Classification Search
CPC ..................................................... A24F 47/00
(Continued)

(56) References Cited

U.S. PATENT DOCUMENTS 2,638,904 A   5/1953  Mitchell
4,637,407 A   1/1987  Bonanno et al.
(Continued)

FOREIGN PATENT DOCUMENTS

CA   2 973 143 A1    8/2016
CH     310239 A     12/1955
(Continued)

OTHER PUBLICATIONS

Communication dated Aug. 16, 2021 by the Chinese Patent Office in Chinese Application No. 201880024006.9.
(Continued)

*Primary Examiner* — Phuong K Dinh
(74) *Attorney, Agent, or Firm* — Sughrue Mion, PLLC

(57) ABSTRACT

Provided is a smoking member supporting device which is placed in an arrangement region with or without a smoking member mounted thereon, the smoking member supporting device including a base unit including an arrangement surface corresponding to the arrangement region; an accom-
(Continued)

modating unit formed adjacent to the base unit and configured to accommodate at least one region of the smoking member; a hook unit formed at an edge of the accommodating unit to define the accommodating unit and to maintain a state that the smoking member is accommodated in the accommodating unit and mounted; and a connecting unit formed to face the smoking member when the smoking member is accommodated in the accommodating unit and to supply electrical energy to the smoking member.

13 Claims, 30 Drawing Sheets

(51) Int. Cl.
| | |
|---|---|
| A24F 40/90 | (2020.01) |
| A24F 40/40 | (2020.01) |
| A24F 40/85 | (2020.01) |
| A46B 15/00 | (2006.01) |
| H05B 3/03 | (2006.01) |
| H05B 3/06 | (2006.01) |
| H02J 7/00 | (2006.01) |
| A24F 40/48 | (2020.01) |
| A24F 40/20 | (2020.01) |
| A24F 40/57 | (2020.01) |
| A24F 40/51 | (2020.01) |
| A24F 40/60 | (2020.01) |
| A24D 1/20 | (2020.01) |

(52) U.S. Cl.
CPC .............. *A24F 40/51* (2020.01); *A24F 40/57* (2020.01); *A24F 40/60* (2020.01); *A24F 40/85* (2020.01); *A24F 40/90* (2020.01); *A46B 15/0055* (2013.01); *A46B 15/0097* (2013.01); *H02J 7/0044* (2013.01); *H05B 3/03* (2013.01); *H05B 3/06* (2013.01); *A24D 1/20* (2020.01); *A46B 2200/3013* (2013.01)

(58) Field of Classification Search
USPC .................................................. 131/328–329
See application file for complete search history.

(56) References Cited

U.S. PATENT DOCUMENTS

| | | |
|---|---|---|
| 5,144,962 A | 9/1992 | Counts et al. |
| 5,240,012 A | 8/1993 | Ehrman et al. |
| 5,249,586 A | 10/1993 | Morgan et al. |
| 5,388,594 A | 2/1995 | Counts et al. |
| 5,499,636 A | 3/1996 | Baggett, Jr. et al. |
| 5,591,368 A | 1/1997 | Fleischhauer et al. |
| 5,666,977 A | 9/1997 | Higgins et al. |
| 5,878,752 A | 3/1999 | Adams et al. |
| 6,053,176 A | 4/2000 | Adams et al. |
| 6,418,938 B1 | 7/2002 | Fleischhauer et al. |
| 6,532,965 B1 | 3/2003 | Abhulimen et al. |
| 6,615,840 B1 | 9/2003 | Fournier et al. |
| 6,810,883 B2 | 11/2004 | Felter et al. |
| 7,861,726 B1 | 1/2011 | Lukasavitz |
| 8,375,959 B2 | 2/2013 | Dittrich et al. |
| 8,419,085 B2 | 4/2013 | Kim et al. |
| 8,752,545 B2 | 6/2014 | Buchberger |
| 8,973,587 B2 | 3/2015 | Liu |
| 9,078,472 B2 | 7/2015 | Liu |
| 9,271,528 B2 | 3/2016 | Liu |
| 9,320,299 B2 | 4/2016 | Hearn et al. |
| 9,427,023 B2 | 8/2016 | Liu |
| 9,497,991 B2 | 11/2016 | Besso et al. |
| 9,499,332 B2 | 11/2016 | Fernando et al. |
| 9,516,899 B2 | 12/2016 | Plojoux et al. |
| 9,560,883 B2 | 2/2017 | Hawes |
| 9,603,388 B2 | 3/2017 | Fernando et al. |
| 9,655,383 B2 | 5/2017 | Holzherr et al. |
| 9,693,587 B2 | 7/2017 | Plojoux et al. |
| 9,723,871 B2 | 8/2017 | Xiang |
| 9,795,166 B2 | 10/2017 | Liu |
| 9,814,263 B2 | 11/2017 | Cochand et al. |
| 9,854,841 B2 | 1/2018 | Ampolini et al. |
| 9,854,845 B2 | 1/2018 | Plojoux et al. |
| 9,894,934 B2 | 2/2018 | Li et al. |
| 9,918,494 B2 | 3/2018 | Mironov et al. |
| 9,955,724 B2 | 5/2018 | Lord |
| 9,986,760 B2 | 6/2018 | Macko et al. |
| 9,999,247 B2 | 6/2018 | Ruscio et al. |
| 10,010,114 B2 * | 7/2018 | Jordan ..................... H02J 7/00 |
| 10,015,990 B2 | 7/2018 | Mironov |
| 10,031,183 B2 | 7/2018 | Novak, III et al. |
| 10,070,667 B2 | 9/2018 | Lord et al. |
| 10,104,911 B2 | 10/2018 | Thorens et al. |
| 10,130,780 B2 | 11/2018 | Talon |
| 10,136,673 B2 | 11/2018 | Mironov |
| 10,159,283 B2 | 12/2018 | Mironov |
| 10,194,697 B2 | 2/2019 | Fernando et al. |
| 10,299,513 B2 | 5/2019 | Perez et al. |
| 10,368,584 B2 | 8/2019 | Fernando et al. |
| 10,439,419 B2 | 10/2019 | Bernauer et al. |
| 10,440,987 B2 | 10/2019 | Zeng et al. |
| 10,448,670 B2 | 10/2019 | Talon et al. |
| 10,492,542 B1 | 12/2019 | Worm et al. |
| 10,548,350 B2 | 2/2020 | Greim et al. |
| 10,555,553 B2 | 2/2020 | Binassi et al. |
| 10,588,351 B2 | 3/2020 | Ricketts |
| 10,645,971 B2 | 5/2020 | Zitzke |
| 10,668,058 B2 | 6/2020 | Rose et al. |
| 10,716,329 B2 | 7/2020 | Matsumoto et al. |
| 10,813,174 B2 | 10/2020 | Schneider et al. |
| 10,881,143 B2 | 1/2021 | Suzuki et al. |
| 2004/0261802 A1 | 12/2004 | Griffin et al. |
| 2005/0172976 A1 | 8/2005 | Newman et al. |
| 2006/0030214 A1 | 2/2006 | Katou et al. |
| 2008/0001052 A1 | 1/2008 | Kalous et al. |
| 2010/0001538 A1 | 1/2010 | Kim et al. |
| 2010/0307518 A1 | 12/2010 | Wang |
| 2011/0155151 A1 | 6/2011 | Newman et al. |
| 2011/0209717 A1 | 9/2011 | Han |
| 2011/0290248 A1 | 12/2011 | Schennum |
| 2011/0290269 A1 | 12/2011 | Shimizu |
| 2012/0247494 A1 | 10/2012 | Oglesby et al. |
| 2013/0014772 A1 | 1/2013 | Liu |
| 2013/0213419 A1 | 8/2013 | Tucker et al. |
| 2013/0284192 A1 | 10/2013 | Peleg et al. |
| 2013/0319439 A1 | 12/2013 | Gorelick et al. |
| 2013/0340775 A1 | 12/2013 | Juster et al. |
| 2014/0020698 A1 | 1/2014 | Fiebelkorn |
| 2014/0096782 A1 | 4/2014 | Ampolini et al. |
| 2014/0116455 A1 | 5/2014 | Youn |
| 2014/0246035 A1 | 9/2014 | Minskoff et al. |
| 2014/0299137 A1 | 10/2014 | Kieckbusch et al. |
| 2014/0305448 A1 | 10/2014 | Zuber et al. |
| 2014/0318559 A1 | 10/2014 | Thorens et al. |
| 2014/0345633 A1 | 11/2014 | Talon et al. |
| 2014/0345634 A1 | 11/2014 | Zuber et al. |
| 2014/0363145 A1 | 12/2014 | Plojoux et al. |
| 2015/0007838 A1 | 1/2015 | Fernando et al. |
| 2015/0013696 A1 | 1/2015 | Plojoux et al. |
| 2015/0020832 A1 | 1/2015 | Greim et al. |
| 2015/0024355 A1 | 1/2015 | Ghofrani et al. |
| 2015/0027474 A1 | 1/2015 | Zuber et al. |
| 2015/0100441 A1 | 4/2015 | Alarcon et al. |
| 2015/0136124 A1 | 5/2015 | Aronie et al. |
| 2015/0136154 A1 | 5/2015 | Mitrev et al. |
| 2015/0201676 A1 | 7/2015 | Shin |
| 2015/0208725 A1 | 7/2015 | Tsai |
| 2015/0245654 A1 | 9/2015 | Memari et al. |
| 2015/0257445 A1 | 9/2015 | Henry, Jr. et al. |
| 2015/0272211 A1 | 10/2015 | Chung |
| 2016/0150824 A1 | 6/2016 | Memari et al. |
| 2016/0205998 A1 | 7/2016 | Matsumoto et al. |
| 2016/0270437 A1 | 9/2016 | Nappi |
| 2016/0286861 A1 | 10/2016 | Liu |

(56) References Cited

U.S. PATENT DOCUMENTS

| | | |
|---|---|---|
| 2016/0302488 A1 | 10/2016 | Fernando et al. |
| 2016/0031032 A1 | 11/2016 | Malgat et al. |
| 2016/0331032 A1 | 11/2016 | Malgat et al. |
| 2016/0345629 A1 | 12/2016 | Mironov |
| 2016/0366946 A1 | 12/2016 | Murison et al. |
| 2016/0374402 A1 | 12/2016 | Fernando et al. |
| 2017/0006916 A1 | 1/2017 | Liu |
| 2017/0006919 A1 | 1/2017 | Liu |
| 2017/0027229 A1 | 2/2017 | Cameron |
| 2017/0027234 A1 | 2/2017 | Farine et al. |
| 2017/0042243 A1 | 2/2017 | Plojoux et al. |
| 2017/0042251 A1 | 2/2017 | Yamada et al. |
| 2017/0055580 A1 | 3/2017 | Blandino et al. |
| 2017/0065002 A1 | 3/2017 | Fernando et al. |
| 2017/0071251 A1 | 3/2017 | Goch |
| 2017/0095006 A1 | 4/2017 | Egoyants et al. |
| 2017/0150757 A1 | 6/2017 | Worm et al. |
| 2017/0164659 A1 | 6/2017 | Schneider et al. |
| 2017/0172214 A1 | 6/2017 | Li et al. |
| 2017/0172215 A1 | 6/2017 | Li et al. |
| 2017/0238596 A1 | 8/2017 | Matsumoto et al. |
| 2017/0295844 A1 | 10/2017 | Thevenaz et al. |
| 2018/0177234 A1 | 6/2018 | Lee |
| 2018/0206556 A1 | 7/2018 | Thorens et al. |
| 2018/0235283 A1 | 8/2018 | Zuber et al. |
| 2019/0014826 A1 | 1/2019 | Thorens et al. |
| 2019/0075849 A1 | 3/2019 | Hawes |
| 2019/0289908 A1* | 9/2019 | Worm ............... A24F 40/46 |
| 2019/0320719 A1 | 10/2019 | Liu et al. |
| 2019/0364975 A1 | 12/2019 | Fernando et al. |
| 2020/0006950 A1 | 1/2020 | Holzherr |
| 2020/0120983 A1 | 4/2020 | Chen |
| 2020/0232766 A1 | 7/2020 | Flick |
| 2020/0305508 A1 | 10/2020 | Talon |
| 2020/0352224 A1 | 11/2020 | Plojoux et al. |
| 2020/0413495 A1 | 12/2020 | Schneider et al. |
| 2021/0000182 A1 | 1/2021 | Ruscio et al. |

FOREIGN PATENT DOCUMENTS

| | | |
|---|---|---|
| CN | 1102964 A | 5/1995 |
| CN | 1122213 A | 5/1996 |
| CN | 1190335 A | 8/1998 |
| CN | 1209731 A | 3/1999 |
| CN | 1973706 A | 6/2007 |
| CN | 101043827 A | 9/2007 |
| CN | 101444335 A | 6/2009 |
| CN | 102109393 A | 6/2011 |
| CN | 102438470 A | 5/2012 |
| CN | 202407082 U | 9/2012 |
| CN | 202774134 U | 3/2013 |
| CN | 103096741 A | 5/2013 |
| CN | 103281920 A | 9/2013 |
| CN | 103338665 A | 10/2013 |
| CN | 103622162 A | 3/2014 |
| CN | 203457802 U | 3/2014 |
| CN | 103859606 A | 6/2014 |
| CN | 203633505 U | 6/2014 |
| CN | 203646503 U | 6/2014 |
| CN | 103929988 A | 7/2014 |
| CN | 203689071 U | 7/2014 |
| CN | 103997921 A | 8/2014 |
| CN | 103997922 A | 8/2014 |
| CN | 203789137 U | 8/2014 |
| CN | 104023574 A | 9/2014 |
| CN | 104039183 A | 9/2014 |
| CN | 104095295 A | 10/2014 |
| CN | 104106842 A | 10/2014 |
| CN | 203943078 U | 11/2014 |
| CN | 204070570 U | 1/2015 |
| CN | 204146338 U | 2/2015 |
| CN | 104382237 A | 3/2015 |
| CN | 104470387 A | 3/2015 |
| CN | 104489933 A | 4/2015 |
| CN | 104544559 A | 4/2015 |
| CN | 204317494 U | 5/2015 |
| CN | 204317504 U | 5/2015 |
| CN | 104754964 A | 7/2015 |
| CN | 104770878 A | 7/2015 |
| CN | 104799438 A | 7/2015 |
| CN | 104812260 A | 7/2015 |
| CN | 204444239 U | 7/2015 |
| CN | 204763414 U | 11/2015 |
| CN | 105163610 A | 12/2015 |
| CN | 105208882 A | 12/2015 |
| CN | 105208884 A | 12/2015 |
| CN | 105341993 A | 2/2016 |
| CN | 105357994 A | 2/2016 |
| CN | 205018293 U | 2/2016 |
| CN | 105361250 A | 3/2016 |
| CN | 105453598 A | 3/2016 |
| CN | 205180371 U | 4/2016 |
| CN | 205197003 A | 5/2016 |
| CN | 205337598 U | 6/2016 |
| CN | 105747281 A | 7/2016 |
| CN | 105831812 A | 8/2016 |
| CN | 105848503 A | 8/2016 |
| CN | 105876869 A | 8/2016 |
| CN | 205456048 U | 8/2016 |
| CN | 205512358 U | 8/2016 |
| CN | 205597118 U | 9/2016 |
| CN | 106037014 A | 10/2016 |
| CN | 205648910 U | 10/2016 |
| CN | 106102492 A | 11/2016 |
| CN | 106132217 A | 11/2016 |
| CN | 106163307 A | 11/2016 |
| CN | 205728067 U | 11/2016 |
| CN | 106174699 A | 12/2016 |
| CN | 106231934 A | 12/2016 |
| CN | 205831062 U | 12/2016 |
| CN | 106413439 A | 2/2017 |
| CN | 106413444 A | 2/2017 |
| CN | 106455708 A | 2/2017 |
| CN | 106455714 A | 2/2017 |
| CN | 106455716 A | 2/2017 |
| CN | 106473233 A | 3/2017 |
| CN | 106901404 A | 6/2017 |
| CN | 206312988 U | 7/2017 |
| CN | 105342011 B | 6/2018 |
| DE | 3302518 A1 | 7/1984 |
| EA | 012169 B1 | 8/2009 |
| EA | 026076 B1 | 2/2017 |
| EP | 1119267 B1 | 7/2004 |
| EP | 2113178 A1 | 11/2009 |
| EP | 2 201 850 A1 | 6/2010 |
| EP | 2253233 A1 | 11/2010 |
| EP | 2316286 A1 | 5/2011 |
| EP | 2 531 053 B1 | 9/2015 |
| EP | 3 098 738 A1 | 11/2016 |
| EP | 2 432 339 B1 | 3/2017 |
| EP | 3 179 828 A1 | 6/2017 |
| EP | 3 275 319 B1 | 8/2020 |
| GB | 2542018 A | 3/2017 |
| JP | 3-232481 A | 10/1991 |
| JP | 7-184627 A | 7/1995 |
| JP | 11-40122 A | 2/1999 |
| JP | 11-164679 A | 6/1999 |
| JP | 3645921 B2 | 5/2005 |
| JP | 2006-92831 A | 4/2006 |
| JP | 2006-320286 A | 11/2006 |
| JP | 4278306 B2 | 6/2009 |
| JP | 2010-178730 A | 8/2010 |
| JP | 2010-526553 A | 8/2010 |
| JP | 2011-87569 A | 5/2011 |
| JP | 2011-518567 A | 6/2011 |
| JP | 4739433 B2 | 8/2011 |
| JP | 2012-527222 A | 11/2012 |
| JP | 2014-500017 A | 1/2014 |
| JP | 2014-521419 A | 8/2014 |
| JP | 2014-525237 A | 9/2014 |
| JP | 2014-533513 A | 12/2014 |
| JP | 2014-534813 A | 12/2014 |
| JP | 2015-503916 A | 2/2015 |
| JP | 2015-506170 A | 3/2015 |

(56) References Cited

FOREIGN PATENT DOCUMENTS

| | | |
|---|---|---|
| JP | 2015-507477 A | 3/2015 |
| JP | 2015-508996 A | 3/2015 |
| JP | 2015-524261 A | 8/2015 |
| JP | 2015-180214 A | 10/2015 |
| JP | 2015-529458 A | 10/2015 |
| JP | 2015-204833 A | 11/2015 |
| JP | 2016-528910 A | 9/2016 |
| JP | 3207506 U | 11/2016 |
| JP | 2017-51189 A | 3/2017 |
| JP | 2017-70297 A | 4/2017 |
| JP | 2017-514463 A | 6/2017 |
| KR | 10-0304044 B1 | 11/2001 |
| KR | 10-0636287 B1 | 10/2006 |
| KR | 10-0806461 B1 | 2/2008 |
| KR | 10-0965099 B1 | 6/2010 |
| KR | 10-1001077 B1 | 12/2010 |
| KR | 10-2011-0096548 A | 8/2011 |
| KR | 20-2011-0009632 U | 10/2011 |
| KR | 10-1098112 B1 | 12/2011 |
| KR | 10-2012-0027029 A | 3/2012 |
| KR | 10-2012-0101637 A | 9/2012 |
| KR | 10-1184499 B1 | 9/2012 |
| KR | 10-2012-0109634 A | 10/2012 |
| KR | 10-2012-0114333 A | 10/2012 |
| KR | 10-2012-0121314 A | 11/2012 |
| KR | 10-2013-0027909 A | 3/2013 |
| KR | 20-0466757 Y1 | 5/2013 |
| KR | 10-2013-0081238 A | 7/2013 |
| KR | 10-2013-0139296 A | 12/2013 |
| KR | 10-2014-0015774 A | 2/2014 |
| KR | 10-1383577 B1 | 4/2014 |
| KR | 10-2014-0068203 A | 6/2014 |
| KR | 10-2014-0092312 A | 7/2014 |
| KR | 10-2014-0116055 A | 10/2014 |
| KR | 10-2014-0118983 A | 10/2014 |
| KR | 10-2014-0119072 A | 10/2014 |
| KR | 10-2014-0135774 A | 11/2014 |
| KR | 10-2015-0030409 A | 3/2015 |
| KR | 10-2015-0033617 A | 4/2015 |
| KR | 10-2015-0058569 A | 5/2015 |
| KR | 10-1516304 B1 | 5/2015 |
| KR | 10-1523088 B1 | 5/2015 |
| KR | 10-1523088 B2 | 5/2015 |
| KR | 10-2015-0099704 A | 9/2015 |
| KR | 10-2015-0099771 A | 9/2015 |
| KR | 10-2016-0009678 A | 1/2016 |
| KR | 10-2016-0012110 A | 2/2016 |
| KR | 10-2016-0012329 A | 2/2016 |
| KR | 10-2016-0015144 A | 2/2016 |
| KR | 10-2016-0040643 A | 4/2016 |
| KR | 10-1609715 B1 | 4/2016 |
| KR | 10-2016-0052607 A | 5/2016 |
| KR | 10-2016-0060006 A | 5/2016 |
| KR | 10-1619032 B1 | 5/2016 |
| KR | 20-2016-0001476 U | 5/2016 |
| KR | 10-2016-0088163 A | 7/2016 |
| KR | 10-2016-0094938 A | 8/2016 |
| KR | 10-2016-0096744 A | 8/2016 |
| KR | 10-2016-0108855 A | 9/2016 |
| KR | 10-1656061 B1 | 9/2016 |
| KR | 10-2016-0114743 A | 10/2016 |
| KR | 10-2016-0124091 A | 10/2016 |
| KR | 10-1667124 B1 | 10/2016 |
| KR | 10-1668175 B1 | 10/2016 |
| KR | 10-2016-0129024 A | 11/2016 |
| KR | 10-2016-0131035 A | 11/2016 |
| KR | 10-2016-0133665 A | 11/2016 |
| KR | 10-2016-0137627 A | 11/2016 |
| KR | 10-1679489 B1 | 11/2016 |
| KR | 10-2016-0140608 A | 12/2016 |
| KR | 10-2016-0142896 A | 12/2016 |
| KR | 10-2016-0147253 A | 12/2016 |
| KR | 10-1690389 B1 | 12/2016 |
| KR | 10-2017-0006282 A | 1/2017 |
| KR | 10-2017-0007262 A | 1/2017 |
| KR | 10-2017-0044158 A | 4/2017 |
| KR | 10-2017-0071486 A | 6/2017 |
| KR | 10-2017-0074898 A | 6/2017 |
| KR | 10-1740160 B1 | 6/2017 |
| RU | 2302806 C2 | 7/2007 |
| RU | 2425608 C2 | 8/2011 |
| RU | 2 531 890 C2 | 10/2014 |
| RU | 2564600 C1 | 10/2015 |
| RU | 2014 125 232 A | 12/2015 |
| RU | 2581999 C2 | 4/2016 |
| RU | 2589437 C2 | 7/2016 |
| RU | 2594557 C2 | 8/2016 |
| RU | 2595593 C2 | 8/2016 |
| RU | 2 602 053 C2 | 11/2016 |
| RU | 2 602 962 C2 | 11/2016 |
| RU | 2 603 559 C2 | 11/2016 |
| RU | 2 604 012 C2 | 12/2016 |
| RU | 2604012 C2 | 12/2016 |
| WO | 94/06314 A1 | 3/1994 |
| WO | 98/23171 A1 | 6/1998 |
| WO | 00/27232 A1 | 5/2000 |
| WO | 2010/133342 A1 | 11/2010 |
| WO | 2011/028372 A1 | 3/2011 |
| WO | 2011/050964 A1 | 5/2011 |
| WO | 2011/095781 A1 | 8/2011 |
| WO | 2012/072264 A1 | 6/2012 |
| WO | 2012/123702 A1 | 9/2012 |
| WO | 2013/034458 A1 | 3/2013 |
| WO | 2013/060743 A2 | 5/2013 |
| WO | 2013/076098 A2 | 5/2013 |
| WO | 2013/098395 A1 | 7/2013 |
| WO | 2013/098398 A3 | 7/2013 |
| WO | 2013/098409 A1 | 7/2013 |
| WO | 2013/102609 A2 | 7/2013 |
| WO | 2013/102612 A2 | 7/2013 |
| WO | 2013102609 A2 | 7/2013 |
| WO | 2013/120565 A3 | 8/2013 |
| WO | 2013/126777 A2 | 8/2013 |
| WO | 2013/137084 A1 | 9/2013 |
| WO | 2013/171217 A1 | 11/2013 |
| WO | 2013/190036 A1 | 12/2013 |
| WO | 2014/029880 A2 | 2/2014 |
| WO | 2015/046386 A1 | 4/2015 |
| WO | 2015/088744 A1 | 6/2015 |
| WO | 2015/128665 A1 | 9/2015 |
| WO | 2015/155289 A1 | 10/2015 |
| WO | 2015/165813 A1 | 11/2015 |
| WO | 2015/177044 A1 | 11/2015 |
| WO | 2015/197627 A1 | 12/2015 |
| WO | 2016/059073 A1 | 4/2016 |
| WO | 2016/075028 A1 | 5/2016 |
| WO | 2016/076147 A1 | 5/2016 |
| WO | 2016/107766 A1 | 7/2016 |
| WO | 2016/124550 A1 | 8/2016 |
| WO | 2016/124552 A1 | 8/2016 |
| WO | 2016/150019 A1 | 9/2016 |
| WO | 2016/156103 A1 | 10/2016 |
| WO | 2016/156219 A1 | 10/2016 |
| WO | 2016/159013 A1 | 10/2016 |
| WO | 2016/166064 A1 | 10/2016 |
| WO | 2016/178377 A1 | 11/2016 |
| WO | 2017/029088 A1 | 2/2017 |
| WO | 2017/029089 A1 | 2/2017 |
| WO | 2017/037457 A1 | 3/2017 |
| WO | 2017/042297 A1 | 3/2017 |
| WO | 2017/075759 A1 | 5/2017 |
| WO | 2017/139963 A1 | 8/2017 |
| WO | 2018/050449 A1 | 3/2018 |
| WO | 2018/189195 A1 | 10/2018 |
| WO | 2019/020826 A1 | 1/2019 |
| WO | 2019/030172 A1 | 2/2019 |
| WO | 2019/095268 A1 | 5/2019 |

OTHER PUBLICATIONS

Communication dated Aug. 26, 2021 by the Chinese Patent Office in Chinese Application No. 201880024107.6.

(56) References Cited

OTHER PUBLICATIONS

Communication dated Aug. 4, 2021 by the Chinese Patent Office in Chinese Application No. 201880024289.7.
Communication dated Jul. 16, 2021 by the Chinese Patent Office in Chinese Application No. 201880024367.3.
Communication dated Jul. 19, 2021 by the Chinese Patent Office in Chinese Application No. 201880024070.7.
Communication dated Jul. 26, 2021 by the Chinese Patent Office in Chinese Application No. 201880024059.0.
Communication dated Jul. 27, 2021 by the Chinese Patent Office in Chinese Application No. 201780084891.5.
Communication dated Sep. 17, 2021 by the Chinese Patent Office in Chinese Application No. 201880030699.2.
Office Action dated Aug. 7, 2019 for Korean Patent Application No. 10-2018-0067035, and its English translation provided by Applicants foreign counsel.
Office Action dated Jun. 27, 2019 for Korean Patent Application No. 10-2018-0063759, and its English translation provided by Applicants foreign counsel.
Office Action dated Jul. 2, 2019 for Korean Patent Application No. 10-2019-0018815, and its English translation provided by Applicants foreign counsel.
Office Action dated Jul. 3, 2019 for Korean Patent Application No. 10-2019-0017391, and its English translation provided by Applicants foreign counsel.
International Preliminary Report on Patentability (Chapter I) dated Jun. 18, 2019 for PCT/KR2017/012486 and its English translation from WIPO.
Written Opinion of the International Searching Authority for PCT/KR2017/012486 dated May 29, 2018 and its English translation by Google Translate (now published as WO 2018/110834).
Partial supplementary European search report dated Aug. 3, 2020 in Application No. 17880867.1.
Extended European search report dated Nov. 4, 2020 by the European Patent Office in Application No. 17880867.1.
Office Action dated Oct. 29, 2020 by the Korean Patent Office in Application No. 10-2018-0010837.
Office Action dated Nov. 4, 2020 by the Japanese Patent Office in Application No. 2019-554453.
Office Action dated Nov. 4, 2020 by the Japanese Patent Office in Application No. 2020-128346.
Decision on Grant dated Nov. 26, 2020 by the Russian Federal Service For Intellectual Property Patent Application No. 2020124607.
Office Action dated Nov. 26, 2020 by Russian Federal Service For Intellectual Property Office Patent Application No. 2020124609.
Decision on Grant dated Oct. 26, 2020 by Russian Federal Service For Intellectual Property in Application No. 2020124610.
Office Action dated Jun. 29, 2020 by the Korean Patent Office in Application No. 10-2018-0010836.
Extended European Search Report dated Oct. 27, 2021 in European Application No. 18844735.3.
Office Action dated Oct. 28, 2021 in Chinese Application No. 201880046418.2.
Office Action dated Sep. 24, 2021 in Chinese Application No. 201880024010.5.
Office Action dated Sep. 29, 2021 in Chinese Application No. 201880024276.X.
Office Action dated Sep. 29, 2021 in Chinese Application No. 201880024311.8.
Office Action dated Nov. 25, 2021 in Chinese Application No. 201880047174.X.
Office Action dated Dec. 1, 2021 in Chinese Application No. 201880046367.3.
International Search Report dated Jul. 24, 2018 in International Application No. PCT/KR2018/003691.
Office Action dated Jul. 2, 2019 in Korean Application No. 10-2019-0018815.
Office Action dated Jul. 3, 2019 in Korean Application No. 10-2019-0017391.
International Search Report dated Oct. 29, 2018 in International Application No. PCT/KR2018/004181.
International Search Report dated Sep. 6, 2018 in International Application No. PCT/KR2018/004179.
International Search Report dated Nov. 6, 2018 in International Application No. PCT/KR2018/004178.
International Search Report dated Sep. 6, 2018 in International Application No. PCT/KR2018/004176.
International Search Report dated Sep. 7, 2018 in International Application No. PCT/KR2018/004172.
International Search Report dated Sep. 7, 2018 in International Application No. PCT/KR2018/004171.
International Search Report dated Nov. 6, 2018 in International Application No. PCT/KR2018/004130.
International Search Report dated Nov. 6, 2018 in International Application No. PCT/KR2018/004129.
International Search Report dated Nov. 14, 2018 in International Application No. PCT/KR2018/004118.
International Search Report dated May 29, 2018 in International Application No. PCT/KR2017/012486.
Extended European Search Report dated Dec. 11, 2020 in European Application No. 20188967.2.
Extended European Search Report dated Jan. 15, 2021 in European Application No. 20188949.0.
Extended European Search Report dated Dec. 16, 2020 in European Application No. 20188985.4.
Office Action dated Dec. 30, 2020 in Russian Application No. 2020124651.
Office Action dated Dec. 28, 2020 in Russian Application No. 2020124652.
Office Action dated Dec. 11, 2020 in Russian Application No. 2020124653.
Office Action dated Jan. 22, 2021 in Russian Application No. 2020124657.
Office Action dated Jan. 22, 2021 in Russian Application No. 2020124658.
Extended European Search Report dated Dec. 18, 2020 in European Application No. 18775504.6.
Office Action dated Jan. 19, 2021 in Japanese Application No. 2019-553569.
Extended European Search Report dated Jan. 14, 2021 in European Application No. 18784738.9.
Extended European Search Report dated Dec. 10, 2020 in European Application No. 20188932.6.
Office Action dated Jan. 12, 2021 in Japanese Application No. 2019-555201.
Office Action dated Jan. 12, 2021 in Japanese Application No. 2019-555169.
Office Action dated Jan. 5, 2021 in Japanese Application No. 2019-558557.
Extended European Search Report dated Nov. 19, 2020 in European Application No. 20188792.4.
Office Action dated Dec. 1, 2020 in Japanese Application No. 2020-501188.
Extended European Search Report dated Dec. 18, 2020 in European Application No. 20188926.8.
Office Action dated Jan. 19, 2021 in Japanese Application No. 2020-501514.
Office Action dated Sep. 24, 2020 in Korean Application No. 10-2018-0012456.
Office Action dated May 28, 2020 in Korean Application No. 10-2017-0147605.
Office Action dated Jul. 22, 2021 in Korean Application No. 10-2021-0051359.
Extended European Search Report dated Apr. 1, 2021 in European Application No. 18805933.1.
Extended European Search Report dated Jul. 1, 2021 in European Application No. 18854661.8.
Extended European Search Report dated Jun. 14, 2021 in European Application No. 18842951.8.
Extended European Search Report dated Jun. 16, 2021 in European Application No. 18853434.1.

(56) References Cited

OTHER PUBLICATIONS

International Search Report dated Aug. 29, 2018 in International Application No. PCT/KR2018/005945.
International Search Report dated Dec. 4, 2018 in International Application No. PCT/KR2018/006747.
International Search Report dated Feb. 28, 2019 in International Application No. PCT/KR2018/009100.
International Search Report dated Nov. 26, 2018 in International Application No. PCT/KR2018/009094.
International Search Report dated Nov. 30, 2018 in International Application No. PCT/KR2018/006702.
Office Action dated Apr. 25, 2019 in Korean Application No. 10-2019-0033784.
Office Action dated Apr. 4, 2019 in Korean Application No. 10-2019-0019194.
Office Action dated Apr. 4, 2019 in Korean Application No. 10-2019-0019195.
Office Action dated Apr. 5, 2019 in Korean Application No. 10-2019-0027638.
Office Action dated Apr. 9, 2021 in Korean Application No. 10-2020-0116256.
Office Action dated Jun. 10, 2021 in Russian Application No. 2020124657.
Office Action dated Jun. 10, 2021 in Russian Application No. 2020124658.
Office Action dated Jun. 29, 2021 in Chinese Application No. 201880022072.2.
Office Action dated May 5, 2021 in Canadian Application No. 3,047,236.
Office Action dated Jan. 3, 2020 in Korean Application No. 10-2017-0084389.
Office Action dated Jan. 16, 2020 in Korean Application No. 10-2017-0084388.
Office Action dated Jan. 16, 2020 in Korean Application No. 10-2017-0084387.
Office Action dated Jan. 3, 2020 in Korean Application No. 10-2017-0084386.
Office Action dated Jan. 3, 2020 in Korean Application No. 10-2018-0018693.
Office Action dated Jan. 3, 2020 in Korean Application No. 10-2018-0012456.
Office Action dated Jan. 8, 2020 in Korean Application No. 10-2017-0128293.
Office Action dated Jan. 8, 2020 in Korean Application No. 10-2017-0119664.
Office Action dated Feb. 11, 2020 in Korean Application No. 10-2018-0010834.
Office Action dated Feb. 11, 2020 in Korean Application No. 10-2018-0010835.
Office Action dated Dec. 11, 2019 in Korean Application No. 10-2018-0010836.
Office Action dated Feb. 13, 2020 in Korean Application No. 10-2018-0010837.
Office Action dated Dec. 11, 2019 in Korean Application No. 10-2018-0010841.
Office Action dated Dec. 19, 2019 in Korean Application No. 10-2018-0090910.
Office Action dated Feb. 18, 2020 in Russian Application No. 2019121813.
Extended European Search Report dated Jan. 14, 2021 in European Application No. 18783776.0.
Extended European Search Report dated Jan. 25, 2021 in European Application No. 18785166.2.
Extended European Search Report dated Jan. 29, 2021 in European Application No. 18784464.2.
Extended European Search Report dated Mar. 15, 2021 in European Application No. 18785061.5.
Extended European Search Report dated Mar. 19, 2021 in European Application No. 18784164.8.
Extended European Search Report dated Mar. 24, 2021 in European Application No. 18784268.7.
Extended European Search Report dated Mar. 25, 2021 in European Application No. 18784370.1.
Extended European Search Report dated Mar. 25, 2021 in European Application No. 18784841.1.
Office Action dated Feb. 24, 2021 in Japanese Application No. 2019-555168.
Office Action dated Feb. 24, 2021 in Japanese Application No. 2019-555203.
Office Action dated Feb. 24, 2021 in Japanese Application No. 2019-555204.
Office Action dated Feb. 4, 2021 in Russian Application No. 2020124609.
Office Action dated Feb. 9, 2021 in Japanese Application No. 2019-555184.
Office Action dated Jan. 26, 2021 in Japanese Application No. 2020-501521.
Office Action dated Mar. 2, 2021 in Japanese Application No. 2019-555170.
Office Action dated Mar. 2, 2021 in Japanese Application No. 2019-555182.
Office Action dated Mar. 30, 2021 in Japanese Application No. 2020-501377.
Office Action dated Jan. 19, 2021 in Indonesian Application No. P00201906007.
Office Action dated Nov. 14, 2019 in Korean Application No. 10-2017-0084385.
Office Action dated Nov. 14, 2019 in Korean Application No. 10-2017-0147605.
Communication dated Mar. 14, 2022 from the Chinese Patent Office in Chinese Application No. 201880024059.0.
Communication dated Feb. 28, 2022 from the Chinese Patent Office in Chinese Application No. 201880050526.7.
Office Action dated May 30, 2022 from the Canadian Intellectual Property Office in CA Application No. 3,080,145.
Office Action dated Jun. 9, 2022 from the Intellectual Property Office of Philippines in PH Application No. Jan. 2019/501361.
Office Action dated Jun. 28, 2022 from the Japanese Patent Office in JP Application No. 2021-075028.
Third Office Action issued in the China National Intellectual Property Administration dated Aug. 12, 2022 in English corresponding to Chinese Application No. 201880024059.0.

* cited by examiner

DEVICE FOR HOLDING SMOKING MEMBER, AND SMOKING MEMBER SYSTEM

CROSS REFERENCE TO RELATED APPLICATIONS

This application is a National Stage of International Application No. PCT/KR2018/004171, filed Apr. 10, 2018, claiming priorities to Korean Patent Application No. 10-2017-0046938 filed Apr. 11, 2017, Korean Patent Application No. 10-2017-0077586 filed Jun. 19, 2017 and Korean Patent Application No. 10-2017-0084388 filed Jul. 3, 2017.

TECHNICAL FIELD

The present disclosure relates to a smoking member supporting device and a smoking member system.

BACKGROUND ART

From long time ago, people have used various items for smoking. For example, rod-like cigarettes including filter members have been made and used.

On the other hand, various types of articles for smoking are being developed, and various smoking environments are becoming available to users by partially or completely inserting smoking materials into smoking members.

In many cases, it is difficult for users to handle and maintain such smoking members, and there is a limit in improving user convenience therefor, especially when it is necessary to separately supply energy to smoking members.

DESCRIPTION OF EMBODIMENTS

Technical Problem

The present disclosure relates to a smoking member supporting device and a smoking member system capable of improving user convenience for smoking and maintenance of a smoking member.

Solution to Problem

According to an aspect of the present disclosure, there is provided a smoking member supporting device which is placed in an arrangement region with or without a smoking member mounted thereon, the smoking member supporting device including a base unit including an arrangement surface corresponding to the arrangement region; an accommodating unit formed adjacent to the base unit and configured to accommodate at least one region of the smoking member; a hook unit formed at an edge of the accommodating unit to define the accommodating unit and to maintain a state that the smoking member is accommodated in the accommodating unit and mounted; and a connecting unit formed to face the smoking member when the smoking member is accommodated in the accommodating unit and to supply electrical energy to the smoking member.

In the present embodiment, the connecting unit may be formed on a surface of the accommodating unit.

In the present embodiment, the smoking member supporting device may receive electrical energy from an external power source, and the electrical energy supplied from the external power source may be delivered to the smoking member through the connecting unit.

In the present embodiment, energy for heating a smoking material when a user smokes through the smoking member is needed, and the smoking member may charge energy for heating the smoking member through the connecting unit.

In the present embodiment, the smoking member may include a heater member for heating a smoking material when a user smokes and perform a pre-heating operation for the heater member of the smoking member through the connecting unit.

In the present embodiment, the smoking member supporting device may further include a cleaning unit configured to perform cleaning of a region of the smoking member when the smoking member is accommodated in the accommodating unit.

In the present embodiment, the cleaning unit may be formed to correspond to the accommodating unit.

In the present embodiment, the cleaning unit may have a brush-like shape comprising a plurality of fiber strands.

In the present embodiment, the smoking member supporting device may further include a cleaning driving unit configured to drive the cleaning unit to move the cleaning unit when the cleaning member cleans the smoking member.

In the present embodiment, the smoking member supporting device may further include a supporting unit connected to the base unit and protruding in the lengthwise direction of the smoking member when the smoking member is accommodated.

In the present embodiment, the connecting unit may be formed on a surface of the supporting unit.

According to another aspect of the present disclosure, there is provided a smoking member system including a smoking member supporting device which is placed in an arrangement region with or without a smoking member mounted thereon, wherein the smoking member includes a main body region; an insertion groove formed at one end of the main body region; and a heater member disposed in the insertion groove, and the smoking member supporting device includes a base unit including an arrangement surface corresponding to the arrangement region; an accommodating unit formed adjacent to the base unit and configured to accommodate at least one region of the smoking member; a hook unit formed at an edge of the accommodating unit to define the accommodating unit and to maintain a state that the smoking member is accommodated in the accommodating unit and mounted; and a connecting unit formed to face the smoking member when the smoking member is accommodated in the accommodating unit and to supply electrical energy to the smoking member.

In the present embodiment, the smoking member supporting device further includes a cleaning unit formed in the accommodating unit of the smoking member supporting device, and, the smoking member is accommodated in the accommodating unit. such that the cleaning unit corresponds to the insertion groove of the smoking member when the smoking member is mounted on the smoking member supporting device.

Other aspects, features, and advantages will become apparent from the following drawings, claims, and detailed description of the present disclosure.

Advantageous Effects of Disclosure

A smoking member supporting device and a smoking member system according to embodiments of the present disclosure may improve user convenience for smoking and maintaining a smoking member.

BEST MODE

Figure 1:
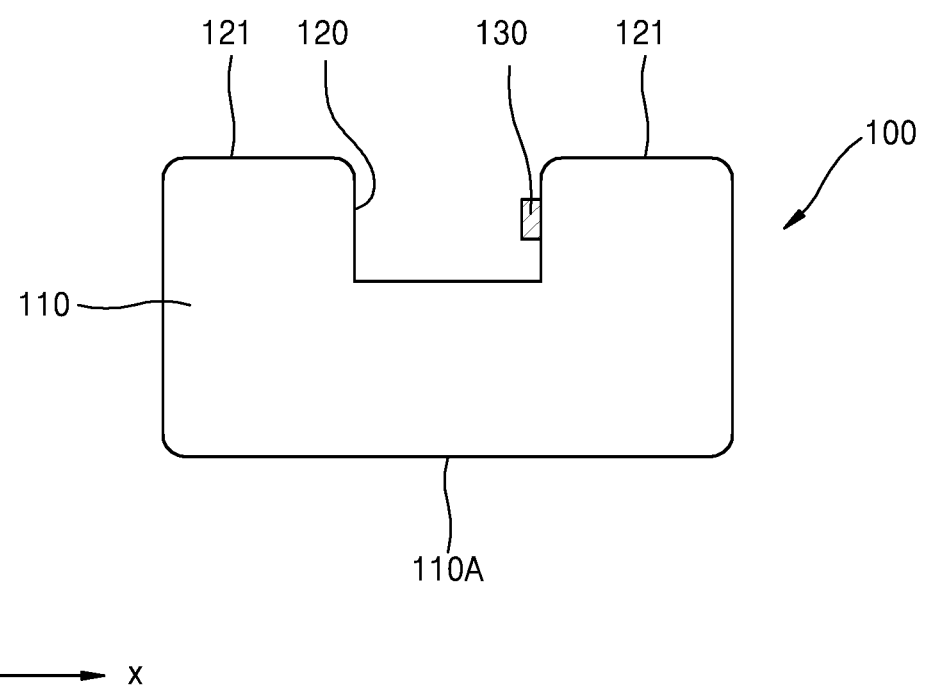
FIG. 1 is a diagram schematically showing a smoking member supporting device according to an embodiment of the present disclosure.

According to an aspect of the present disclosure, there is provided a smoking member supporting device which is placed in an arrangement region with or without a smoking member mounted thereon, the smoking member supporting device including a base unit including an arrangement surface corresponding to the arrangement region; an accommodating unit formed adjacent to the base unit and configured to accommodate at least one region of the smoking member; a hook unit formed at an edge of the accommodating unit to define the accommodating unit and to maintain a state that the smoking member is accommodated in the accommodating unit and mounted; and a connecting unit formed to face the smoking member when the smoking member is accommodated in the accommodating unit and to supply electrical energy to the smoking member.

Mode of Disclosure

The present disclosure may include various embodiments and modifications, and embodiments thereof will be illustrated in the drawings and will be described herein in detail. The effects and features of the present disclosure and the accompanying methods thereof will become apparent from the following description of the embodiments, taken in conjunction with the accompanying drawings. However, the present disclosure is not limited to the embodiments described below, and may be embodied in various modes.

Reference will now be made in detail to embodiments, examples of which are illustrated in the accompanying drawings. In the drawings, the same elements are denoted by the same reference numerals, and a repeated explanation thereof will not be given.

It will be understood that although the terms "first", "second", etc. may be used herein to describe various elements, these elements should not be limited by these terms. These elements are only used to distinguish one element from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

In addition, unless explicitly described to the contrary, the word "comprise" and variations such as "comprises" or "comprising" will be understood to imply the inclusion of stated elements but not the exclusion of any other elements. In addition, the terms "-er," "-or", and "module" described in the specification mean units for processing at least one function and operation and can be implemented by hardware components or software components and combinations thereof.

Sizes of elements in the drawings may be exaggerated for convenience of explanation. In other words, since sizes and thicknesses of components in the drawings are arbitrarily illustrated for convenience of explanation, the following embodiments are not limited thereto.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

Figure 2:
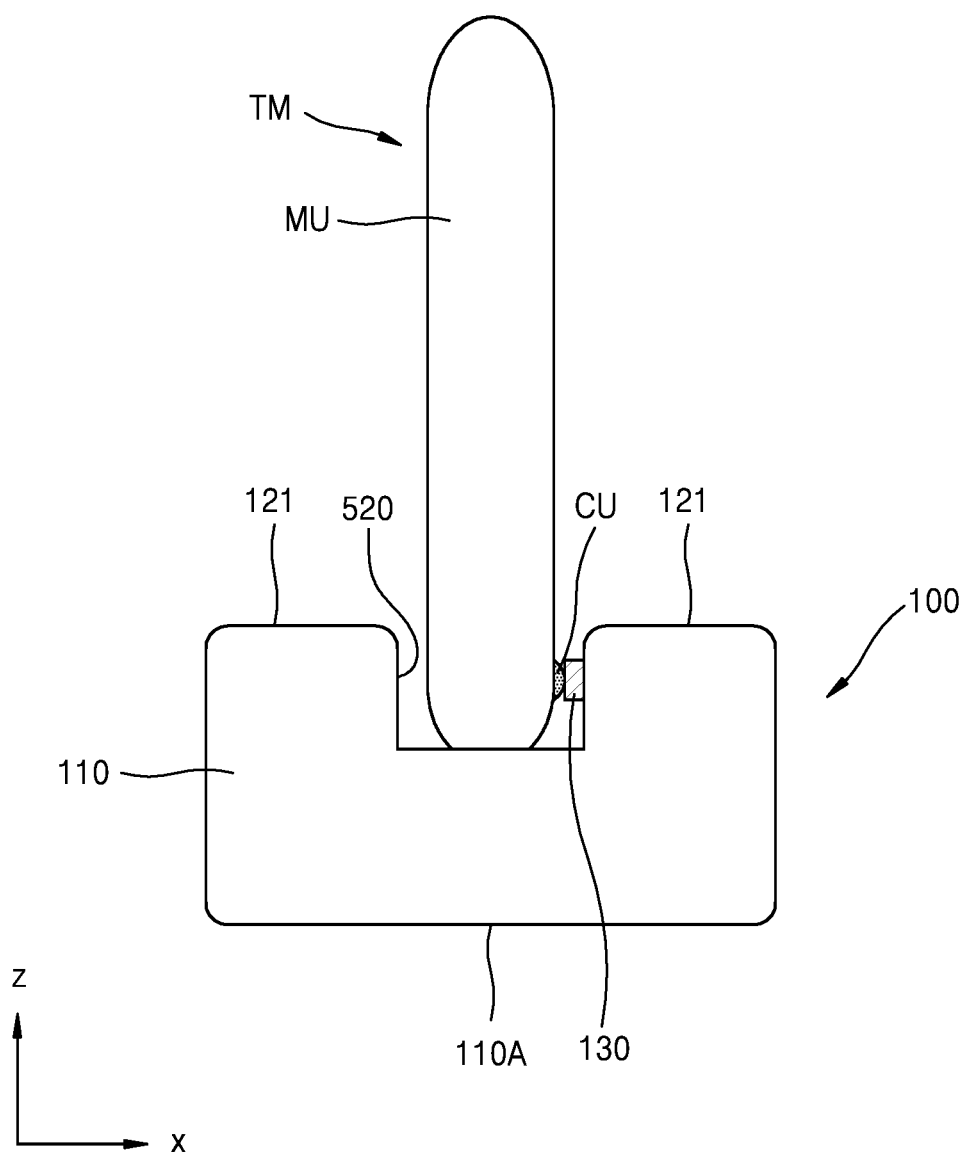
FIG. 2 is a diagram showing a state in which a smoking member mounted to the smoking member supporting device of FIG. 1.

FIG. 1 is a diagram schematically showing a smoking member supporting device according to an embodiment of the present disclosure, and FIG. 2 is a diagram showing a state in which a smoking member mounted to the smoking member supporting device of FIG. 1.

Referring to FIGS. 1 and 2, a smoking member supporting device 100 according to the present embodiment may include a base unit 110, an accommodating unit 120, a hook unit 121, and a connecting unit 130.

The base unit 110 may be formed to arrange the smoking member supporting device 100 in an arrangement space and may specifically include an arrangement surface 110A.

In some embodiments, the base unit 110 may have an arrangement surface 110A in the form of a flat surface. Accordingly, the arrangement surface 110A of the base unit 110 may correspond to one surface of a region of an arrangement space desired by a user, such as an office desk, a living room table, or a desk in a room, and the smoking member supporting device 100 may be stably placed in the arrangement space through the arrangement surface 110A.

Also, the smoking member supporting device 100 may be placed in an arrangement space and then maintained in a stable state.

The accommodating unit 120 may be configured to accommodate a smoking member TM. The accommodating unit 120 may have a groove-like shape having a certain thickness or depth.

The hook unit 121 may be formed at an edge of the accommodating unit 120 and define the accommodating unit 120.

When the smoking member TM is accommodated in the accommodating unit 120, one region of the smoking member TM may be accommodated in the accommodating unit 120 and the remaining region may not be accommodated in the accommodating unit 120 and be outside the accommodating unit 120.

The smoking member TM may be accommodated in the accommodating unit 120 and mounted on the smoking member supporting device 100. At this time, the smoking member TM may be stably mounted on the accommodating unit 120 through the hook unit 121.

Also, one region of the smoking member TM may be located outside the accommodating unit 120 to facilitate the mounting of the smoking member TM to the accommodating unit 120 or removal of the smoking member TM from the accommodating unit 120.

The smoking member TM is accommodated in the accommodating unit 120 by inserting the smoking member TM into the accommodating unit 120 in a direction parallel to the lengthwise direction of a main body region MU of the smoking member TM, and thus the smoking member TM may be mounted on the smoking member supporting device 100.

For example, the accommodating unit 120 may have a groove-like shape having a depth in a direction parallel to the lengthwise direction of the smoking member TM.

The connecting unit 130 may be arranged to face the smoking member TM when the smoking member TM is accommodated in the accommodating unit 120 to supply electrical energy to the smoking member TM.

In some embodiments, the connecting unit 130 may be formed on the inner surface of the accommodating unit 120.

When the smoking member TM is accommodated in the accommodating unit 120, the connecting unit 130 may be formed to correspond to a terminal region CU of the smoking member TM.

In other words, when the smoking member TM is accommodated in the accommodating unit 120, the depth of the accommodating unit 120, the position of the connecting unit 130, and the position and the size of the terminal region CU may be controlled, such that the connecting unit 130 corresponds to the terminal region CU without a further control of a user.

In some embodiments, magnetic force may be used to facilitate the correspondence between the connecting unit 130 and the terminal region CU. At least one of the smoking member TM and the smoking member supporting device 100 may include a magnetic member, and the other one region may include a magnetic material capable of interacting with the magnetic member.

For example, a magnetic member like a permanent magnet may be used, and a magnetic material like iron and nickel may be used to interact with the magnetic member.

At this time, the arrangement positions of the magnetic member and the magnetic material may be adjusted between the smoking member TM and the smoking member supporting device 100, such that the connecting unit 130 and the terminal region CU match each other.

For example, the magnetic member may be disposed in one of the terminal region (CU) and the connecting unit 130, and the magnetic material may be included in the other.

Energy may be supplied to the smoking member TM from the smoking member supporting device 100 through the correspondence between the connecting unit 130 and the terminal region CU. For example, energy may be supplied from the smoking member supporting device 100 to the smoking member TM through a contact between the connecting unit 130 and the terminal region CU. More specifically, electrical energy may be supplied.

In some embodiments, the smoking member supporting device 100 may receive electrical energy from a separate external power source and transfer the electrical energy to the terminal region CU through the connecting unit 130, thereby supplying the electrical energy to the smoking member TM.

In this case, the smoking member supporting device 100 may be connected to a power source through a power cable, a USB cable, or the like. Alternatively, the smoking member supporting device 100 may be wirelessly connected to the power source and may receive energy through a wireless communication protocol.

The smoking member TM may store energy (e.g., charge energy) for driving the smoking member TM through the energy supplied from the smoking member supporting device 100.

In some embodiments, the smoking member TM may charge energy as a heating source for heating a smoking material.

In another example, the smoking member TM may perform a pre-heating process for smoking and receive energy for the pre-heating process from the smoking member supporting device 100. Such a pre-heating process may be necessary before a user starts smoking. In other words, the pre-heating process may be a process for raising the temperature of a heater used for heating the smoking material to an appropriate temperature when the heater is provided.

When the smoking member TM is mounted on the smoking member supporting device 100, that is, accommodated in the accommodating unit 120, energy may be supplied to the smoking member TM without any manipulation. For example, the smoking member TM may be charged with energy as a heating source for heating a smoking material.

In some embodiments, when a user provides a selection (e.g., when the user selects a selection button provided in the smoking member supporting device 100), the smoking member TM may be charged with energy as a heating source for heating a smoking material.

Also, when a user provides a selection (e.g., when the user selects a selection button provided in the smoking member supporting device 100), the user may perform a pre-heating process for pre-heating the smoking member TM for smoking, e.g., a pre-heating process for a heater.

The smoking member supporting device 100 according to the present embodiment may be easily placed in an arrangement space through an arrangement surface of a base unit. Also, a smoking member may be accommodated in an accommodating unit to easily mount the smoking member to the smoking member supporting device.

Also, when the smoking member is accommodated in the accommodating unit, energy may be easily supplied to the smoking member through a connecting unit.

Accordingly, a user may mount a smoking member on a smoking member supporting device after smoking through the smoking member to supply energy to the smoking member and the user may easily smoke by taking out the smoking member from the smoking member supporting device when the user desires.

Also, after the smoking member is accommodated in the accommodating unit, the smoking member may be easily and stably mounted through a hook unit. As one region of the smoking member is accommodated in the accommodating unit and the other region of the smoking member is exposed to the outside, the smoking member may be easily mounted on the smoking member mounting device and may be easily detached from the smoking member supporting device.

Also, the energy necessary for the charging of the smoking member and the pre-heating of the smoking member, that is, the process for raising the temperature of a heater provided in the smoking member may be supplied automatically through the smoking member supporting device or through a selection process. user convenience may be improved.

Figure 3:
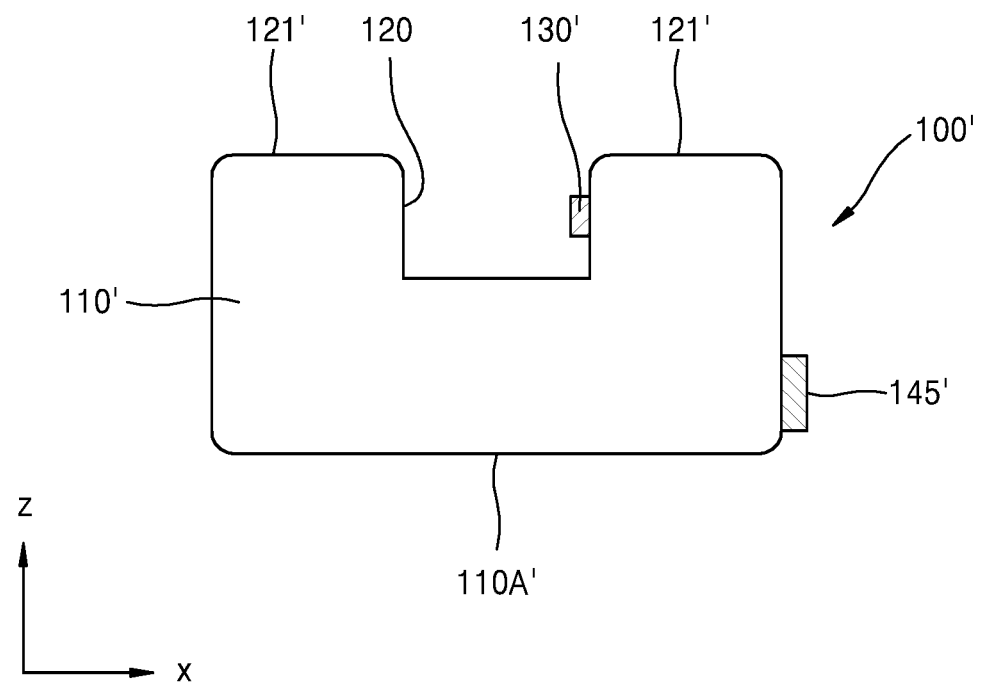
FIG. 3 is a diagram schematically showing a modified example of the smoking member supporting device of FIG. 1.
Figure 4:
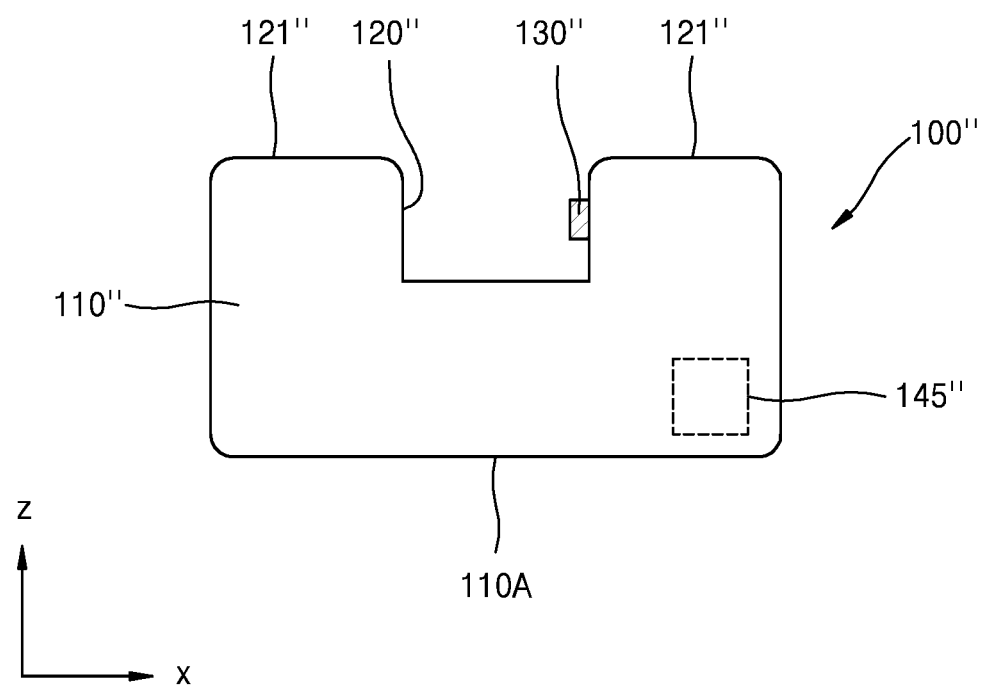
FIG. 4 is a diagram schematically showing another modified example of the smoking member supporting device of FIG. 1.

FIG. 3 is a diagram schematically showing a modified example of the smoking member supporting device of FIG. 1, and FIG. 4 is a diagram schematically showing another modified example of the smoking member supporting device of FIG. 1.

Referring to FIG. 3, a smoking member supporting device 100' according to the present embodiment may include a base unit 110', an accommodating unit 120', a hook unit 121', a connecting unit 130', and a connecting unit 140. For convenience of explanation, descriptions below will focus on differences from the above-described embodiments.

Since the base unit 110', the accommodating unit 120', the hook unit 121', and the connecting unit 130' of the present embodiment are identical to the base unit 110, the accommodating unit 120, the hook unit 121, and the connecting unit 130 of the embodiment described above with reference to FIGS. 1 and 2, detailed descriptions thereof will be omitted.

The connecting unit 140' may be formed on one surface of the base unit 110', and more particularly, may be formed on an outer surface of the base unit 110' other than an arrangement surface 110A' of the base unit 110'. For example, the connecting unit 140' may be formed on a side surface of the base unit 110'.

The connecting unit 140' may is a region connected to a separate external power source when the external power source is connected to the smoking member supporting device 100', and a cable may be connected to the connecting unit 140'.

Referring to FIG. 4, a smoking member supporting device 100" according to the present embodiment may include a base unit 110", an accommodating unit 120", a hook unit 121", a connecting unit 130", and a connecting unit 140". For convenience of explanation, descriptions below will focus on differences from the above-described embodiments.

Since the base unit 110", the accommodating unit 120", the hook unit 121", and the connecting unit 130" of the present embodiment are identical to the base unit 110, the accommodating unit 120, the hook unit 121, and the connecting unit 130 of the embodiment described above with reference to FIGS. 1 and 2, detailed descriptions thereof will be omitted.

A connecting unit 140" may be formed in one region of the base unit 110", and more particularly, may be formed inside the base unit 110".

The connecting unit 145" may be formed to be wirelessly connected to an separate external power source to receive power therefrom. In other words, the connecting unit 145" may be formed to receive energy by communicating with an separate external power source wirelessly.

The example structures of FIGS. 3 and 4 may be selectively applied to embodiments described below.

In other words, the drawings to be described below include only the case of FIG. 3. However, it is merely for convenience of description, and the case of FIG. 4 may also be applied.

Figure 5:
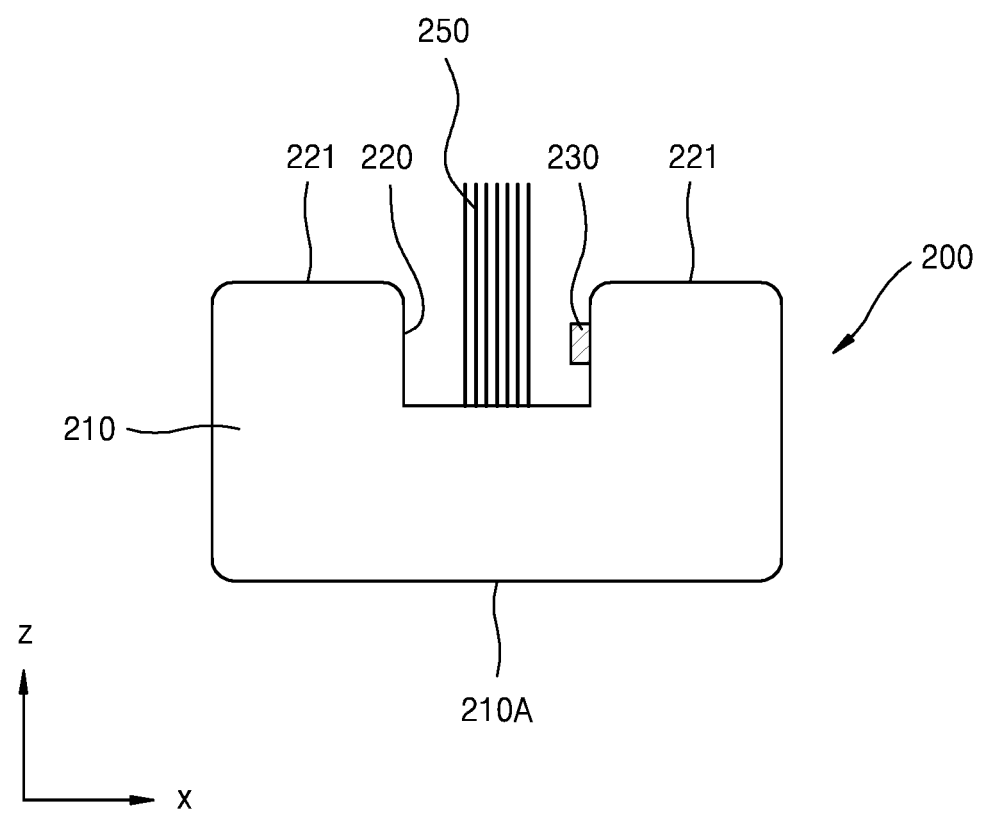
FIG. 5 is a diagram schematically showing a smoking member supporting device according to another embodiment of the present disclosure.
Figure 6:
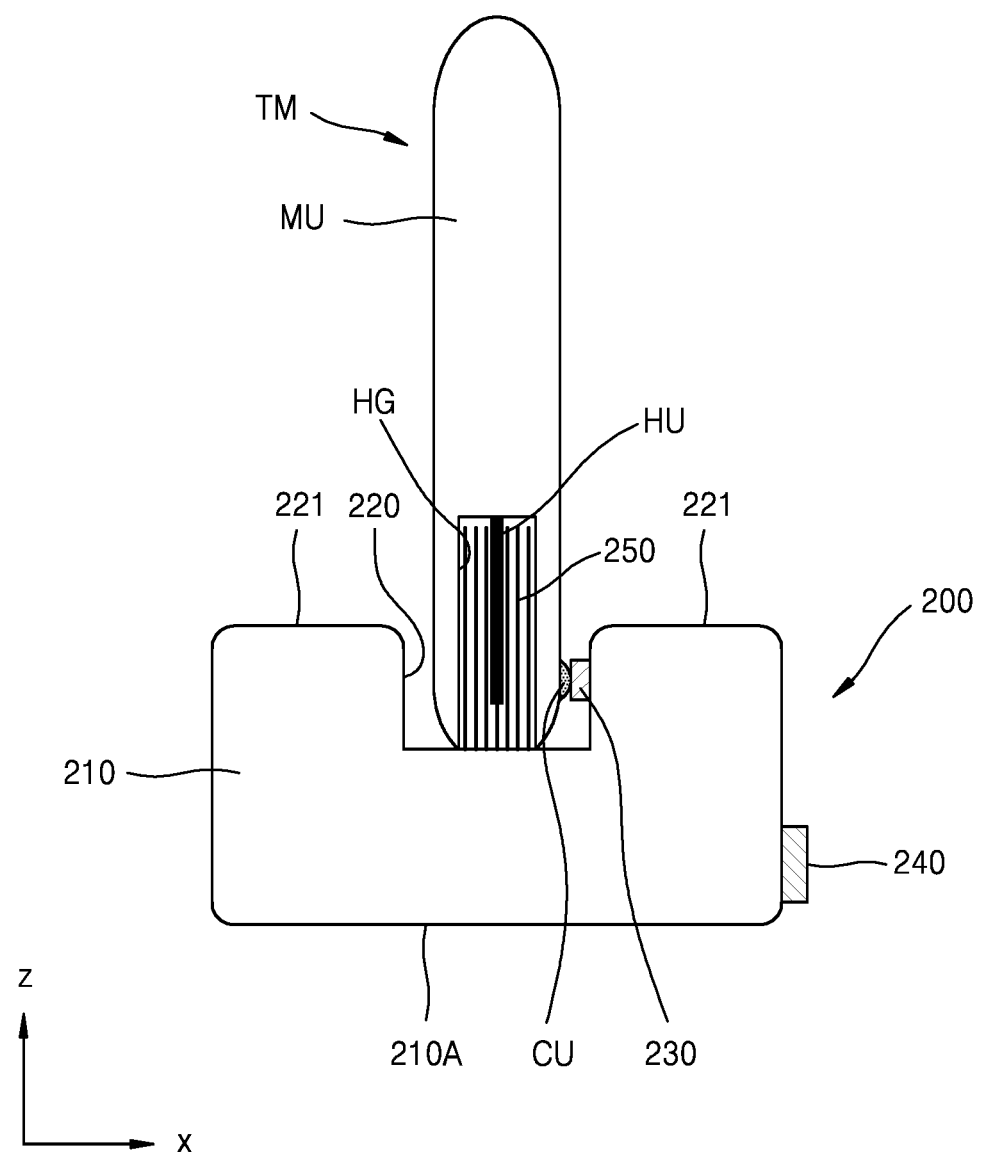
FIG. 6 is a diagram showing a state in which a smoking member mounted to the smoking member supporting device of FIG. 5.

FIG. 5 is a diagram schematically showing a smoking member supporting device according to another embodiment of the present disclosure, and FIG. 6 is a diagram showing a state in which a smoking member mounted to the smoking member supporting device of FIG. 5.

Referring to FIGS. 5 and 6, a smoking member supporting device 200 according to the present embodiment may include a base unit 210, an accommodating unit 220, a hook unit 221, a connecting unit 230, and a cleaning unit 250.

The base unit 210 may have an arrangement surface 210A to arrange the smoking member supporting device 200 in an arrangement space.

Since details of the base unit 210 are the same as those described above for the base unit 110 of the above-described embodiment of FIGS. 1 and 2, detailed descriptions thereof will be omitted.

The accommodating unit 220 may be configured to accommodate a smoking member TM. The accommodating unit 220 may have a groove-like shape having a certain thickness or depth.

The hook unit 221 may be formed at an edge of the accommodating unit 220 and define the accommodating unit 220.

Since details of the accommodating unit 220 and the hook unit 221 are the same as those described above for the accommodating unit 120 and the hook unit 121 of the above-described embodiment of FIGS. 1 and 2, detailed descriptions thereof will be omitted.

The connecting unit 230 may be arranged to face the smoking member TM when the smoking member TM is accommodated in the accommodating unit 220 to supply electrical energy to the smoking member TM.

Since details of the connecting unit 230 are the same as those described above for the connecting unit 130 of the above-described embodiment of FIGS. 1 and 2, detailed descriptions thereof will be omitted.

The cleaning unit 250 may be formed to perform cleaning on the smoking member TM.

In detail, the cleaning unit 250 may be disposed in the accommodating unit 220 and have a shape corresponding to a space inside the smoking member TM.

In some embodiments, the cleaning unit 250 may have a brush-like shape and include a plurality of fiber strands. Here, the plurality of fiber strands may include various materials. For example, the plurality of fiber strands may include synthetic fiber-based materials like resins to have an appropriate strength to clean while contacting the space of the smoking member TM and to prevent or detect damage to the smoking member TM.

In some embodiments, the smoking member TM may have an insertion groove HG to be connected to one end of a main body region MU.

A heater member HU may be disposed in the insertion groove HG.

A smoking material for a user to smoke may be inserted into the insertion groove HG, and the smoking material may be heated by the heater member HU to allow the user to perform a smoking process.

Energy supplied to the smoking member TM through the connecting unit 230 may supply energy for the smoking process to the heater member HU.

Also, when the heater member HU needs to be pre-heated to a predetermined temperature for an efficient smoking process, the energy supplied to the smoking member TM through the connecting unit 230 may be used as described above.

The cleaning unit 250 may be formed to correspond to the insertion groove HG of the smoking member TM when the smoking member TM is accommodated in the accommodating unit 220.

For example, the cleaning unit 250 may have a shape of a long brush, and a direction in which the cleaning unit 250 extends may be the same as the lengthwise direction of the insertion groove HG. Accordingly, the cleaning unit 250 may be disposed throughout the interior of the insertion groove HG and may clean the interior of the insertion groove HG.

Also, the cleaning unit 250 may contact the heater member HU having a long shape in the insertion groove HG and perform the cleaning of the heater member HU through the contact.

For example, a smoking material for smoking is inserted into the insertion groove HG as described above, and the smoking material is heated by the heater member HU for a user to perform a smoking process. Therefore, residues or by-products of the smoking material may be present in the insertion groove HG after the smoking process, and more residues or by-products may be present at the heater member HU. The residues or by-products may affect subsequent smoking processes and reduce user satisfaction during smoking or the safety of the smoking member supporting device 200.

The cleaning unit 250 may facilitate the cleaning of the insertion groove HG and the heater member HU.

For example, when the smoking member TM is mounted on the smoking member supporting device 200 and no smoking process is performed, the cleaning of the smoking member TM, and more particularly, the cleaning of the insertion groove HG and the heater member HU may be easily performed.

In some embodiments, the smoking member supporting device 200 may further include a connecting unit 240.

The connecting unit 240 may be formed on one surface of the base unit 210, and more particularly, may be formed on an outer surface of the base unit 210 other than an arrangement surface 210A of the base unit 210. For example, the connecting unit 240 may be formed on a side surface of the base unit 210.

The connecting unit 240 may is a region connected to a separate external power source when the external power source is connected to the smoking member supporting device 200, and a cable may be connected to the connecting unit 240.

Also, although not shown, in another example, the smoking member supporting device 200 may include a connecting unit (not shown) formed inside the base unit 210, and the connecting unit (not shown) may be formed to be wirelessly connected to a separate external power source and receive power therefrom. In other words, the connecting unit may be formed to receive energy by communicating with an separate external power source wirelessly.

The smoking member supporting device according to the present embodiment may be easily placed in an arrangement space through an arrangement surface of a base unit. Also, a smoking member may be accommodated in an accommodating unit to easily mount the smoking member to the smoking member supporting device.

Also, when the smoking member is accommodated in the accommodating unit, energy may be easily supplied to the smoking member through a connecting unit.

Accordingly, a user may mount a smoking member on a smoking member supporting device after smoking through the smoking member to supply energy to the smoking member and the user may easily smoke by taking out the smoking member from the smoking member supporting device when the user desires.

Also, after the smoking member is accommodated in the accommodating unit, the smoking member may be easily and stably mounted through a hook unit. As one region of the smoking member is accommodated in the accommodating unit and the other region of the smoking member is exposed to the outside, the smoking member may be easily mounted on the smoking member mounting device and may be easily detached from the smoking member supporting device.

Also, the energy necessary for the charging of the smoking member and the pre-heating of the smoking member, that is, the process for raising the temperature of a heater provided in the smoking member may be supplied automatically through the smoking member supporting device or through a selection process. user convenience may be improved.

Also, an insertion groove and a heater member of a smoking member may be cleaned through a cleaning unit. For example, when a smoking member is mounted on a smoking member supporting device and no smoking process is performed, cleaning of the smoking member, and more particularly, cleaning of an insertion groove and a heater member may be easily performed. Therefore, convenience of using and maintaining a smoking member supporting device and the lifespan of the smoking member supporting device may be improved.

Figure 7:
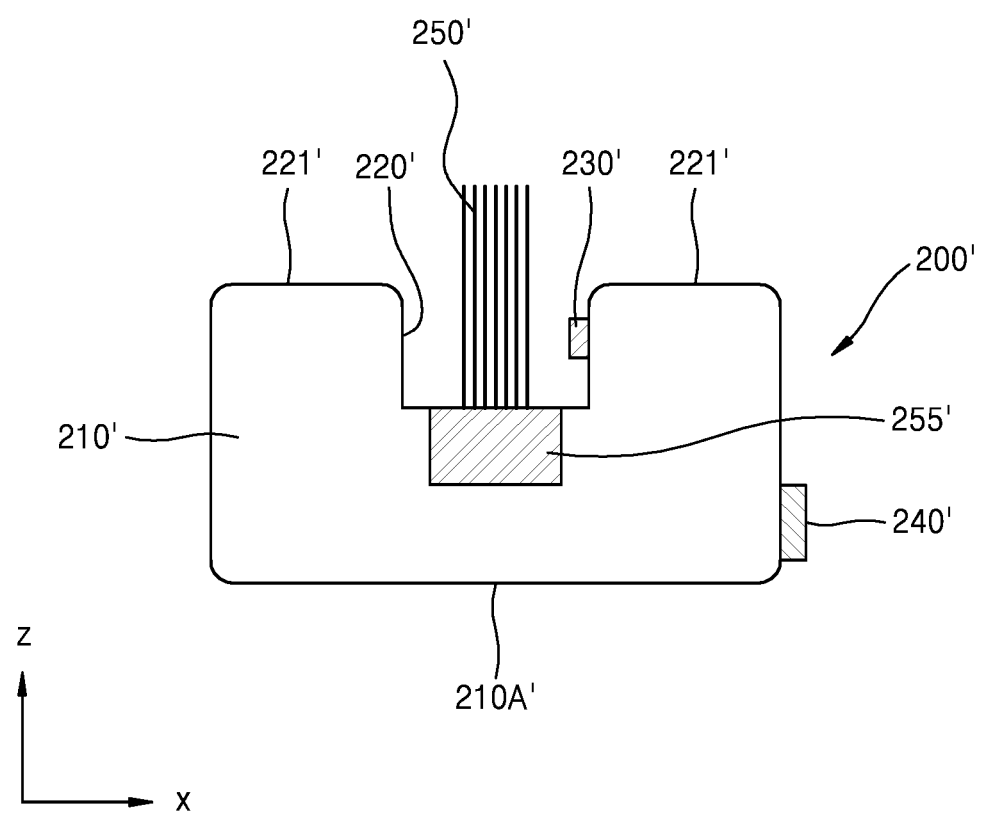
FIG. 7 is a diagram schematically showing a modified example of the smoking member supporting device of FIG. 6.
Figure 8:
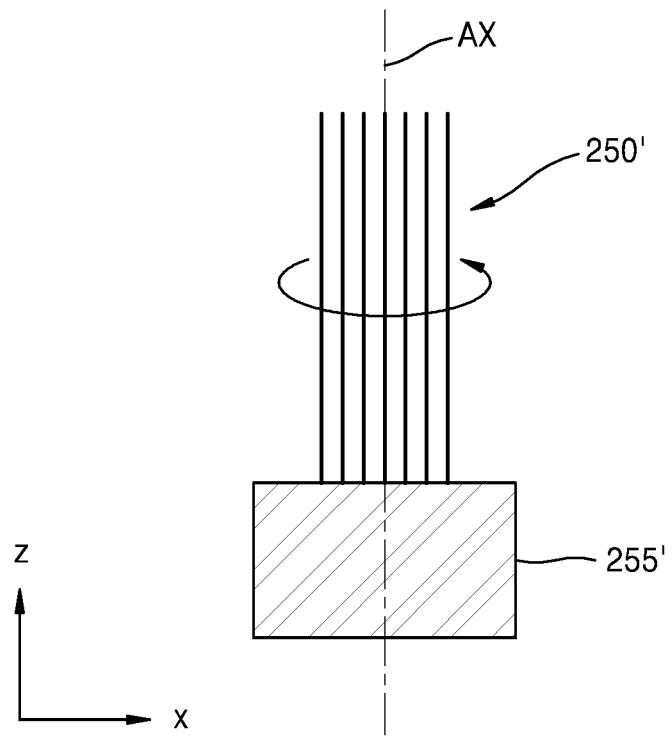
FIG. 8 is a diagram schematically showing a cleaning unit and a cleaning driving unit of the smoking member supporting device of FIG. 7.
Figure 9:
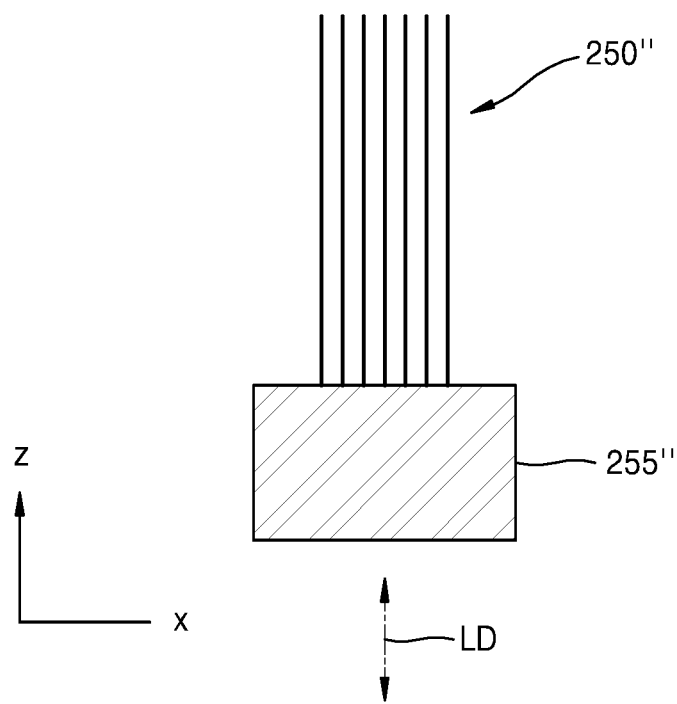
FIG. 9 is a diagram showing a modified example of FIG. 8.

FIG. 7 is a diagram schematically showing a modified example of the smoking member supporting device of FIG. 6, FIG. 8 is a diagram showing examples of a cleaning unit and a cleaning driving unit of FIG. 7, and FIG. 9 is a diagram showing a modified example of FIG. 8.

Referring to FIG. 7, a smoking member supporting device 200' may include a base unit 210', an accommodating unit 220', a hook unit 221', a connecting unit 230', a cleaning unit 250', and a cleaning driving unit 255'.

Since the base unit 210', the accommodating unit 220', the hook unit 221', and the connecting unit 230' of the present embodiment are identical to the base unit 210, the accommodating unit 220, the hook unit 221, and the connecting unit 230 of the embodiment described above with reference to FIGS. 5 and 6, detailed descriptions thereof will be omitted.

The cleaning unit 250 ' may be connected to the cleaning driving unit 255' and moved by the cleaning driving unit 255'.

For example, as shown in FIG. 8, the cleaning unit 250' may perform a rotational movement around a rotation axis AX by rotational driving of the cleaning driving unit 255'.

In some embodiments, the cleaning unit 250' may rotate at least one rotation, that is, at least 360 degrees.

In another example, the cleaning unit 250' may perform an angular movement of less than 360 degrees.

The rotation axis AX may be parallel to the lengthwise direction of the cleaning unit 250'. Also, the rotation axis AX may be parallel to the insertion groove HG. As a result, the cleaning unit 250' may clean the insertion groove HG in the insertion groove HU without leaving the insertion groove HG.

In particular, the cleaning of the insertion groove HG and the heater member HU may be easily performed through the rotational movement of the cleaning unit 250'.

In another example, referring to FIG. 9, the cleaning unit 250" may be connected to the cleaning driving unit 255" and moved by the cleaning driving unit 255". Specifically, the cleaning unit 250" may move in unidirectionally or bidirectionally in a movement direction LD by linear movement of the cleaning driving unit 255".

In some embodiments, the movement direction LD may be parallel to the lengthwise direction of the cleaning unit 250". Also, the movement direction LD may be parallel to the insertion groove HG. As a result, the cleaning unit 250" may clean the insertion groove HG in the insertion groove HU without leaving the insertion groove HG.

Also, although not shown, the movement of a cleaning unit through a cleaning driving unit may be in another form. For example, the cleaning of the insertion groove HG and the heater member HU may be performed easily through a vibration movement of the cleaning unit through the cleaning driving unit.

Although not shown or described in detail, the technical ideas of FIGS. 7 to 9 or the vibration movement of the cleaning unit according to an optional embodiment may be selectively applied to smoking member supporting device of the above-described embodiments and below embodiments.

Power for driving the cleaning driving units 255' and 255" may be supplied from an external power source.

Also, in another example, a separate power source may be included in the smoking member supporting device (e.g., in the base unit) for driving the cleaning driving units 255' and 255".

Figure 10:
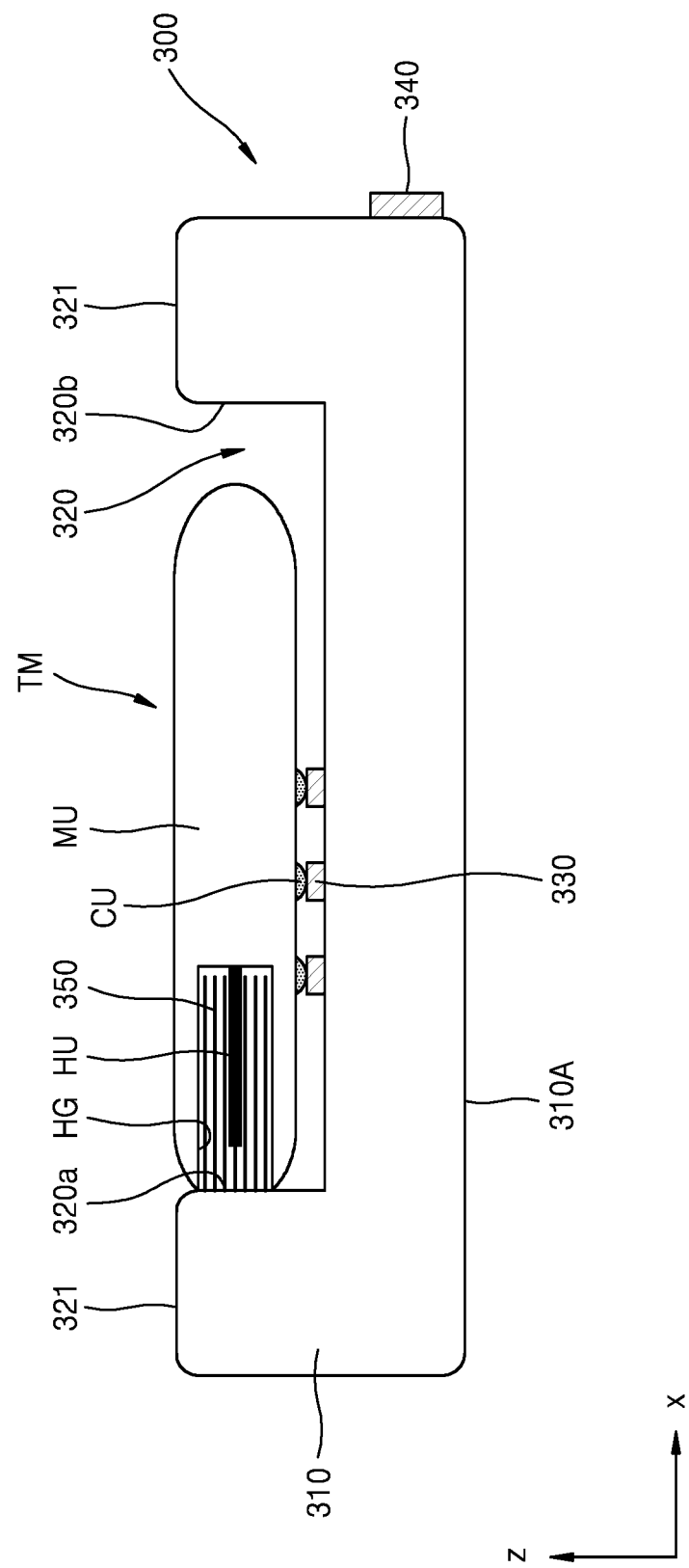
FIG. 10 is a diagram schematically showing a smoking member supporting device according to another embodiment of the present disclosure.

FIG. 10 is a diagram schematically showing a smoking member supporting device according to another embodiment of the present disclosure;

Referring to FIG. 10, a smoking member supporting device 300 according to the present embodiment may include a base unit 310, an accommodating unit 320, a hook unit 321, a connecting unit 330, and a cleaning unit 350.

Also, a state in which the smoking member TM is mounted on the smoking member supporting device 300 is shown.

The base unit 310 may have an arrangement surface 310A to arrange the smoking member supporting device 300 in an arrangement space.

The base unit 310 may have a long shape.

In some embodiments, the base unit 310 may have a length corresponding to or greater than that of the smoking member TM.

The accommodating unit 320 may be configured to accommodate a smoking member TM. The accommodating unit 320 may have a groove-like shape having a certain thickness or depth.

The accommodating unit 320 may have a long shape extending in one direction and, in some embodiments, the accommodating unit 320 may extend in a direction parallel to the lengthwise direction of the smoking member TM and have a length greater than that of the smoking member TM.

For example, the accommodating unit 320 may have a long shape extending in one direction and include a first end 320a and a second end 320b opposite to the first end 320a.

When the smoking member TM is accommodated in the accommodating unit 320, a first end of the smoking member TM in the lengthwise direction may face the first end 320a of the accommodating unit 320 and a second end of the smoking member TM in the lengthwise direction may face the second end 320b of the accommodating unit 320.

At this time, when the smoking member TM is accommodated in the accommodating unit 320, the first end or the second end of the smoking member TM in the lengthwise direction may be apart from the first end 320a or the second end 320b of the accommodating unit 320.

The hook unit 321 may be formed at an edge of the accommodating unit 320 and define the accommodating unit 320.

The accommodating unit 320 may accommodate the entire smoking member TM when the smoking member TM is accommodated therein, and thus the smoking member TM may not protrude out of the accommodating unit 320.

Also, in another example, a region of the smoking member TM may protrude out of the accommodating unit 320.

The connecting unit 330 may be arranged to face the smoking member TM when the smoking member TM is accommodated in the accommodating unit 320 to supply electrical energy to the smoking member TM.

The connecting unit 330 may be disposed on the bottom surface of the accommodating unit 320. and thus the connecting unit 330 may correspond to a side surface of the main body region MU of the smoking member TM.

In other words, the connecting unit 330 may correspond to the terminal region CU formed in the main body region MU. A plurality of connecting units 330 may be provided abd arranged in the accommodating unit 320, and the smoking member TM may also have a plurality of terminal regions CU in correspondence thereto.

The cleaning unit 350 may be formed to perform cleaning on the smoking member TM.

In detail, the cleaning unit 350 may be disposed in the accommodating unit 320 and have a shape corresponding to a space inside the smoking member TM.

In some embodiments, the cleaning unit 350 may have a brush-like shape and include a plurality of fiber strands. Here, the plurality of fiber strands may include various materials. For example, the plurality of fiber strands may include synthetic fiber-based materials like resins to have an appropriate strength to clean while contacting the space of the smoking member TM and to prevent or detect damage to the smoking member TM.

The cleaning unit 350 may extend from a side of the accommodating unit 320, e.g., the first end 320a, and may have a long shape extending from the first end 320a of the accommodating unit 320 toward the second end 320b.

The smoking member TM may have an insertion groove HG to be connected to one end of a main body region MU. A heater member HU may be disposed in the insertion groove HG.

The cleaning unit 350 may be formed to correspond to the insertion groove HG of the smoking member TM when the smoking member TM is accommodated in the accommodating unit 320.

To this end, when inserting the smoking member TM into the accommodating unit 320, a user may insert the smoking member TM into the accommodating unit 320 in a direction intersecting the lengthwise direction of the smoking member TM and then additionally move the smoking member TM toward the cleaning unit 350.

Since the cleaning process of the cleaning unit 350 and modifications thereof are the same as those described in the above-described embodiment, detailed descriptions thereof will be omitted.

In some embodiments, the smoking member supporting device 300 may further include a connecting unit 340.

The connecting unit 340 may be formed on one surface of the base unit 310, and more particularly, may be formed on an outer surface of the base unit 310 other than an arrangement surface 310A of the base unit 310. For example, the connecting unit 340 may be formed on a side surface of the base unit 310.

The connecting unit 340 may is a region connected to a separate external power source when the external power source is connected to the smoking member supporting device 300, and a cable may be connected to the connecting unit 340.

Also, although not shown, in another example, the smoking member supporting device 300 may include a connecting unit (not shown) formed inside the base unit 310, and the connecting unit (not shown) may be formed to be wirelessly connected to a separate external power source and receive power therefrom. In other words, the connecting unit may be formed to receive energy by communicating with an separate external power source wirelessly.

The smoking member supporting device according to the present embodiment may be easily placed in an arrangement space through an arrangement surface of a base unit.

For example, the base unit has a long shape extending in the lengthwise direction of the smoking member, and the accommodating unit also has a long shape corresponding thereto, such that one end of the smoking member in the lengthwise direction is faces one end of the accommodating unit and the other end of the smoking member in the lengthwise direction faces the other end of the accommodating unit. As a result, by inserting the smoking member into the accommodating unit in a direction intersecting the lengthwise direction of the smoking member, e.g., a direction perpendicular to the lengthwise direction of the smoking member, the smoking member may be more easily accommodated and more stably mounted.

Also, when the smoking member is accommodated in the accommodating unit, energy may be easily supplied to the smoking member through a connecting unit.

Accordingly, a user may mount a smoking member on a smoking member supporting device after smoking through the smoking member to supply energy to the smoking member and the user may easily smoke by taking out the smoking member from the smoking member supporting device when the user desires.

Also, the energy necessary for the charging of the smoking member and the pre-heating of the smoking member, that is, the process for raising the temperature of a heater provided in the smoking member may be supplied automatically through the smoking member supporting device or through a selection process. user convenience may be improved.

Also, an insertion groove and a heater member of a smoking member may be cleaned through a cleaning unit. For example, when a smoking member is mounted on a smoking member supporting device and no smoking process is performed, cleaning of the smoking member, and more particularly, cleaning of an insertion groove and a heater member may be easily performed. Therefore, convenience of using and maintaining a smoking member supporting device and the lifespan of the smoking member supporting device may be improved.

Figure 11:
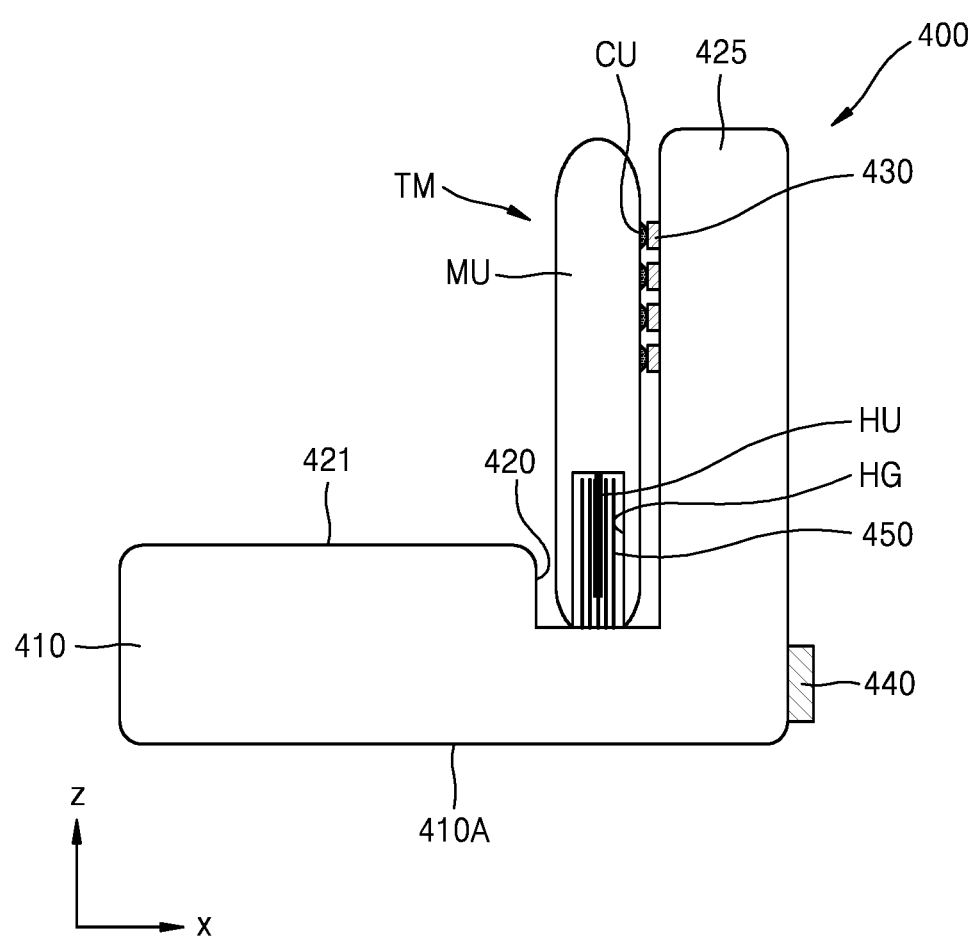
FIG. 11 is a diagram schematically showing a smoking member supporting device according to another embodiment of the present disclosure.

FIG. 11 is a diagram schematically showing a smoking member supporting device according to another embodiment of the present disclosure;

Referring to FIG. 11, a smoking member supporting device 400 according to the present embodiment may include a base unit 410, an accommodating unit 420, a hook unit 421, a supporting unit 425, a connecting unit 430, and a cleaning unit 450.

For convenience of explanation, descriptions below will focus on differences from the above-described embodiments.

The base unit 410 may have an arrangement surface 410A to arrange the smoking member supporting device 400 in an arrangement space.

The accommodating unit 420 may be configured to accommodate a smoking member TM. The accommodating unit 420 may have a groove-like shape having a certain thickness or depth.

The hook unit 421 may be formed at an edge of a region of the accommodating unit 420 and define regions of the accommodating unit 420.

When the smoking member TM is accommodated in the accommodating unit 420, one region of the smoking member TM may be accommodated in the accommodating unit 420 and the other region may be outside the accommodating unit 420.

The supporting unit 425 is connected to the base unit 410 and may have a long shape extending to correspond to the main body region MU of the smoking member TM when the smoking member TM is accommodated in the accommodating unit 420. For example, smoking member TM may have a shape that protrudes in the lengthwise direction of the smoking member TM when the smoking member TM is accommodated.

In some embodiments, the supporting unit 425 may be formed to be adjacent to one region of the accommodating unit 420. For example, the supporting unit 425 may be formed to correspond to at least one region from among regions of the accommodating unit 420 that does not correspond to the hook unit 421.

In some embodiments, the supporting unit 425 may have a shape protruding longer than the hook unit 421 in the lengthwise direction of the smoking member TM.

When the smoking member TM is mounted on the smoking member supporting device 400, the supporting unit 425 may correspond to the main body region MU of the smoking member TM. For example, the supporting unit 425 may protrude to have an appropriate length, such that the main body region MU does not exceed the supporting unit 425.

Accordingly, when the smoking member TM is accommodated in the accommodating unit 420, the supporting unit 425 may easily support the smoking member TM, may improve mounting stability by reducing or preventing movement, shaking, or detachment of the smoking member TM when the smoking member TM is mounted on the smoking member supporting device 400, and may improve the stability of power supply through the connecting unit 430.

The smoking member TM is accommodated in the accommodating unit 420 by inserting the smoking member TM into the accommodating unit 420 in a direction parallel to the lengthwise direction of a main body region MU of the smoking member TM, and thus the smoking member TM may be mounted on the smoking member supporting device 400.

For example, the accommodating unit 420 may have a groove-like shape having a depth in a direction parallel to the lengthwise direction of the smoking member TM, and the supporting unit 425 may have a long shape extending to correspond to at least one region of the main body region MU of the smoking member TM (in another example, an edge of the smoking member TM).

The connecting unit 430 may be arranged to face the smoking member TM when the smoking member TM is accommodated in the accommodating unit 420 to supply energy to the smoking member TM.

In some embodiments, the connecting unit 430 may be formed on a surface of the supporting unit 425.

When the smoking member TM is accommodated in the accommodating unit 420, the connecting unit 430 may be formed to correspond to the terminal region CU of the smoking member TM.

In other words, when the smoking member TM is accommodated in the accommodating unit 420, the depth of the accommodating unit 420, the position of the connecting unit 430 at the supporting unit 425, and the position and the size of the terminal region CU may be controlled, such that the connecting unit 430 corresponds to the terminal region CU without a further control of a user.

In some embodiments, magnetic force may be used to facilitate the correspondence between the connecting unit 430 and the terminal region CU. Details thereof are the same as those described in the above embodiments, and thus descriptions thereof will be omitted.

In some embodiments, a plurality of connecting units 430 may be arranged in the supporting unit 425, and the smoking member TM may also have a plurality of terminal regions CU in correspondence thereto.

Here, the smoking member TM may include the terminal regions CU in the main body region MU, wherein the terminal regions CU may not correspond to the insertion groove HG and may not overlap the heater member HU.

This facilitates the space control for designing circuits inside the terminal region CU and the smoking member TM connected thereto and may reduce the electrical influence on the heater member HU.

The cleaning unit 450 may be formed to perform cleaning on the smoking member TM.

In detail, the cleaning unit 450 may be disposed in the accommodating unit 420 and have a shape corresponding to a space inside the smoking member TM.

In some embodiments, the cleaning unit 450 may have a brush-like shape and include a plurality of fiber strands. Here, the plurality of fiber strands may include various materials. For example, the plurality of fiber strands may include synthetic fiber-based materials like resins to have an appropriate strength to clean while contacting the space of the smoking member TM and to prevent or detect damage to the smoking member TM.

Embodiments and modifications of the cleaning unit 450, the cleaning through the cleaning unit 450, and the driving of the cleaning unit 450 are the same as those described above, and thus detailed descriptions thereof will be omitted.

In some embodiments, the smoking member supporting device 400 may further include a connecting unit 440.

The connecting unit 440 may be formed on one surface of the base unit 410, and more particularly, may be formed on an outer surface of the base unit 410 other than an arrangement surface 410A of the base unit 410. For example, the connecting unit 440 may be formed on a side surface of the base unit 410.

The connecting unit 440 may is a region connected to a separate external power source when the external power source is connected to the smoking member supporting device 400, and a cable may be connected to the connecting unit 440.

Also, although not shown, in another example, the smoking member supporting device 400 may include a connecting unit (not shown) formed inside the base unit 410, and the connecting unit (not shown) may be formed to be wirelessly connected to a separate external power source and receive power therefrom. In other words, the connecting unit may be formed to receive energy by communicating with an separate external power source wirelessly.

The smoking member supporting device according to the present embodiment may be easily placed in an arrangement space through an arrangement surface of a base unit. Also, a smoking member may be accommodated in an accommodating unit to easily mount the smoking member to the smoking member supporting device.

Also, when the smoking member is accommodated in the accommodating unit, energy may be easily supplied to the smoking member through a connecting unit.

Accordingly, a user may mount a smoking member on a smoking member supporting device after smoking through the smoking member to supply energy to the smoking member and the user may easily smoke by taking out the smoking member from the smoking member supporting device when the user desires.

Also, after the smoking member is accommodated in the accommodating unit, the smoking member may be easily and stably mounted through a hook unit. As one region of the smoking member is accommodated in the accommodating unit and the other region of the smoking member is exposed to the outside, the smoking member may be easily mounted on the smoking member mounting device and may be easily detached from the smoking member supporting device.

Also, the supporting unit is formed to be adjacent to another region of the accommodating unit, and the supporting unit protrudes to correspond to the main body region of the smoking member, thereby reducing or preventing the smoking member from being detached or unnecessarily moved when the smoking member is mounted on the smoking member mounting device.

Also, the energy necessary for the charging of the smoking member and the pre-heating of the smoking member, that is, the process for raising the temperature of a heater provided in the smoking member may be supplied automatically through the smoking member supporting device or through a selection process. user convenience may be improved.

Also, an insertion groove and a heater member of a smoking member may be cleaned through a cleaning unit. For example, when a smoking member is mounted on a smoking member supporting device and no smoking process is performed, cleaning of the smoking member, and more particularly, cleaning of an insertion groove and a heater member may be easily performed. Therefore, convenience of using and maintaining a smoking member supporting device and the lifespan of the smoking member supporting device may be improved.

In addition, embodiments and modifications of the cleaning unit and driving thereof described above with reference to FIGS. 7 to 9 may be selectively applied.

Figure 12:
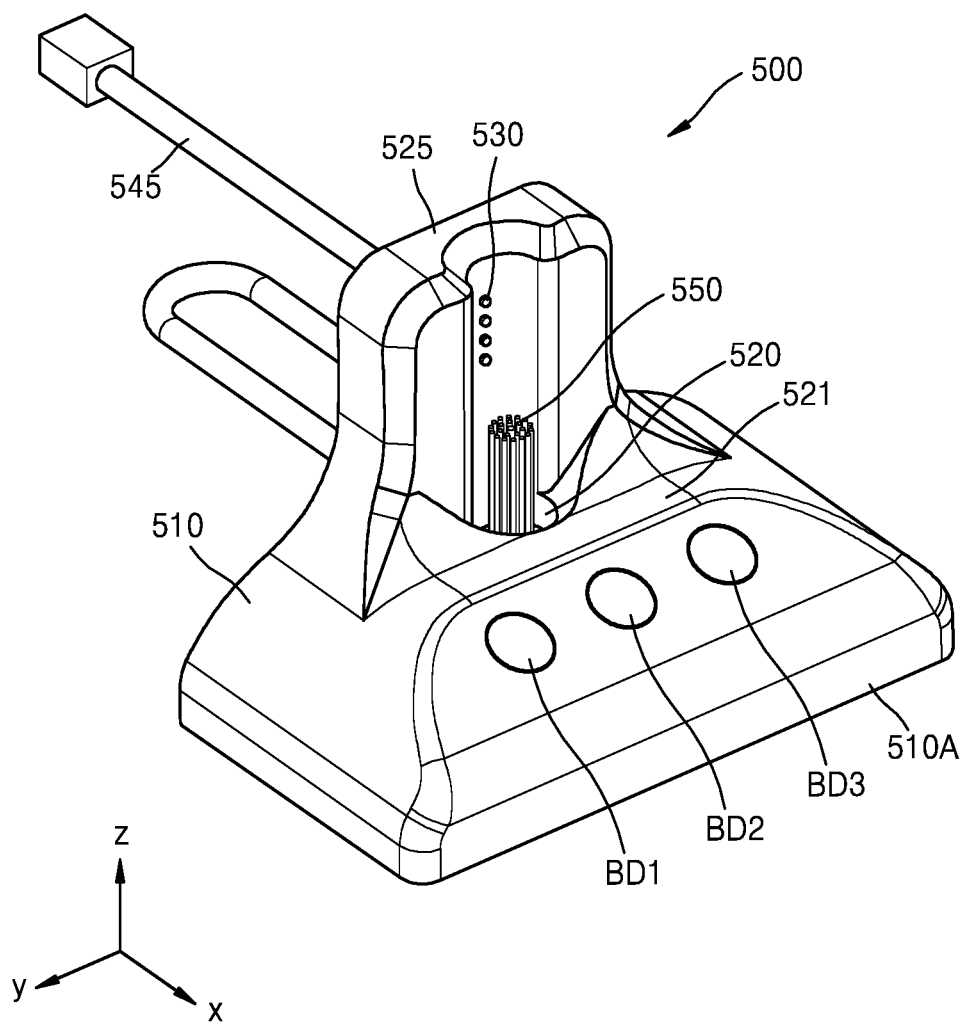
FIG. 12 is a perspective diagram schematically showing a smoking member supporting device according to another embodiment of the present disclosure.
Figure 13:
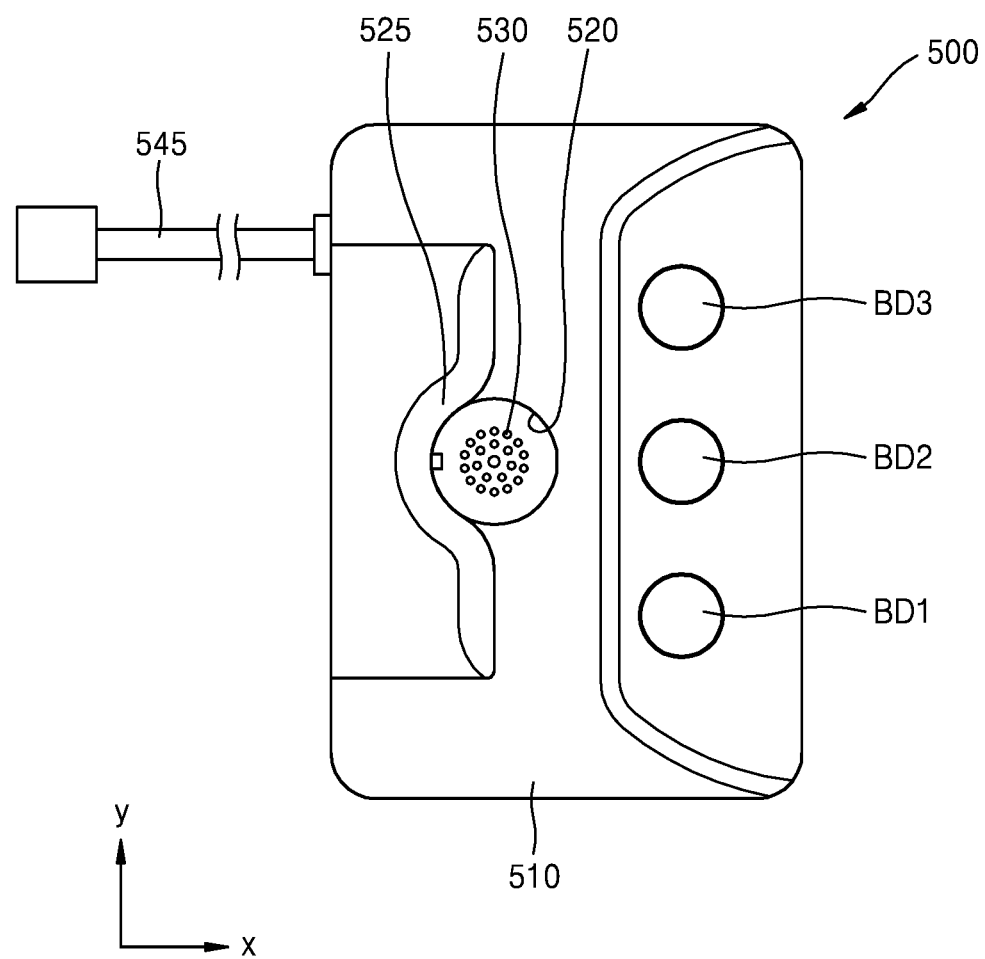
FIG. 13 is a plan view of the smoking member supporting device of FIG. 12 viewed in one direction.

FIG. 12 is a schematic perspective view of a smoking member supporting device according to another embodiment of the present disclosure, and FIG. 13 is a plan view of the smoking member supporting device of FIG. 12 viewed in one direction.

Figure 14:
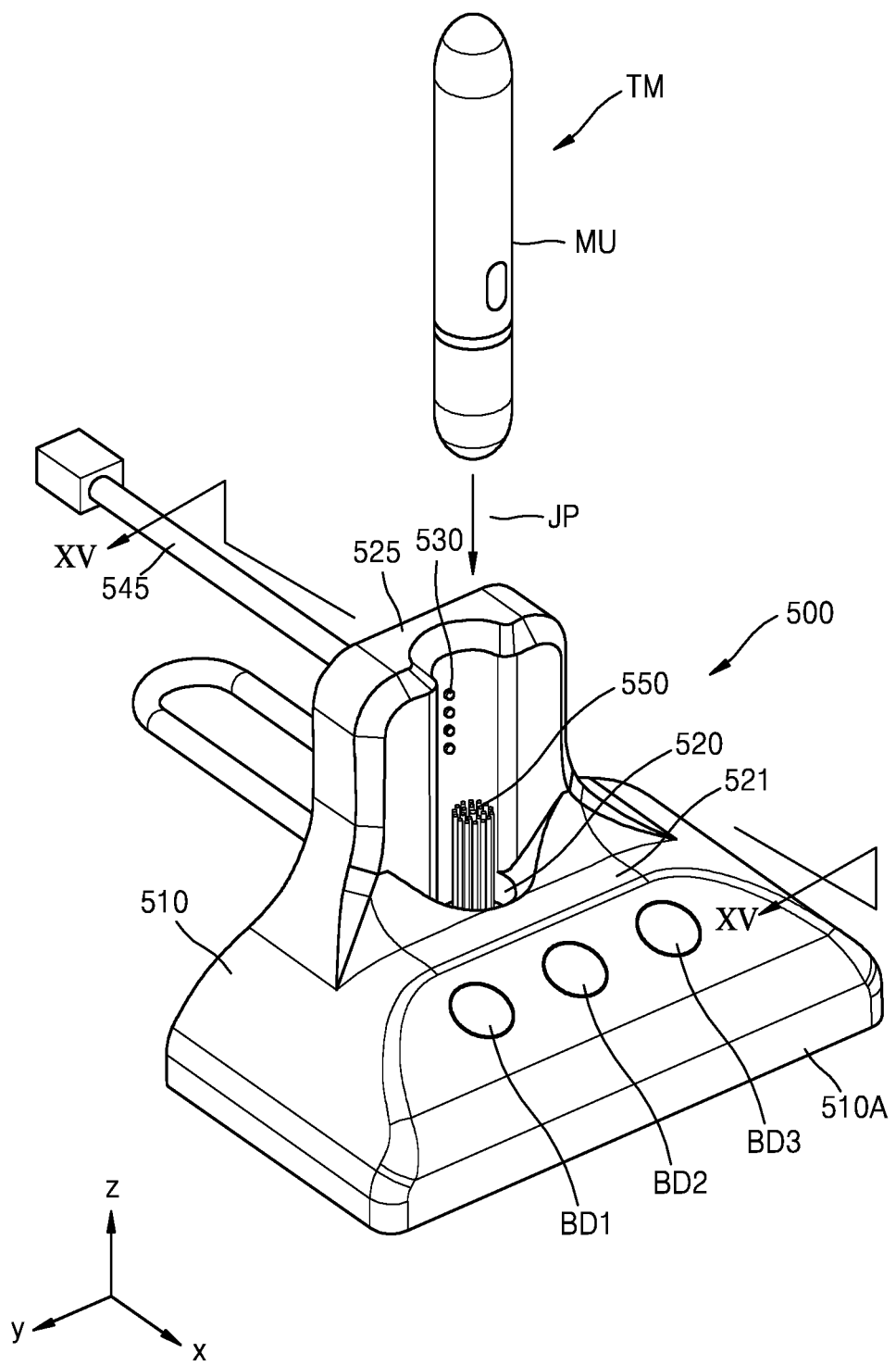
FIG. 14 is a diagram for describing a process for mounting a smoking member on the smoking member supporting device of FIG. 12.
Figure 15:
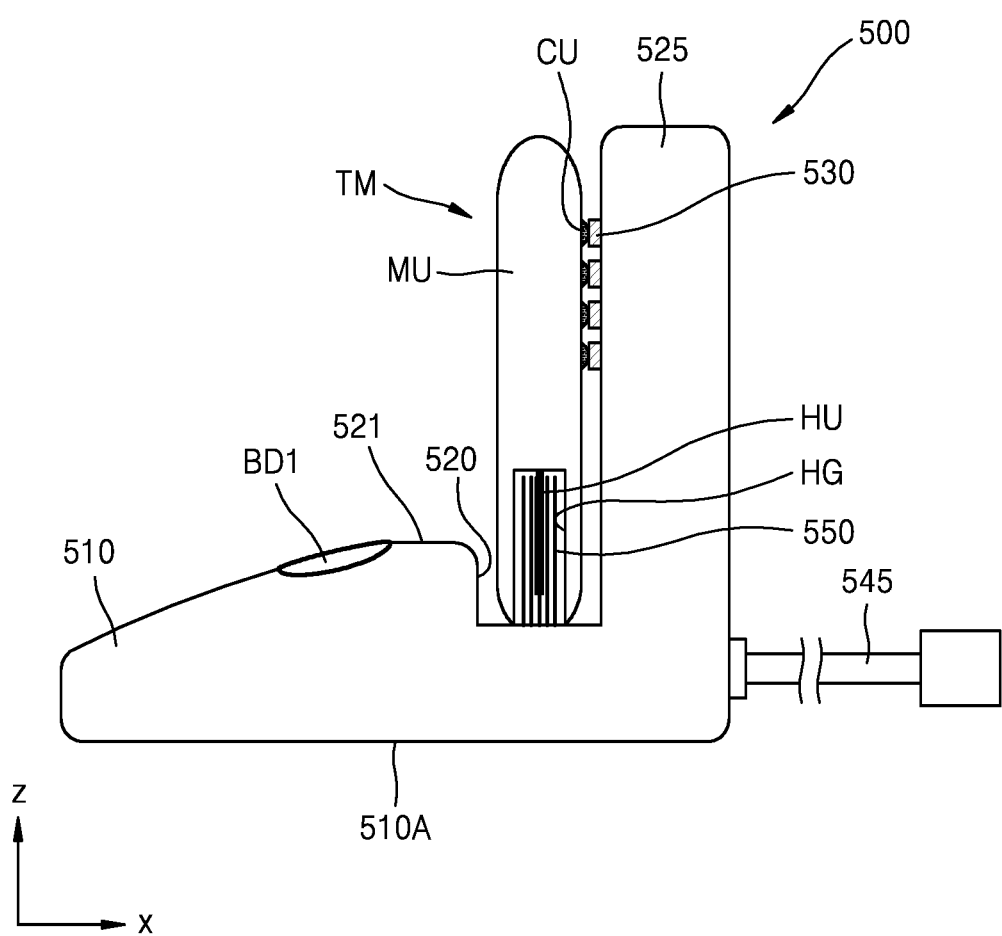
FIG. 15 is a cross-sectional view taken along a line XV-XV of FIG. 14.

FIG. 14 is a diagram for describing a process for mounting a smoking member on the smoking member supporting device of FIG. 12, and FIG. 15 is a cross-sectional view taken along a line XV-XV of FIG. 14.

Referring to FIG. 14, a smoking member supporting device 500 according to the present embodiment may include a base unit 510, an accommodating unit 520, a hook unit 521, a supporting unit 525, a connecting unit 530, and a cleaning unit 550.

For convenience of explanation, descriptions below will focus on differences from the above-described embodiments.

The base unit 510 may have an arrangement surface 510A to arrange the smoking member supporting device 500 in an arrangement space. The base unit 510 may include various buttons, which are selection buttons for user convenience and may include one or more selection buttons BD1, BD2, and BD3. Detailed descriptions of the selection buttons BD1, BD2, and BD3 will be given below.

The accommodating unit 520 may be configured to accommodate a smoking member TM. The accommodating unit 520 may have a groove-like shape having a certain thickness or depth.

The hook unit 521 may be formed at an edge of a region of the accommodating unit 520 and define regions of the accommodating unit 520.

When the smoking member TM is accommodated in the accommodating unit 520, one region of the smoking member TM may be accommodated in the accommodating unit 520 and the other region may be outside the accommodating unit 520.

The supporting unit 525 is connected to the base unit 510 and may have a long shape extending to correspond to the main body region MU of the smoking member TM when the smoking member TM is accommodated in the accommodating unit 520. For example, smoking member TM may have a shape that protrudes in the lengthwise direction of the smoking member TM when the smoking member TM is accommodated.

In some embodiments, the supporting unit 525 may be formed to be adjacent to one region of the accommodating unit 520. For example, the supporting unit 525 may be formed to correspond to at least one region from among regions of the accommodating unit 520 that does not correspond to the hook unit 521.

In some embodiments, the supporting unit 525 may have a shape protruding longer than the hook unit 521 in the lengthwise direction of the smoking member TM.

Also, in some embodiments, the supporting unit 525 may have a side surface having a shape corresponding to that of the smoking member TM. For example, when the smoking member TM has a curved side surface, the supporting unit 525 may also have a concave side surface in correspondence to the curved side surface of the smoking member TM.

When the smoking member TM is mounted on the smoking member supporting device 500, the supporting unit 525 may correspond to the main body region MU of the smoking member TM. For example, the supporting unit 525 may protrude to have an appropriate length, such that the main body region MU does not exceed the supporting unit 525.

Accordingly, when the smoking member TM is accommodated in the accommodating unit 520, the supporting unit 525 may easily support the smoking member TM, may improve mounting stability by reducing or preventing movement, shaking, or detachment of the smoking member TM when the smoking member TM is mounted on the smoking member supporting device 500, and may improve the stability of power supply through the connecting unit 530.

The smoking member TM is accommodated in the accommodating unit 520 by inserting the smoking member TM into the accommodating unit 520 in a direction parallel to the lengthwise direction of a main body region MU of the smoking member TM, and thus the smoking member TM may be mounted on the smoking member supporting device 500.

For example, the accommodating unit 520 may have a groove-like shape having a depth in a direction parallel to the lengthwise direction of the smoking member TM, and the supporting unit 525 may have a long shape extending to correspond to at least one region of the main body region MU of the smoking member TM (in another example, an edge of the smoking member TM).

The connecting unit 530 may be arranged to face the smoking member TM when the smoking member TM is accommodated in the accommodating unit 520 to supply energy to the smoking member TM.

In some embodiments, the connecting unit 530 may be formed on a surface of the supporting unit 525.

When the smoking member TM is accommodated in the accommodating unit 520, the connecting unit 530 may be formed to correspond to the terminal region CU of the smoking member TM.

In other words, when the smoking member TM is accommodated in the accommodating unit 520, the depth of the accommodating unit 520, the position of the connecting unit 430 at the supporting unit 525, and the position and the size of the terminal region CU may be controlled, such that the connecting unit 530 corresponds to the terminal region CU without a further control of a user.

In some embodiments, magnetic force may be used to facilitate the correspondence between the connecting unit 530 and the terminal region CU. Details thereof are the same as those described in the above embodiments, and thus descriptions thereof will be omitted.

In some embodiments, a plurality of connecting units 530 may be arranged in the supporting unit 525, and the smoking member TM may also have a plurality of terminal regions CU in correspondence thereto.

Here, the smoking member TM may include the terminal regions CU in the main body region MU, wherein the terminal regions CU may not correspond to the insertion groove HG and may not overlap the heater member HU.

This facilitates the space control for designing circuits inside the terminal region CU and the smoking member TM connected thereto and may reduce the electrical influence on the heater member HU.

The cleaning unit 550 may be formed to perform cleaning on the smoking member TM.

In detail, the cleaning unit 550 may be disposed in the accommodating unit 520 and have a shape corresponding to a space inside the smoking member TM.

In some embodiments, the cleaning unit 550 may have a brush-like shape and include a plurality of fiber strands. Here, the plurality of fiber strands may include various materials. For example, the plurality of fiber strands may include synthetic fiber-based materials like resins to have an appropriate strength to clean while contacting the space of the smoking member TM and to prevent or detect damage to the smoking member TM.

Embodiments and modifications of the cleaning unit 550, the cleaning through the cleaning unit 550, and the driving of the cleaning unit 550 are the same as those described above, and thus detailed descriptions thereof will be omitted.

The selection buttons BD1, BD2, and BD3 may be formed to perform various operations of a user.

For example, a selection button BD1 may be a cleaning driving button. When the user selects the selection button BD1, the cleaning unit 550 is driven, for example, to initiate a rotational movement, a linear movement or a vibration movement as described above to clean the smoking member TM, and more particularly, to clean the insertion groove HG and the heater member HU.

A selection button BD2 may be a pre-heating start button. When the user selects the selection button BD2, a pre-heating process for the smoking member TM, e.g., a pre-heating process for the heater member HG, may be performed.

A charging process may be performed without a separate selection when the smoking member TM is accommodated in the accommodating unit 520 and the terminal region CU of the smoking member TM and the connecting unit 530 correspond to each other. In another example, a separate button may be included for receiving selections of a user.

In some embodiments, a selection button BD3 may be provided, which may be a setting button. A user may pre-set times and conditions for combinations of a cleaning using the cleaning unit 550 and a pre-heating process by using the selection button BD3.

For convenience of such an operation, a display region (not shown) may be included on one surface of the base unit 510, and the user may pre-set conditions of each operation through the selection button BD3 while looking at the display area. Also, it is possible to check the progress time and the completion time or the remaining time during a pre-heating operation or a cleaning operation.

In some embodiments, the smoking member supporting device 500 may further include a connecting unit 545.

The connecting member 545 may be connected to one surface of the base unit 510 and one end of the connecting member 545 may be connected to a separate external power source. In other words, the connecting member 545 may be a cable through which a current flows and may have various terminals.

The smoking member supporting device according to the present embodiment may be easily placed in an arrangement space through an arrangement surface of a base unit. Also, a smoking member may be accommodated in an accommodating unit to easily mount the smoking member to the smoking member supporting device.

Also, when the smoking member is accommodated in the accommodating unit, energy may be easily supplied to the smoking member through a connecting unit.

Accordingly, a user may mount a smoking member on a smoking member supporting device after smoking through the smoking member to supply energy to the smoking member and the user may easily smoke by taking out the smoking member from the smoking member supporting device when the user desires.

Also, after the smoking member is accommodated in the accommodating unit, the smoking member may be easily and stably mounted through a hook unit. As one region of the smoking member is accommodated in the accommodating unit and the other region of the smoking member is exposed to the outside, the smoking member may be easily mounted on the smoking member mounting device and may be easily detached from the smoking member supporting device.

Also, the supporting unit is formed to be adjacent to another region of the accommodating unit, and the supporting unit protrudes to correspond to the main body region of the smoking member, thereby reducing or preventing the smoking member from being detached or unnecessarily moved when the smoking member is mounted on the smoking member mounting device.

Also, when the smoking member has a curved outer surface, in some embodiments, the supporting unit may stably support the smoking member by having a concave region corresponding to the smoking member in the supporting unit.

Also, the energy necessary for the charging of the smoking member and the pre-heating of the smoking member, that is, the process for raising the temperature of a heater provided in the smoking member may be supplied automatically through the smoking member supporting device or through a selection process. user convenience may be improved.

Also, an insertion groove and a heater member of a smoking member may be cleaned through a cleaning unit. For example, when a smoking member is mounted on a smoking member supporting device and no smoking process is performed, cleaning of the smoking member, and more particularly, cleaning of an insertion groove and a heater member may be easily performed. Therefore, convenience of using and maintaining a smoking member supporting device and the lifespan of the smoking member supporting device may be improved.

On the other hand, at least one of the above embodiments may be applied to various modifications. These modifications will be described in detail.

Figure 16:
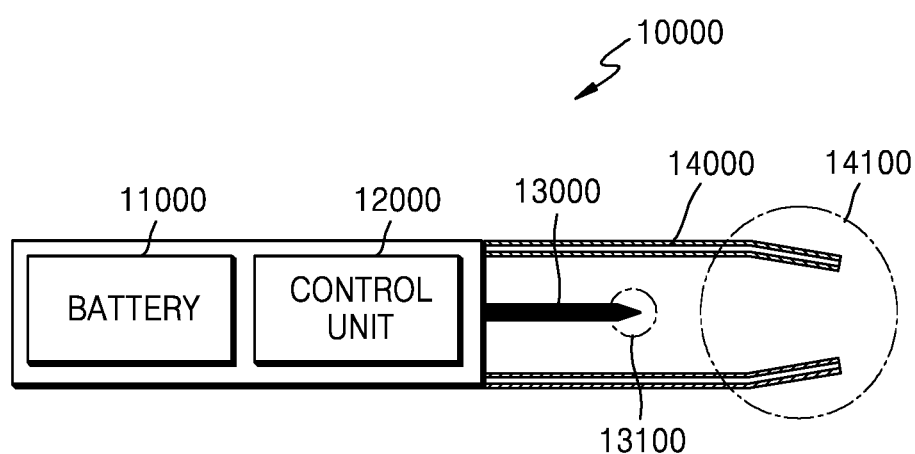
FIG. 16 is a block diagram showing an example of an aerosol generating apparatus.

Referring to FIG. 16, an aerosol generating apparatus 10000 (hereinafter referred to as a 'holder') includes a battery 11000, a control unit 12000, and a heater 13000. The holder 10000 also includes an inner space formed by a casing 14000. A cigarette may be inserted into the inner space of the holder 10000.

In some embodiments, the holder 10000 may correspond to the smoking member TM in the above-described embodiments.

Only components associated with the present embodiment are shown in the holder 10000 shown in FIG. 16. Therefore, it will be understood by one of ordinary skill in the art that general components other than the components shown in FIG. 16 may be further included in the holder 10000.

When a cigarette is inserted into the holder 10000, the holder 10000 heats the heater 13000. The temperature of an aerosol generating material in the cigarette is raised by the heated heater 13000, and thus aerosol is generated. The generated aerosol is delivered to a user through a cigarette filter. However, even when a cigarette is not inserted into the holder 10000, the holder 10000 may heat the heater 13000.

The casing 14000 may be detached from the holder 10000. For example, when a user rotates the casing 14000 clockwise or counterclockwise, the casing 14000 may be detached from the holder 10000.

The diameter of a hole formed by a terminal end 14100 of the casing 14000 may be smaller than the diameter of a space formed by the casing 14000 and the heater 13000. In this case, the hole may serve as a guide for a cigarette inserted into the holder 10000.

The battery 11000 supplies power used for the holder 10000 to operate. For example, the battery 11000 may supply power for heating the heater 13000 and supply power for operating the control unit 12000. In addition, the battery 11000 may supply power for operating a display, a sensor, a motor, and the like installed in the holder 10000.

The battery 11000 may be a lithium iron phosphate (LiFePO$_4$) battery, but is not limited to the example described above. For example, the battery 11000 may be a lithium cobalt oxide (LiCoO$_2$) battery, a lithium titanate battery, etc.

Also, the battery 11000 may have a cylindrical shape having a diameter of 10 mm and a length of 37 mm, but is not limited thereto. The capacity of the battery 11000 may be 120 mAh or more, and the battery 11000 may be a rechargeable battery or a disposable battery. For example, when the battery 11000 is rechargeable, the charging rate (C-rate) of the battery 11000 may be 10 C and the discharging rate (C-rate) may be 16 C to 20 C. However, the present disclosure is not limited thereto. Also, for stable use, the battery 11000 may be manufactured, such that 80% or more of the total capacity may be ensured even when charging/discharging are performed 8000 times.

Here, it may be determined whether the battery 11000 is fully charged or completely discharged based on a level of power stored in the battery 11000 as compared to the entire capacity of the battery 11000. For example, when power stored in the battery 11000 is equal to or more than 95% of the total capacity, it may be determined that the battery 11000 is fully charged. Furthermore, when power stored in the battery 11000 is 10% or less of the total capacity, it may be determined that the battery 11000 is completely discharged. However, the criteria for determining whether the battery 11000 is fully charged or completely discharged are not limited to the above examples.

The heater 13000 is heated by power supplied from the battery 11000. When a cigarette is inserted into the holder 10000, the heater 13000 is located inside the cigarette. Therefore, the heated heater 13000 may raise the temperature of an aerosol generating material in the cigarette.

The shape of the heater 13000 may be a combination of a cylindrical shape and a conical shape. For example, the heater 13000 may have a cylindrical shape with a diameter of about 2 mm and a length of about 23 mm, and the terminal end 13100 of the heater 13000 may have an acute shape, but the present disclosure is not limited thereto. In other words, the heater 13000 may have any shape as long as the heater 130 may be inserted into the cigarette. In addition, only a portion of the heater 13000 may be heated. For example, assuming that the length of the heater 13000 is 23 mm, only 12 mm from the terminal end 13100 of the heater 13000 may be heated, and the remaining portion of the heater 13000 may not be heated.

The heater 13000 may be an electro-resistive heater. For example, the heater 13000 includes an electrically conductive track, and the heater 13000 may be heated as a current flows through the electrically conductive track.

For stable use, the heater 13000 may be supplied with power according to the specifications of 3.2 V, 2.4 A, and 8 W, but is not limited thereto. For example, when power is supplied to the heater 13000, the surface temperature of the heater 13000 may rise to 400° C. or higher. The surface temperature of the heater 13000 may rise to about 350° C. before 15 seconds after the power supply to the heater 13000 starts.

The holder 10000 may be provided with a separate temperature sensor. Alternatively, the holder 10000 may not be provided with a temperature sensing sensor, and the heater 13000 may serve as a temperature sensing sensor. For example, the heater 13000 may further include a second electrically conductive track for temperature sensing in addition to the first electrically conductive track for generating heat.

For example, when a voltage applied to the second electrically conductive track and a current flowing through the second electrically conductive track are measured, a resistance R may be determined. At this time, a temperature T of the second electrically conductive track may be determined by Equation 1 below.

$$R=R_0\{1+\alpha(T-T_0)\} \quad \text{[Equation 1]}$$

In Equation 1, R denotes a current resistance value of the second electrically conductive track, $R_0$ denotes a resistance value at a temperature $T_0$ (e.g., 0° C.), and a denotes a resistance temperature coefficient of the second electrically conductive track. Since conductive materials (e.g., metals) have inherent resistance temperature coefficients, a may be determined in advance according to a conductive material constituting the second electrically conductive track. Therefore, when the resistance R of the second electrically conductive track is determined, the temperature T of the second electrically conductive track may be calculated according to Equation 1.

The heater 13000 may include at least one electrically conductive track (a first electrically conductive track and a second electrically conductive track). For example, the heater 13000 may include, but is not limited to, two first electrically conductive tracks and one or two second electrically conductive tracks.

An electrically conductive track includes an electro-resistive material. For example, an electrically conductive track may include a metal. In another example, an electrically conductive track may include an electrically conductive ceramic material, a carbon, a metal alloy, or a composite of a ceramic material and a metal.

In addition, the holder 10000 may include both an electrically conductive track, which serve as temperature sensing sensors, and a temperature sensing sensor.

The control unit 12000 controls the overall operation of the holder 10000. Specifically, the control unit 12000 controls not only operations of the battery 11000 and the heater 13000, but also operations of other components included in the holder 10000. The control unit 12000 may also check the status of each of the components of the holder 10000 and determine whether the holder 10000 is in an operable state.

The control unit 12000 includes at least one processor. A processor may be implemented as an array of a plurality of logic gates or may be implemented as a combination of a general purpose microprocessor and a memory in which a program executable in the microprocessor is stored. It will be understood by one of ordinary skill in the art that the present disclosure may be implemented in other forms of hardware.

For example, the control unit 12000 may control the operation of the heater 13000. The control unit 12000 may control an amount of power supplied to the heater 13000 and a time for supplying the power, such that the heater 13000 may be heated to a predetermined temperature or maintained at a proper temperature. The control unit 12000 may also check the status of the battery 11000 (e.g., the remaining amount of the battery 11000) and generate a notification signal as occasions demand.

Also, the control unit 12000 may check the presence or absence of a user's puff, check the strength of the puff, and count the number of puffs. Also, the control unit 12000 may continuously check the time during which the holder 10000 is operating. Also, the control unit 12000 may check whether the cradle 20000, which will be described below, is coupled with the holder 10000 and control the operation of the holder 10000 according to coupling or separation of the cradle 20000 and the holder 10000. can do.

Meanwhile, the holder 10000 may further include general-purpose components other than the battery 11000, the control unit 12000, and the heater 13000.

For example, the holder 10000 may include a display capable of outputting visual information or a motor for outputting tactile information. For example, when a display is included in the holder 10000, the control unit 12000 may provide a user information about the state of the holder 10000 (e.g., availability of the holder, etc.), information about the heater 13000 (e.g., start of preheating, progress of preheating, completion of preheating, etc.), information about the battery 11000 (e.g., remaining power of the battery 11000, availability, etc.), information about resetting of the holder 10000 (e.g., reset timing, reset progress, reset completion, etc.), information about cleaning of the holder 10000 (e.g., cleaning timing, cleaning progress, cleaning completion, etc.), information about charging of the holder 10000 (e.g., need of charging, charging progress, charging completed, etc.), information about puff (e.g., the number of puffs, notification of expected completion of puffs, etc.), or information about safety (e.g., time of use, etc.) via the display. In another example, when a motor is included in the holder 10000, the control unit 12000 may transmit the above-described information to a user by generating a vibration signal by using the motor.

The holder 10000 may also include a terminal coupled with at least one input device (e.g., a button) and/or the cradle 20000 through which a user may control the function of the holder 10000. For example, a user may perform various functions by using the input device of the holder 10000. By adjusting the number of times a user presses the input device (e.g., once, twice, etc.) or the time during which the input device is being pressed (e.g., 0.1 second, 0.2 second, etc.), a desired function from among a plurality of functions of the holder 10000 may be executed. As a user manipulates the input device, the holder 10000 may perform a function of preheating the heater 13000, a function of regulating the temperature of the heater 13000, a function of cleaning the space in which a cigarette is inserted, a function of checking whether the battery 11000 is in an operable state, a function of displaying the remaining power (available power) of the battery 11000, a function of resetting the holder 10000, etc. However, the functions of the holder 10000 are not limited to the examples described above.

The holder 10000 may also include a puff detecting sensor, a temperature sensing sensor, and/or a cigarette insertion detecting sensor. For example, the puff detecting sensor may be implemented by a common pressure sensor, and the cigarette insertion detecting sensor may be implemented by a common capacitive sensor or a resistance sensor. Also, the holder 10000 may be fabricated to have a structure in which the outside air may flow in/out even in the state where the cigarette is inserted.

Figure 17A:
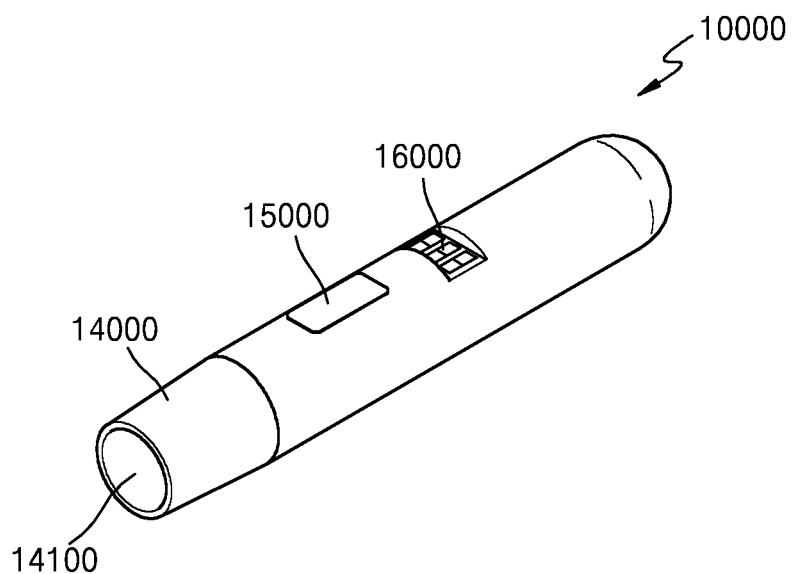
FIGS. 17A and 17B are diagrams showing various views of an example of a holder.
Figure 17B:
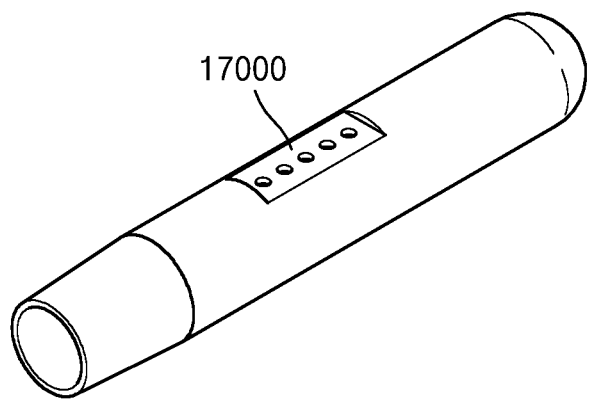

FIGS. 17A and 17B are diagrams showing various views of an example of a holder.

FIG. 17A is a diagram showing an example of the holder 10000 viewed in a first direction. As shown in FIG. 17A, the holder 10000 may be fabricated to have a cylindrical shape, but the present disclosure is not limited thereto. The casing 14000 of the holder 10000 may be separated by an action of a user and a cigarette may be inserted into an terminal end 14100 of the casing 14000. The holder 10000 may also include a button 150 for a user to control the holder 10000 and a display 160 for outputting an image.

FIG. 17B is a diagram showing an example of the holder 10000 viewed in a second direction. The holder 10000 may include a terminal 17000 coupled with the cradle 20000. As the terminal 17000 of the holder 10000 is coupled with the terminal 26000 of the cradle 20000, the battery 11000 of the holder 10000 may be charged by power supplied by the battery 21000 of the cradle 20000. Also, the holder 10000 may be operated by power supplied from the battery 21000 of the cradle 20000 through the terminal 17000 and the terminal 26000 and a communication (transmission/reception of signals) may be performed between the holder 10000 and the cradle 20000 through the terminal 17000 and the terminal 26000. For example, the terminal 17000 may include four micro pins, but the present disclosure is not limited thereto.

Figure 18:
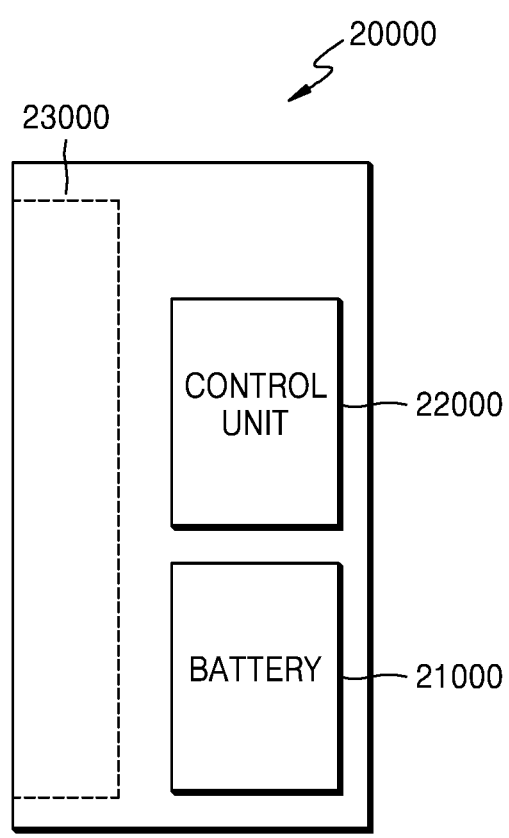
FIG. 18 is a diagram showing an example configuration of a cradle.

FIG. 18 is a diagram showing an example configuration of a cradle.

Referring to FIG. 18, the cradle 20000 includes the battery 21000 and a control unit 22000. The cradle 20000 also includes an inner space 23000 into which the holder 10000 may be inserted. For example, the inner space 23000 may be formed on one side of the cradle 20000. Therefore, the holder 10000 may be inserted and fixed in the cradle 20000 even when the cradle 20000 does not include a separate lid.

Only components associated with the present embodiment are shown in the cradle 20000 shown in FIG. 18. Therefore, it will be understood by one of ordinary skill in the art that general-purpose components other than the components shown in FIG. 18 may be further included in the cradle 20000.

The battery 21000 provides power used to operate the cradle 20000. In addition, the battery 21000 may supply power for charging the battery 11000 of the holder 10000. For example, when the holder 10000 is inserted into the cradle 20000 and the terminal 17000 of the holder 10000 is coupled with the terminal 26000 of the cradle 20000, the battery 21000 of the cradle 20000 may supply power to the battery 11000 of the holder 10000.

Also, when the holder 10000 is coupled with the cradle 20000, the battery 21000 may supply power used for the holder 10000 to operate. For example, when the terminal 17000 of the holder 10000 is coupled with the terminal 26000 of the cradle 20000, the holder 10000 may operate by using power supplied by the battery 21000 of the cradle 20000 regardless whether the battery 11000 of the holder 10000 is discharged.

An example of the type of the battery 21000 may be the same as the example of the battery 11000 described above with reference to FIG. 16. The capacity of the battery 21000 may be greater than the capacity of the battery 11000. For example, the capacity of the battery 21000 may be, but is not limited to, 3000 mAh or greater.

The control unit 22000 generally controls the overall operation of the cradle 20000. The control unit 22000 may control the overall operation of all the configurations of the cradle 20000. The control unit 22000 may also determine whether the holder 10000 is coupled with the cradle 20000 and control the operation of the cradle 20000 according to coupling or separation of the cradle 20000 and the holder 10000.

For example, when the holder 10000 is coupled with the cradle 20000, the control unit 22000 may supply power of the battery 21000 to the holder 10000, thereby charging the battery 11000 or heating the heater 13000. Therefore, even when remaining power of the battery 11000 is low, a user may continuously smoke by coupling the holder 10000 with the cradle 20000.

The control unit 12000 includes at least one processor. A processor may be implemented as an array of a plurality of logic gates or may be implemented as a combination of a general purpose microprocessor and a memory in which a program executable in the microprocessor is stored. It will be understood by one of ordinary skill in the art that the present disclosure may be implemented in other forms of hardware.

Meanwhile, the cradle 20000 may further include general-purpose components other than the battery 21000 and the control unit 22000. For example, cradle 20000 may include a display capable of outputting visual information. For example, when the cradle 20000 includes a display, the control unit 22000 generates a signal to be displayed on the display, thereby informing a user information regarding the battery 21000 (e.g., the remaining power of the battery 21000, availability of the battery 21000, etc.), information regarding resetting of the cradle 20000 (e.g., reset timing, reset progress, reset completion, etc.), information regarding cleaning of the holder 10000 (e.g., cleaning timing, cleaning necessity, cleaning progress, cleaning completion, etc.), information regarding charging of the cradle 20000 (e.g., charging necessity, charging progress, charging completion, etc.).

The cradle 20000 may also include at least one input device (e.g., a button) for a user to control the function of the cradle 20000, a terminal 26000 to be coupled with the holder 10000, and/or an interface for charging the battery 21000 (e.g., an USB port, etc.).

For example, a user may perform various functions by using the input device of the cradle 20000. By controlling the number of times that a user presses the input device or a period of time for which the input device is pressed, a desired function from among the plurality of functions of the cradle 20000 may be executed. As a user manipulates the input device, the cradle 20000 may perform a function of preheating the heater 13000, a function of regulating the temperature of the heater 13000, a function of cleaning the space in which a cigarette is inserted, a function of checking whether the cradle 20000 is in an operable state, a function of displaying the remaining power (available power) of the battery 21000 of the cradle 20000, a function of resetting the cradle 20000, etc. However, the functions of the cradle 20000 are not limited to the examples described above.

Figure 19A:
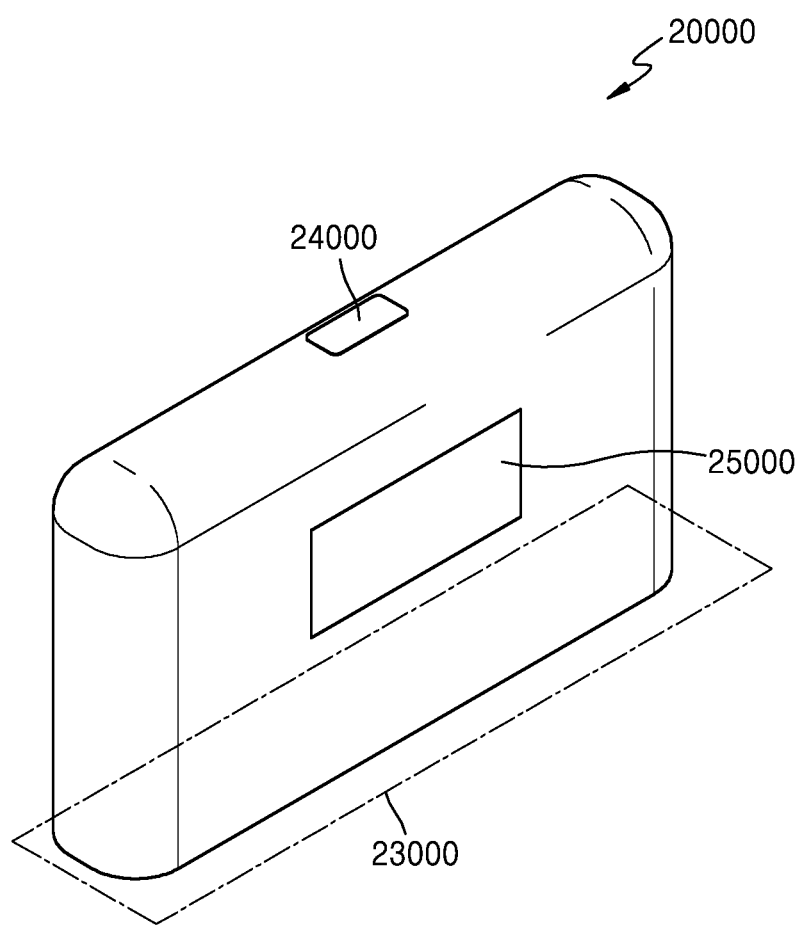
FIGS. 19A and 19B are diagrams showing various views of an example of a cradle.
Figure 19B:
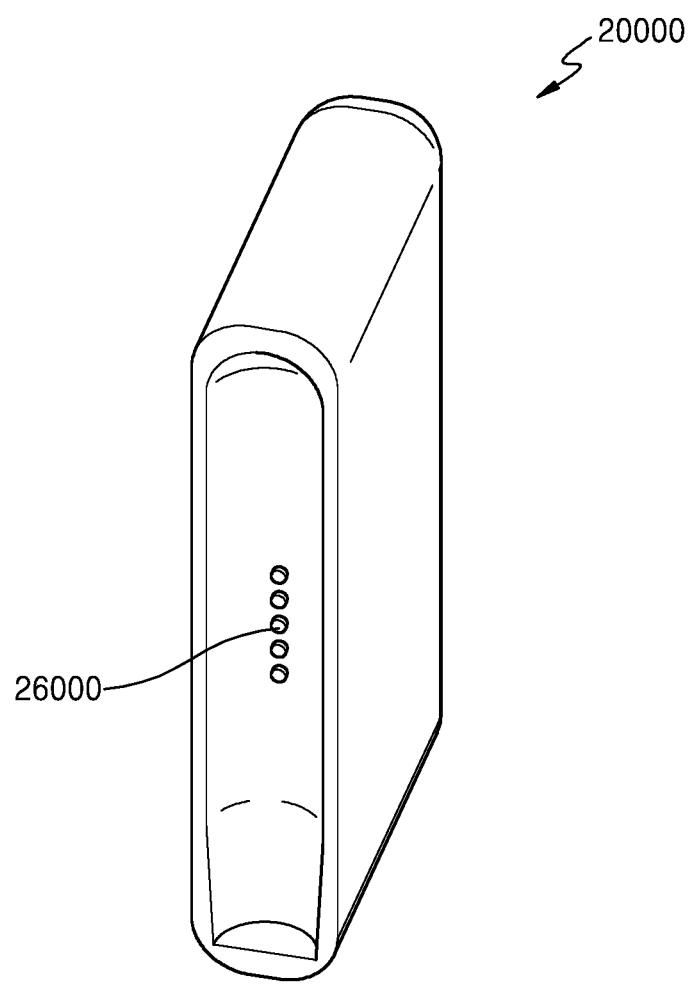

FIGS. 19A and 19B are diagrams showing various views of an example of a cradle.

FIG. 19A is a diagram showing an example of the cradle 20000 viewed in a first direction. The inner space 23000 into which the holder 10000 may be inserted may be formed on one side of the cradle 20000. Also, the holder 10000 may be inserted and fixed in the cradle 20000 even when the cradle 20000 does not include a separate fixing unit like a lid. The cradle 20000 may also include a button 24000 for a user to control the cradle 20000 and a display 25000 for outputting an image.

FIG. 19B is a diagram showing an example of the cradle 20000 viewed in a second direction. The cradle 20000 may include a terminal 26000 to be coupled with the inserted holder 10000. The battery 11000 of the holder 10000 may be charged by power supplied by the battery 21000 of the cradle 20000 as the terminal 26000 is coupled with the terminal 17000 of the holder 10000. Also, the holder 10000 may be operated by power supplied from the battery 21000 of the cradle 20000 through the terminal 17000 and the terminal 26000 and transmission/reception of signals may be performed between the holder 10000 and the cradle 20000 through the terminal 17000 and the terminal 26000. For example, the terminal 26000 may include four micro pins, but the present disclosure is not limited thereto.

The holder 10000 may be inserted into the inner space 23000 of the cradle 20000, as described above with reference to FIGS. 16 to 19B. The holder 10000 may be completely inserted into the cradle 20000 or may be tilted while being inserted into the cradle 20000. Hereinafter, examples in which the holder 10000 is inserted into the cradle 20000 will be described with reference to FIGS. 20 to 22B.

Figure 20:
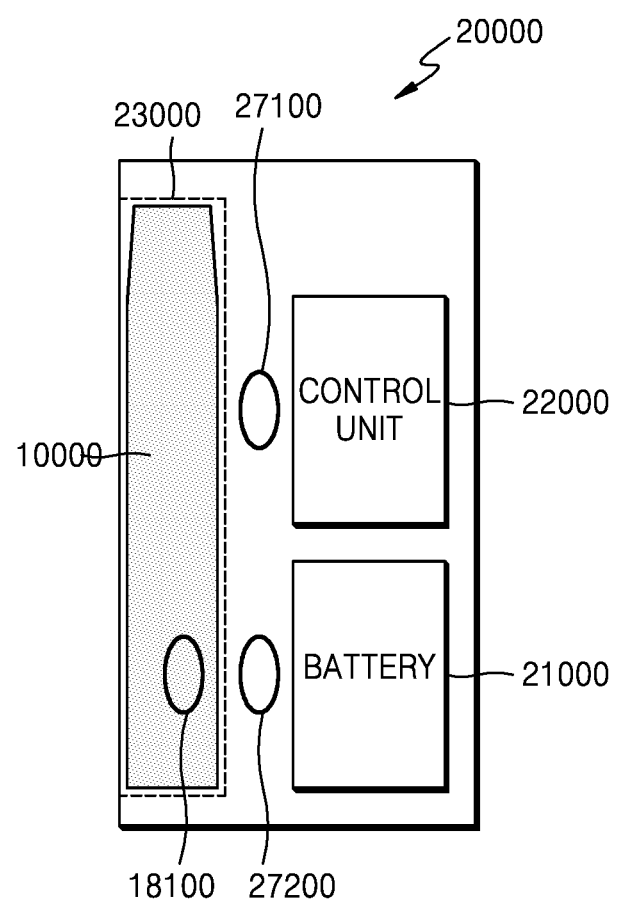
FIG. 20 is a diagram showing an example in which a holder is inserted into a cradle.

FIG. 20 is a diagram showing an example in which a holder is inserted into a cradle.

Referring to FIG. 20, an example in which the holder 10000 is inserted into the cradle 20000 is shown. Since the space 23000 into which the holder 10000 is to be inserted is present on one side surface of the cradle 20000, the inserted holder 10000 may not be exposed to the outside by the other side surfaces of the cradle 20000. Therefore, the cradle 20000 may not include another component (e.g., a lid) for not exposing the holder 10000 to the outside.

The cradle 20000 may include at least one attaching member 27100 and/or 27200 to increase attachment strength with the holder 10000. Also, at least one attaching member 18100 may be included in the holder 10000 as well. Here, attaching members 18100, 27100, and 27200 may be magnets, but are not limited thereto. Although FIG. 20 shows that the holder 10000 includes one attaching member 18100 and the cradle 20000 includes two attaching members 27100 and 27200 for convenience of explanation, the number of the attaching members 18100, 27100, and 27200 is not limited thereto.

The holder 10000 may include the attaching member 18100 at a first position and the cradle 20000 may include the attaching members 27100 and 27200 at a second position and a third position, respectively. In this case, the first position and the third position may be positions facing each other when the holder 10000 is inserted into the cradle 20000.

Since the attaching members 18100, 27100, and 27200 are included in the holder 10000 and the cradle 20000, the holder 10000 and the cradle 20000 may be attached to each other more strongly even when the holder 10000 is inserted into one side surface of the cradle 20000. In other words, as the holder 10000 and the cradle 20000 further include the attaching members 18100, 27100, and 27200 in addition to the terminals 17000 and 26000, the holder 10000 and the cradle 20000 may be attached to each other more strongly. Therefore, even when there is no separate component (e.g., a lid) in the cradle 20000, the inserted holder 10000 may not be easily separated from the cradle 20000.

Also, when the control unit 22000 also determines that the holder 10000 is completely inserted into the cradle 20000 through the terminals 17000 and 26000 and/or the attaching members 18100, 27100, and 27200, the control unit 22000 may charge the battery 11000 of the holder 10000 by using power of the battery 21000.

Figure 21:
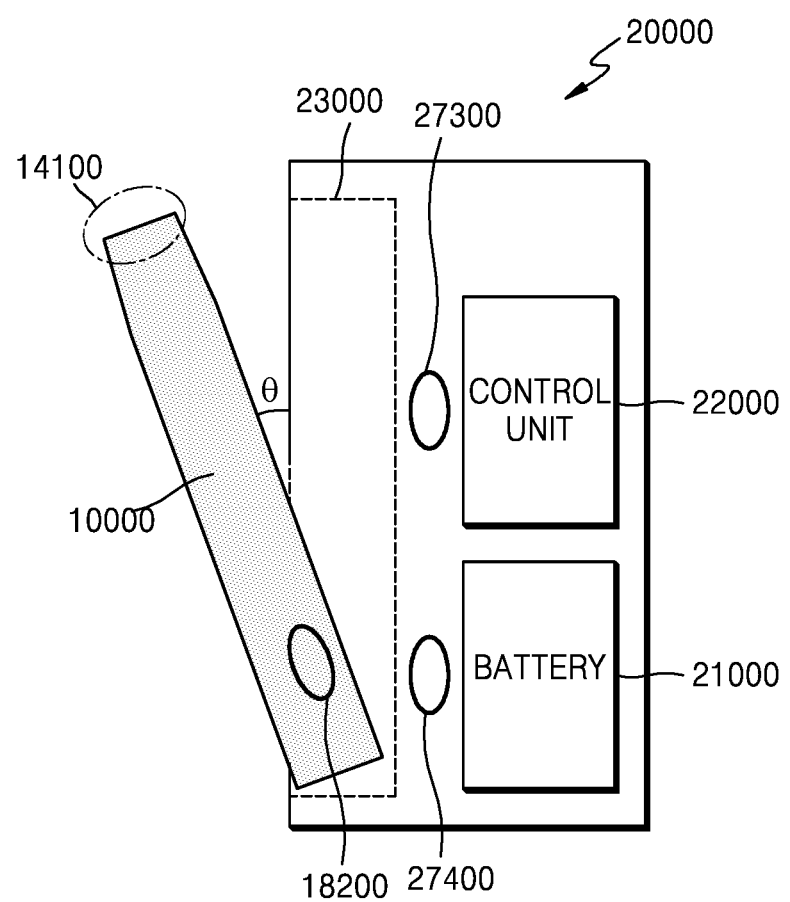
FIG. 21 is a diagram showing an example in which a holder is tilted while being inserted into a cradle.

FIG. 21 is a diagram showing an example in which a holder is tilted while being inserted into a cradle.

Referring to FIG. 21, the holder 10000 is tilted inside the cradle 20000. Here, the term 'tilting' indicates that the holder 10000 is inclined at a certain angle in a state while the holder 10000 is being inserted into the cradle 20000.

As shown in FIG. 20, when the holder 10000 is completely inserted into the cradle 20000, a user may not smoke. In other words, once the holder 10000 is completely inserted into the cradle 20000, a cigarette may not be inserted into the holder 10000. Therefore, when the holder 10000 is completely inserted into the cradle 20000, a user may not smoke.

As shown in FIG. 21, when the holder 10000 is tilted, the terminal end 14100 of the holder 10000 is exposed to the outside. Therefore, the user may insert a cigarette into the terminal end 14100 and smoke generated aerosol. A sufficient tilting angle θ may be secured to prevent a cigarette from being bent or damaged when the cigarette is inserted into the terminal end 14100 of the holder 10000. For example, the holder 10000 may be tilted to the extent that an entire cigarette insertion hole included in the terminal end 141 is exposed to the outside. For example, the range of the tilting angle θ may be greater than 0° and not greater than 180° and may preferably be not less than 10° and not greater than 90°. More preferably, the range of the tilting angle θ may be from 10° to 20°, from 10° to 30°, from 10° to 40°, from 10° to 50°, or from 10° to 60°.

Also, even when the holder 10000 is tilted, the terminal 17000 of the holder 10000 and the terminal 26000 of the cradle 20000 are coupled with each other. Therefore, the heater 13000 of the holder 10000 may be heated by power supplied by the battery 21000 of the cradle 20000. Therefore, the holder 10000 may generate aerosol by using the battery 21000 of the cradle 20000 even when the remaining power of the battery 11000 of the holder 10000 is low or the battery 11000 of the holder 10000 is completely discharged.

FIG. 21 shows an example in which the holder 10000 includes one attaching member 18200 and the cradle 20000 includes two attaching members 27300 and 27400. For example, the respective positions of the attaching members 18200, 27300, and 27400 are as described above with reference to FIG. 20. Assuming that the attaching members 18200, 27300, and 27400 are magnets, the magneting strength of the attaching member 27400 may be greater than the magneting strength of the attaching member 27300. Therefore, the holder 10000 may not be completely separated from the cradle 20000 due to the attaching member 18200 and the attaching member 27400 even when the holder 10000 is tilted.

Also, when it is determined that the holder 10000 titled through the terminals 17000 and 26000 and/or the attaching members 18100, 27100, and 27200, the control unit 22000 may heat the heater 13000 of the holder 10000 or charge the battery 11000 by using power of the battery 21000.

Figure 22A:
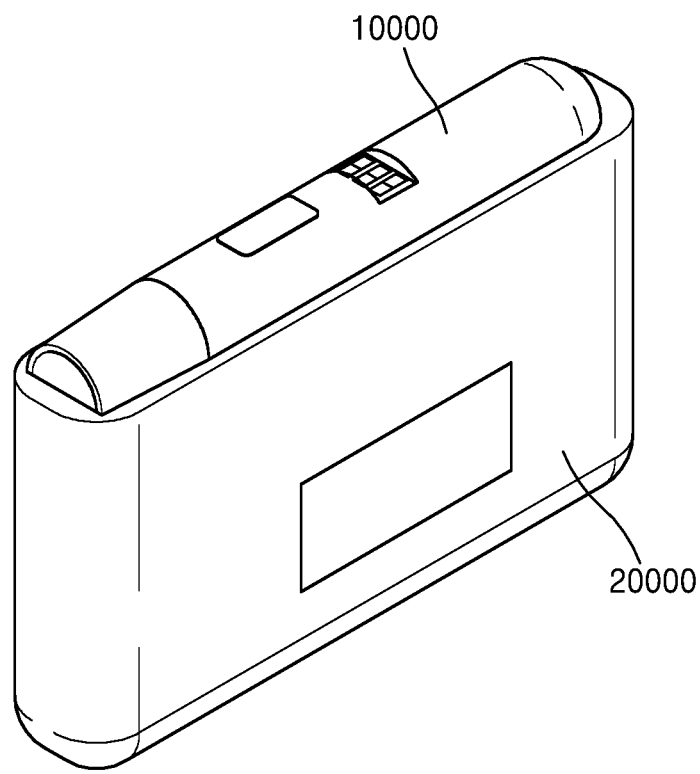
FIGS. 22A and 22B are diagrams showing examples in which a holder is inserted into a cradle.
Figure 22B:
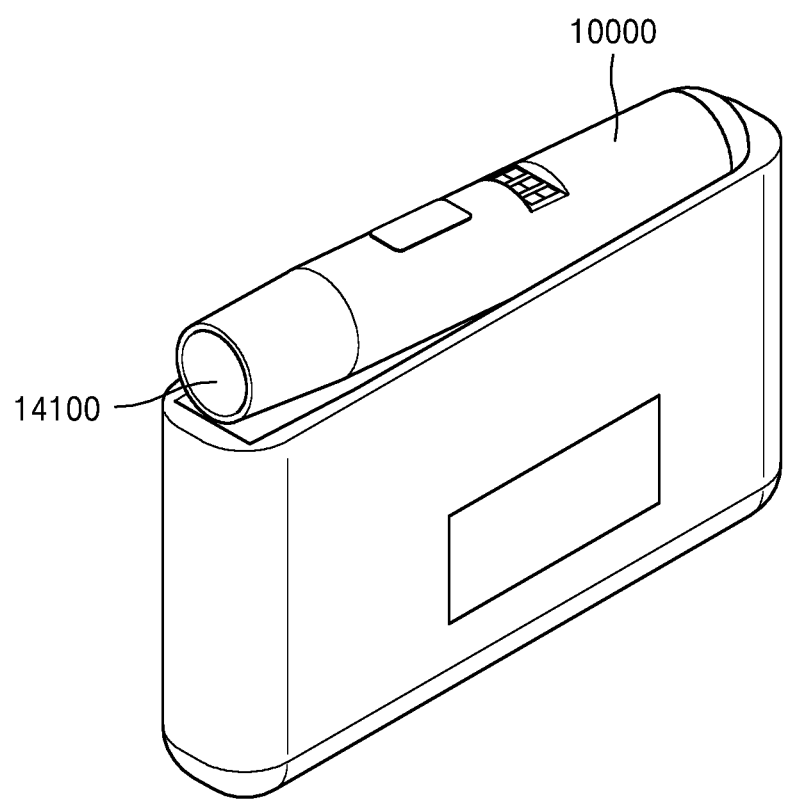

FIGS. 22A and 22B are diagrams showing examples in which a holder is inserted into a cradle.

FIG. 2A shows an example in which the holder 10000 is completely inserted into the cradle 20000. The cradle 20000 may be fabricated to provide the sufficient inner space 23000 of the cradle 20000 to minimize the contact of a user with the holder 10000 when the holder 10000 is completely inserted into the cradle 20000. When the holder 10000 is completely inserted into the cradle 20000, the control unit 22000 supplies power of the battery 21000 to the holder 10000, such that the battery 11000 of the holder 10000 is charged.

FIG. 22B shows an example in which the holder 10000 is tilted while being inserted into the cradle 20000. When the holder 10000 is tilted, the control unit 22000 supplies power of the battery 21000 to the holder 10000, such that the battery 11000 of the holder 10000 is charged or the heater 13000 of the holder 10000 is heated.

Figure 23:
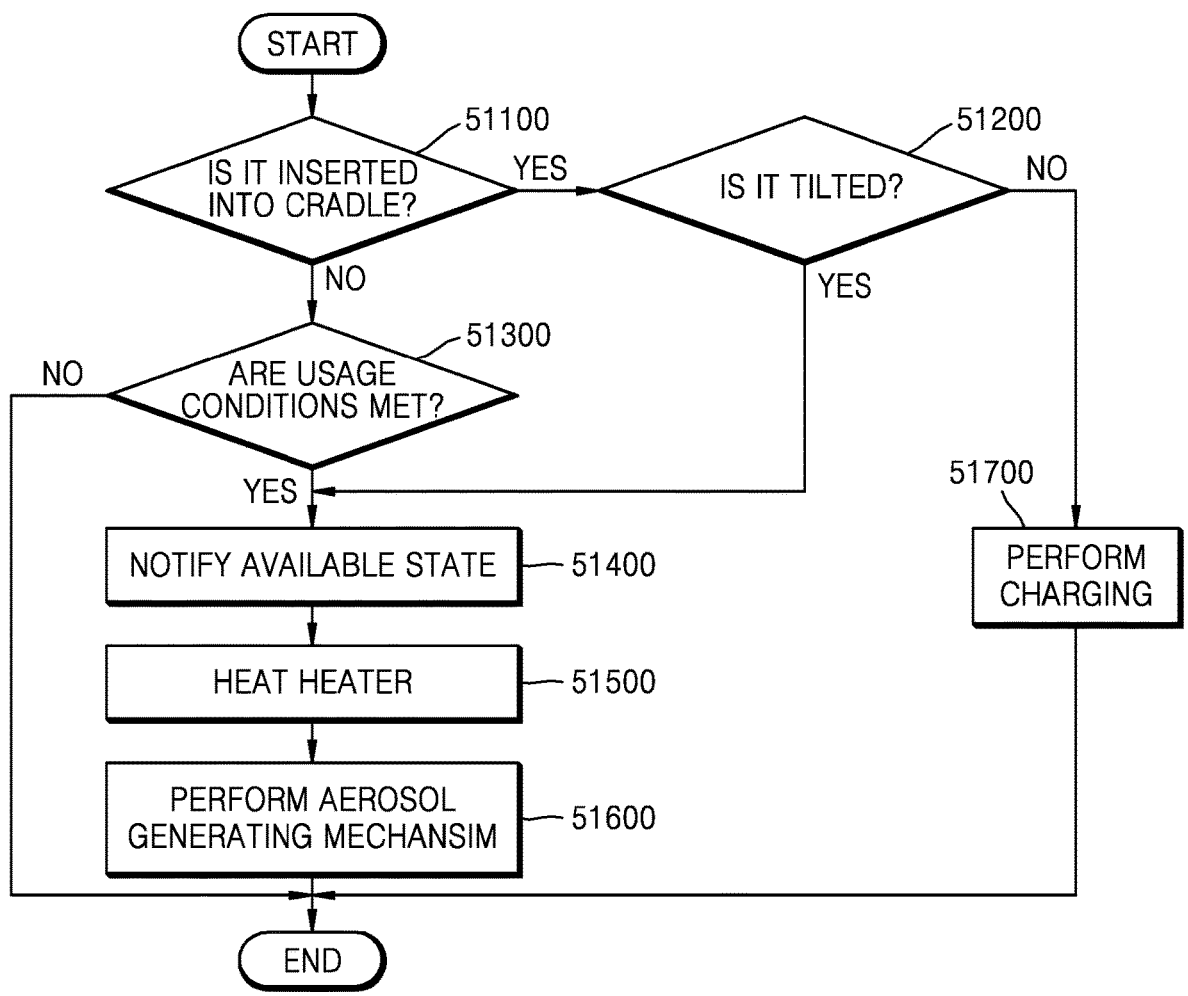
FIG. 23 is a flowchart for describing an example in which a holder and a cradle operates.

FIG. 23 is a flowchart for describing an example in which a holder and a cradle operates.

A method for generating aerosols shown in FIG. 23 includes operations that are performed in a time-series manner by the holder 10000 shown in FIG. 16 or the cradle 20000 shown in FIG. 18. Therefore, it will be understood that the descriptions given above with respect to the holder 10000 shown in FIG. 16 and the cradle 20000 shown in FIG. 18 also apply to the method of FIG. 23, even when the descriptions are omitted below.

In operation 51100, the holder 10000 determines whether it is inserted in the cradle 20000. For example, the control unit 12000 may determine whether the holder 10000 is inserted into the cradle 20000 based on whether the terminals 17000 and 26000 of the holder 10000 and the cradle 20000 are connected to each other and/or whether the attaching members 18100, 27100, and 27200 are operating.

When the holder 10000 is inserted into the cradle 20000, the method proceeds to operation 51200. When the holder 10000 is separated from the cradle 20000, the method proceeds to operation 51300.

In operation 51200, the cradle 20000 determines whether the holder 10000 is tilted. For example, the control unit 22000 may determine whether the holder 10000 is inserted into the cradle 20000 based on whether the terminals 17000 and 26000 of the holder 10000 and the cradle 20000 are connected to each other and/or whether attaching members 18200, 27300, and 27400 are operating.

Although it is described that the cradle 20000 determines whether the holder 10000 is tilted in operation 51200, the present disclosure is not limited thereto. In other words, the control unit 12000 of the holder 10000 may determine whether the holder 10000 is tilted.

When the holder 10000 is tilted, the method proceeds to operation 51400. When the holder 10000 is not tilted (i.e., the holder 10000 is completely inserted into the cradle 200), the method proceeds to operation 51700.

In operation 51300, the holder 10000 determines whether conditions of using the holder 10000 are satisfied. For example, the control unit 12000 may determine whether the conditions for using the holder 10000 are satisfied by checking whether the remaining power of the battery 11000 and whether other components of the holder 10000 may be normally operated.

When the conditions for using the holder 10000 are satisfied, the method proceeds to operation 51400. Otherwise, the method is terminated.

In operation 51400, the holder 10000 informs a user that the holder 10000 is ready to be used. For example, the control unit 12000 may output an image indicating that the holder 10000 is ready to be used on the display of the holder 10000 or may control the motor of the holder 10000 to generate a vibration signal.

In operation 51500, the heater 13000 is heated. For example, when the holder 10000 is separated from the cradle 20000, the heater 13000 may be heated by power of the battery 11000 of the holder 10000. In another example, when the holder 10000 is tilted, the heater 13000 may be heated by power of the battery 21000 of the cradle 20000.

The control unit 12000 of the holder 10000 or the control unit 22000 of the cradle 20000 may check the temperature of the heater 13000 in real time and control an amount of power supplied to the heater 13000 and a time for supplying the power to the heater 13000. For example, the control unit 12000 or 22000 may check the temperature of the heater 13000 in real time through a temperature sensor included in the holder 10000 or an electrically conductive track of the heater 13000.

In operation 51600, the holder 10000 performs an aerosol generation mechanism. For example, the control unit 12000 or 22000 may check the temperature of the heater 13000, which changes as a user performs puffs, and adjust an amount of power supplied to the heater 13000 or stop supplying power to the heater 13000. Also, the control unit 12000 or 22000 may count the number of puffs of the user and output information indicating that the holder 10000 needs to be cleaned when the number of puffs reaches a certain number of times (e.g., 1500).

In operation 51700, the cradle 20000 performs charging of the holder 10000. For example, the control unit 22000 may charge the holder 10000 by supplying power of the battery 21000 of the cradle 20000 to the battery 11000 of the holder 10000.

Meanwhile, the control unit 12000 or 22000 may stop the operation of the holder 10000 according to the number of puffs of the user or the operation time of the holder 10000. Hereinafter, an example in which the control unit 12000 or 22000 stops the operation of the holder 10000 will be described with reference to FIG. 24.

Figure 24:
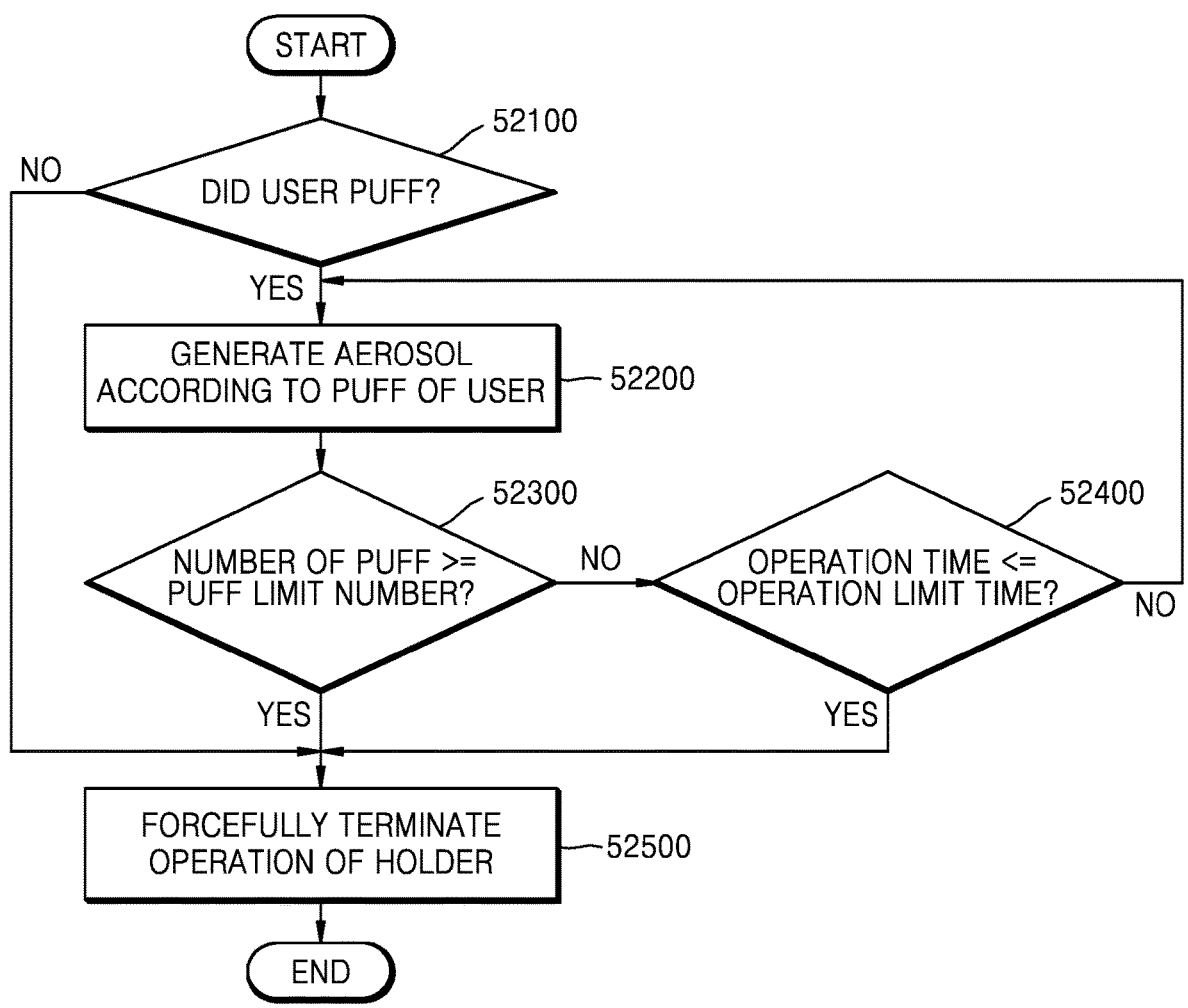
FIG. 24 is a flowchart for describing an example in which a holder operates.

FIG. 24 is a flowchart for describing another example in which a holder operates.

A method for generating aerosols shown in FIG. 24 includes operations that are performed in a time-series manner by the holder 10000 shown in FIG. 16 and the cradle 20000 shown in FIG. 18. Therefore, it will be understood that the descriptions given above with respect to the holder 10000 shown in FIG. 16 or the cradle 20000 shown in FIG. 18 also apply to the method of FIG. 24, even when the descriptions are omitted below.

In operation 52100, the control unit 12000 or 22000 determines whether a user puffed. For example, the control unit 12000 or 22000 may determine whether the user puffed through the puff detecting sensor included in the holder 10000.

In operation 52200, aerosol is generated according to the puff of the user. The control unit 12000 or 22000 may adjust power supplied to the heater 13000 according to the puff of the user the temperature of the heater 13000, as described above with reference to FIG. 23. Also, the control unit 12000 or 22000 counts the number of puffs of the user.

In operation 52300, the control unit 12000 or 22000 determines whether the number of puffs of the user equal to or greater than a puff limit number. For example, assuming that the puff limit number is set to 14, the control unit 12000 or 22000 determines whether the number of counted puffs is 14 or more.

On the other hand, when the number of puffs of the user is close to the puff limit number (e.g., when the number of puffs of the user is 12), the control unit 12000 or 22000 may output a warning signal through a display or a vibration motor.

When the number of puffs of the user is equal to or greater than the puff limit number, the method proceeds to operation 52500. When the number of puffs of the user is less than the puff limit number, the method proceeds to operation 52400.

In operation 52400, the control unit 12000 or 22000 determines whether the operation time of the holder 10000 is equal to or greater than an operation limit time. Here, the operation time of the holder 10000 refers to accumulated time from a time point at which the holder 10000 started its operation to a current time point. For example, assuming that the operation limit time is set to 10 minutes, the control unit 12000 or 22000 determines whether the holder 10000 is operating for 10 minutes or longer.

On the other hand, when the operation time of the holder 10000 is close to the operation limit time (e.g., when the holder 10000 is operating for 8 minutes), the control unit 12000 or 22000 may output a warning signal through a display or a vibration motor.

When the holder 10000 is operating for the operation limit time or longer, the method proceeds to operation 52500. When the operation time of the holder 10000 is less than the operation limit time, the method proceeds to operation 52200.

In operation 52500, the control unit 12000 or 22000 forcefully terminates the operation of the holder 10000. In other words, the control unit 12000 or 22000 terminates the aerosol generation mechanism of the holder 10000. For example, the control unit 12000 or 22000 may forcibly terminate the operation of the holder 10000 by interrupting the power supplied to the heater 13000.

Figure 25:
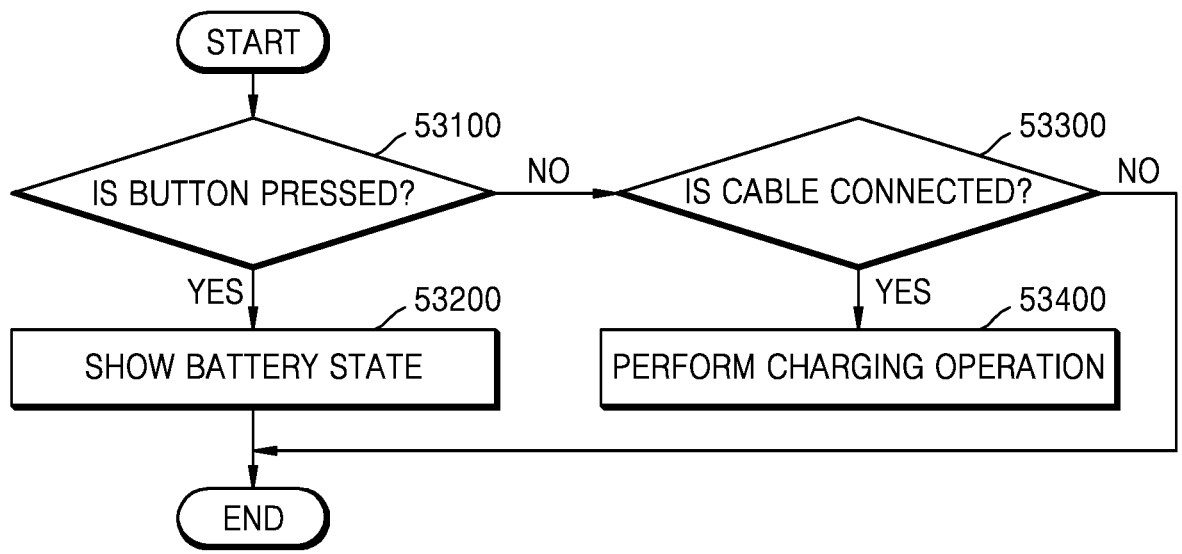
FIG. 25 is a flowchart for describing an example in which a cradle operates.

FIG. 25 is a flowchart for describing an example in which a cradle operates.

The flowchart shown in FIG. 25 includes operations that are performed in a time-series manner by the cradle 20000 shown in FIG. 18. Therefore, it will be understood that the descriptions given above with respect to the cradle 20000 shown in FIG. 18 also apply to the method of FIG. 25, even when the descriptions are omitted below.

Although not shown in FIG. 25, the operation of the cradle 20000 to be described below may be performed regardless of whether the holder 10000 is inserted into the cradle 20000.

In operation 53100, the control unit 22000 of the cradle 20000 determines whether the button 24000 is pressed. When the button 240 is pressed, the method proceeds to operation 53200. When the button 240 is not pressed, the method proceeds to operation 53300.

In operation 53200, the cradle 20000 indicates the status of the battery 21000. For example, the control unit 22000 may output information regarding the current state of the battery 21000 (e.g., remaining power, etc.) on the display 250.

In operation 53300, the control unit 22000 of the cradle 20000 determines whether a cable is connected to the cradle 20000. For example, the control unit 22000 determines whether a cable is connected to an interface (e.g., a USB port, etc.) included in the cradle 20000. When a cable is connected to the cradle 20000, the method proceeds to operation 53400. Otherwise, the method is terminated.

In operation 53400, the cradle 20000 performs a charging operation. For example, the cradle 20000 charges the battery 21000 by using power supplied through a connected cable.

As described above with reference to FIG. 16, a cigarette may be inserted into the holder 10000. The cigarette includes an aerosol generating material and aerosol is generated by the heated heater 13000.

Hereinafter, an example of a cigarette that may be inserted into the holder 10000 will be described with reference to FIGS. 26 to 28F.

Figure 26:
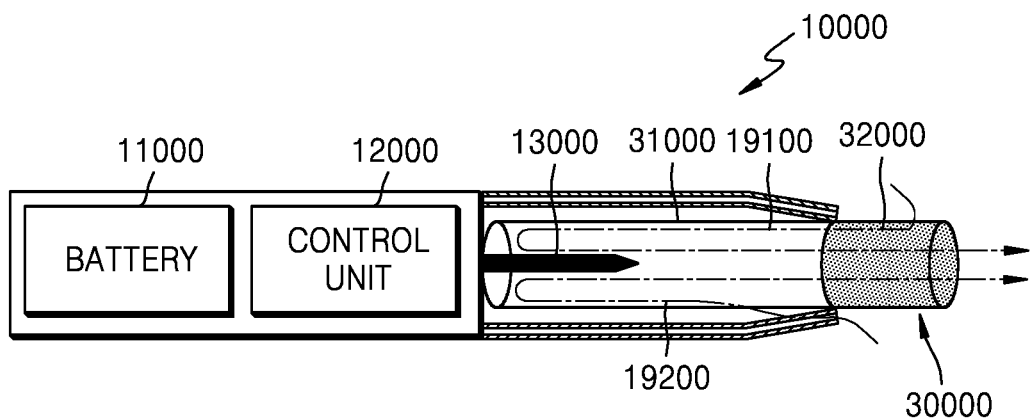
FIG. 26 is a diagram showing an example in which a cigarette is inserted into a holder.

FIG. 26 is a diagram showing an example in which a cigarette is inserted into a holder.

Referring to FIG. 26, the cigarette 30000 may be inserted into the holder 10000 through the terminal end 14100 of the casing 14000. When the cigarette 30000 is inserted into the holder 10000, the heater 13000 is located inside the cigarette 30000. Therefore, the heated heater 13000 heats the aerosol generating material of the cigarette 30000, thereby generating aerosol.

The cigarette 30000 may be similar to a typical burning cigarette. For example, the cigarette 30000 may include a first portion 31000 containing an aerosol generating material and a second portion 32000 including a filter and the like. Meanwhile, the cigarette 30000 according to one embodiment may also include an aerosol generating material in the second portion 32000. For example, an aerosol generating material in the form of granules or capsules may be inserted into the second portion 32000.

The entire first portion 31000 may be inserted into the holder 10000 and the second portion 32000 may be exposed to the outside. Alternatively, only a portion of the first portion 31000 may be inserted into the holder 10000 or the entire first portion 31000 and a portion the second portion 32000 may be inserted into the holder 10000.

A user may inhale the aerosol while holding the second portion 32000 by his/her lips. At this time, the aerosol is mixed with the outside air and delivered to the user's mouth. As shown in FIG. 26, the outside air may be introduced 19100 through at least one hole formed in the surface of the cigarette 30000 or introduced 19200 through at least one air passage formed in the holder 10000. For example, the air passage formed in the holder 10000 may be formed to be opened and closed by a user.

Figure 27A:
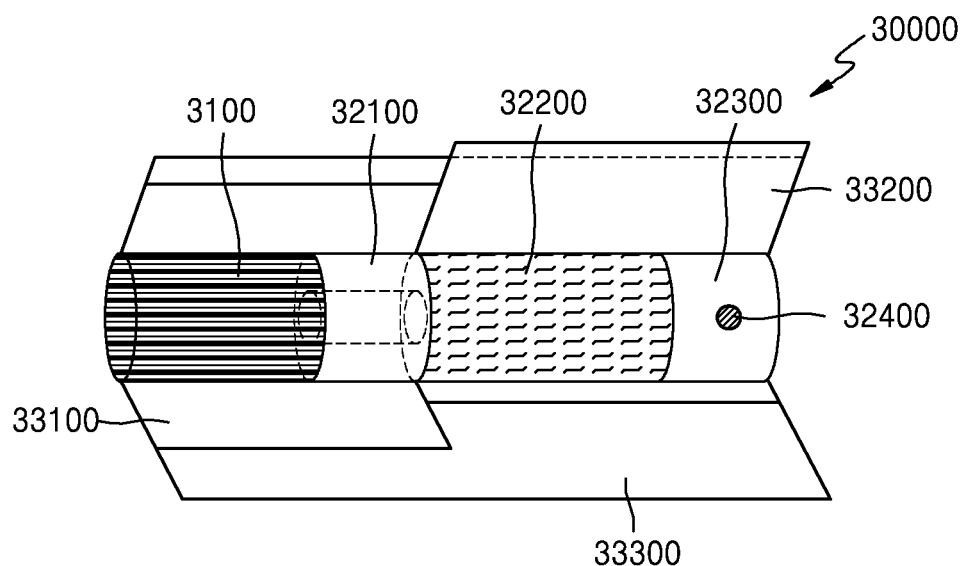
FIGS. 27A and 27B are block diagrams showing examples of a cigarette.
Figure 27B:
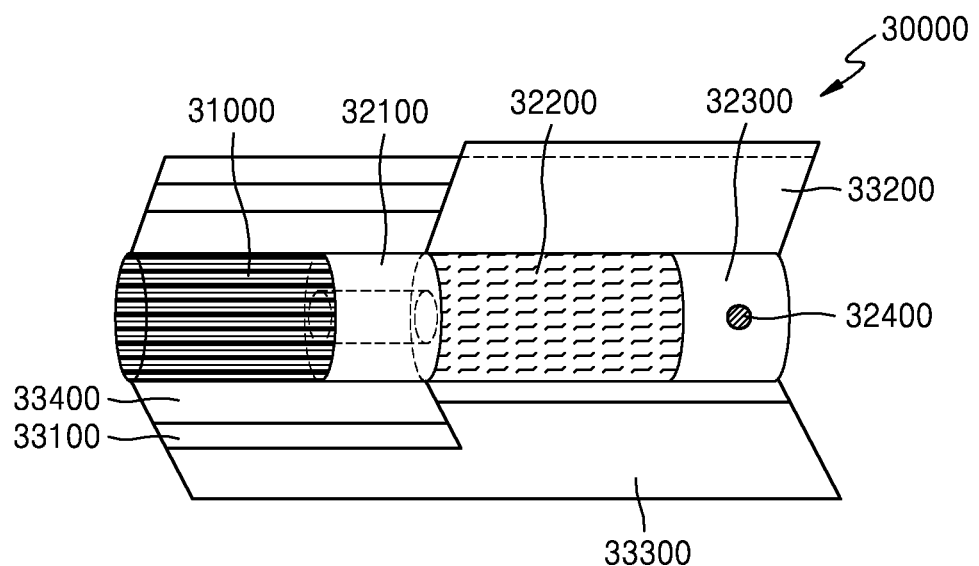

FIGS. 27A and 27B are block diagrams showing examples of a cigarette.

Referring to FIGS. 27A and 27B, the cigarette 30000 includes a tobacco rod 31000, a first filter segment 32100, a cooling structure 32200, and a second filter segment 32300. The first portion 31000 described above with reference to FIG. 26 includes the tobacco rod 31000 and the second portion 32000 includes the first filter segment 32100, the cooling structure 32200, and the second filter segment 32300.

Meanwhile, comparing FIGS. 27A and 27B, the cigarette 30000 of FIG. 27B further includes a fourth wrapper 33400 as compared to the cigarette 30000 of FIG. 27A.

However, the structures of the cigarette 30000 shown in FIGS. 27A and 27B are merely examples, and some of the components may be omitted. For example, the cigarette 30000 may not include one or more of the first filter segment 32100, the cooling structure 32200, and the second filter segment 32300.

The tobacco rod 31000 includes an aerosol generating material. For example, the aerosol generating material may include at least one of glycerine, propylene glycol, ethylene glycol, dipropylene glycol, diethylene glycol, triethylene glycol, tetraethylene glycol, and oleyl alcohol. The length of the tobacco rod 31000 may be from about 7 mm to about 15 mm or may preferably be about 12 mm. Alternatively, the length of the tobacco rod 31000 may be from about 7 mm to about 9 mm or may preferably be about 7.9 mm. The length and diameter of the tobacco rod 31000 are not limited to the numerical ranges described above.

In addition, the tobacco rod 31000 may include other additive materials like a flavoring agent, a wetting agent, and/or an acetate compound. For example, the flavouring agent may include licorice, sucrose, fructose syrup, iso-sweet, cocoa, lavender, cinnamon, cardamom, celery, fenugreek, cascara, sandalwood, bergamot, geranium, honey essence, rose oil, vanilla, lemon oil, orange oil, mint oil, cinnamon, keragene, cognac, jasmine, chamomile, menthol, cinnamon, ylang ylang, salvia, spearmint, ginger, coriander, coffee, etc. In addition, the wetting agent may include glycerine or propylene glycol.

For example, the tobacco rod 31000 may be filled with cut tobacco leaves. Here, cut tobacco leaves may be formed by pulverizing a tobacco sheet.

For a large wide tobacco sheet to be filled within the tobacco rod 31000 having a narrow space, an operation for facilitating folding of the tobacco sheet is further needed. Therefore, it is easier to fill the tobacco rod 31000 with cut tobacco leaves compared to filling the tobacco rod 31000 with a tobacco sheet, and thus the productivity and the efficiency of the process for producing the tobacco rod 31000 may be improved.

In another example, the tobacco rod 31000 may be filled with a plurality of cigarette strands formed bu fine-cutting a tobacco sheet. For example, the tobacco rod 31000 may be formed by combining a plurality of tobacco strands in the same direction (parallel to one another) or randomly. One tobacco strand may be fabricated to have a cuboidal shape having the horizontal length of 1 mm, the vertical length of 12 mm, and the thickness (height) of 0.1 mm, but the present disclosure is not limited thereto.

Compared to the tobacco rod 31000 filled with a cigarette sheet, the tobacco rod 31000 filled with tobacco strands may generate a greater amount of aerosol. In the case of filling the same space, compared to a tobacco sheet, tobacco strands ensure a wider surface area. A wider surface area indicates that an aerosol generating material has a greater chance of contacting the outside air. Therefore, when the tobacco rod 31000 is filled with tobacco strands, more aerosol may be generated as compared to the tobacco rod 31000 filled with a tobacco sheet.

Furthermore, when the cigarette 30000 is separated from the holder 10000, the tobacco rod 31000 filled with tobacco strands may be separated more easily than the tobacco rod 31000 filled with a tobacco sheet. Compared to a tobacco sheet, tobacco strands generate less frictional force in contact with the heater 13000. Therefore, when the tobacco rod 31000 is filled with tobacco strands, the tobacco rod 31000 may be more easily separated from the holder 10000 than the tobacco sheet 31000 filled with a tobacco sheet.

A tobacco sheet may be formed by pulverizing a tobacco raw material into the form of slurry and drying the slurry. For example, from 15% to 30% of an aerosol generating material may be added to the slurry. The raw tobacco material may be tobacco leaf fragments, tobacco stems, fine tobacco powders formed during treatment of tobacco, and/or major leaf fragment strips of tobacco leaves. The tobacco sheet may also include other additives like wood cellulose fibers.

The first filter segment 32100 may be a cellulose acetate filter. For example, the first filter segment 32100 may have a tubular structure including a hollowness therein. The length of the first filter segment 32100 may be from about 7 mm to about 15 mm or may preferably be about 7 mm. The length of the first filter segment 32100 may be smaller than about 7 mm, but may have a length sufficient to not to compromise the function of at least one cigarette element (e.g., a cooling element, a capsule, an acetate filter, etc.). The length of the first filter segment 32100 is not limited to the numerical range described above. Meanwhile, the length of the first filter segment 32100 may be extended, and the length of the entire cigarette 30000 may be adjusted according to the length of the first filter segment 32100.

The second filter segment 32300 may also be a cellulose acetate filter. For example, the second filter segment 323 may be fabricated as a recess filter including a hollowness therein, but is not limited thereto. The length of the second filter segment 32100 may be from about 5 mm to about 15 mm or may preferably be about 12 mm. The length of the second filter segment 32300 is not limited to the numerical range described above.

Also, the second filter segment 32300 may include at least one capsule 32400. Here, the capsule 32400 may have a structure in which a content liquid containing a flavoring material is wrapped with a film. For example, the capsule 32400 may have a spherical or cylindrical shape. The diameter of the capsule 32400 may be about 2 mm or greater or may preferably be from about 2 mm to about 4 mm.

The material constituting the film of the capsule 32400 may be a starch and/or a gelling agent. For example, gelling gum or gelatin may be used as the gelling agent. Furthermore, a gelling agent may be further used as a material for forming the film of the capsule 32400. Here, as the gelling agent, for example, a calcium chloride group may be used. Furthermore, a plasticizer may be further used as a material for forming the film of the capsule 32400. As the plasticizer, glycerine and/or sorbitol may be used. Furthermore, a coloring agent may be further used as a material for forming the film of the capsule 32400.

For example, as a flavouring material included in the content liquid of the capsule 324, menthol, plant essential oil, and the like may be used. As a solvent of the flavouring material included in the content liquid, for example, a medium chain fatty acid triglyceride (MCT) may be used. Also, the content liquid may include other additives like a figment, an emulsifying agent, a thickening agent, etc.

The cooling structure 32200 cools aerosol generated as the heater 13000 heats the tobacco rod 31000. Therefore, a user may inhale aerosol cooled to a suitable temperature. The length of the cooling structure 32200 may be from about 10 mm to about 20 mm or may preferably be about 14 mm. The length of the cooling structure 32200 is not limited to the numerical range described above.

For example, the cooling structure 32200 may be formed of polylactic acid. The cooling structure 32200 may be fabricated in various forms to increase the surface area per unit area (that is, a surface area in which the cooling structure 32200 contacts the aerosol). Various examples of the cooling structure 32200 are described below with reference to FIGS. 28A to 28F.

The tobacco rod 31000 and the first filter segment 32100 may be wrapped by a first wrapper 33100. For example, the first wrapper 33100 may be made of a paper packaging material having oil resistance.

The cooling structure 32200 and the second filter segment 32300 may be wrapped by a second wrapper 33200. In addition, the entire cigarette 30000 may be repackaged by a third wrapper 33300. For example, the second wrapper 33200 and the third wrapper 33300 may be made of a general paper wrapping material. Optionally, the second wrapper 33200 may be an oil resistant hard wrap or a PLA fragrance-added paper. Also, the second wrapper 33200 may wrap a portion of the second filter segment 32300, and may further wrap the second filter segment 32300 and the cooling structure 32200.

Referring to FIG. 27B, the cigarette 30000 may include a fourth wrapper 33400. At least one of the tobacco rod 31000 and the first filter segment 32100 may be wrapped by the fourth wrapper 33400. In other words, only the tobacco rod 31000 may be wrapped by the fourth wrapper 33400, or the tobacco rod 31000 and the first filter segment 32100 may be wrapped by the fourth wrapper 33400. For example, the fourth wrapper 33400 may be made of a paper packaging material.

The fourth wrapper 33400 may be formed by applying (or coating) a predetermined material to one or both surfaces of a paper packaging material. Here, an example of the predetermined material may be, but is not limited to, silicon. Silicon exhibits characteristics like heat resistance with little change due to the temperature, oxidation resistance, resistances to various chemicals, water repellency, electrical insulation, etc. However, any material having the above-described characteristics other than silicon may be applied (or coated) to the fourth wrapper 33400 without limitation.

Meanwhile, although FIG. 27B shows that the cigarette 30000 includes both the first wrapper 33100 and the fourth wrapper 33400, but the present disclosure is not limited thereto. In other words, the cigarette 30000 may include only one of the first wrapper 33100 and the fourth wrapper 33400.

The fourth wrapper 33400 may prevent the cigarette 30000 from burning. For example, when the tobacco rod 31000 is heated by the heater 13000, there is a possibility that the cigarette 30000 is burned. In detail, when the temperature is raised to a temperature above the ignition point of any one of materials included in the tobacco rod 31000, the cigarette 30000 may be burned. Even in this case, since the fourth wrapper 33400 includes a non-combustible material, the cigarette 30000 may be prevented from burning.

Also, the fourth wrapper 33400 may prevent the holder 10000 from being contaminated by materials generated by the cigarette 30000. Through puffs of a user, liquid substances may be formed in the cigarette 30000. For example, as the aerosol formed by the cigarette 30000 is cooled by the outside air, liquid materials (e.g., moisture, etc.) may be formed. As the fourth wrapper 33400 packs the tobacco rod 31000 and/or the first filter segment 32100, liquid substances produced in the cigarette 30000 may be prevented from being leaked out of the cigarette 30000. Accordingly, the casing 14000 of the holder 10000 and the like may be prevented from being contaminated by the liquid materials formed by the cigarette 30000.

FIGS. 28A to 28F are diagrams showing examples of a cooling structure of a cigarette.

For example, the cooling structures shown in FIGS. 28A-28F may be fabricated by using fibers made of pure polylactic acid (PLA).

For example, when a cooling structure is manufactured by filling a film (sheet), the film (sheet) may be broken by an external impact. In this case, the aerosol cooling effect of the cooling structure is deteriorated.

In another example, when a cooling structure is manufactured through extrusion molding or the like, the efficiency of the process is lowered due to the addition of operations like cutting of a structure. Also, there are limits in manufacturing a cooling structure in various shapes.

As the cooling structure according to an embodiment is fabricated by using polylactic acid fibers (e.g., weaving), the risk of the cooling structure being deformed or losing function by an external impact may be reduced. Also, by changing the way of combining fibers, the cooling structure having various shapes may be fabricated.

Furthermore, by fabricating the cooling structure by using fibers, the surface area contacting with aerosol is increased. Therefore, the aerosol cooling effect of the cooling structure may be further improved.

Figure 28A:
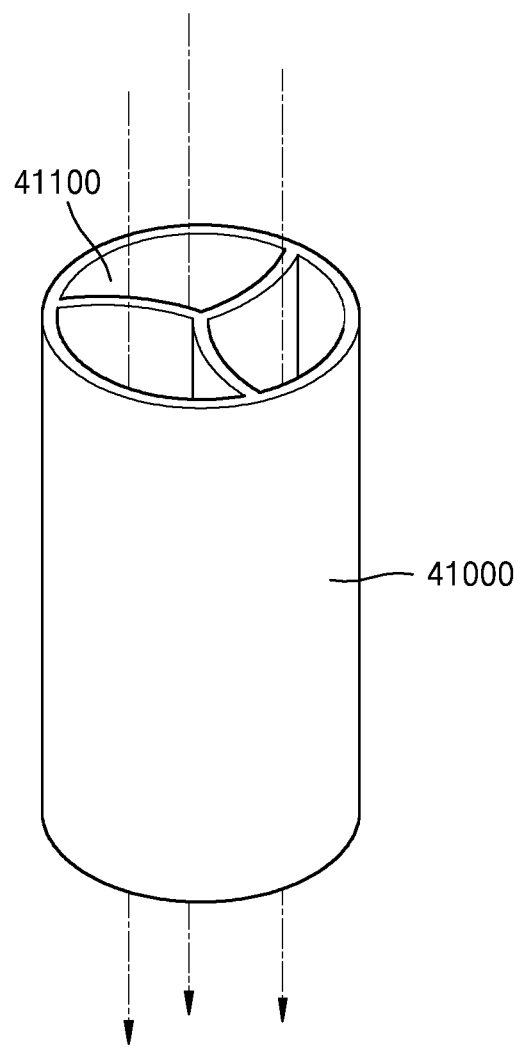
FIGS. 28A to 28F are diagrams showing examples of a cooling structure of a cigarette.

Referring to FIG. 28A, the cooling structure 41000 may be formed to have a cylindrical shape, and at least one air passage 41100 may be formed in a cross-section of the cooling structure 41000.

Figure 28B:
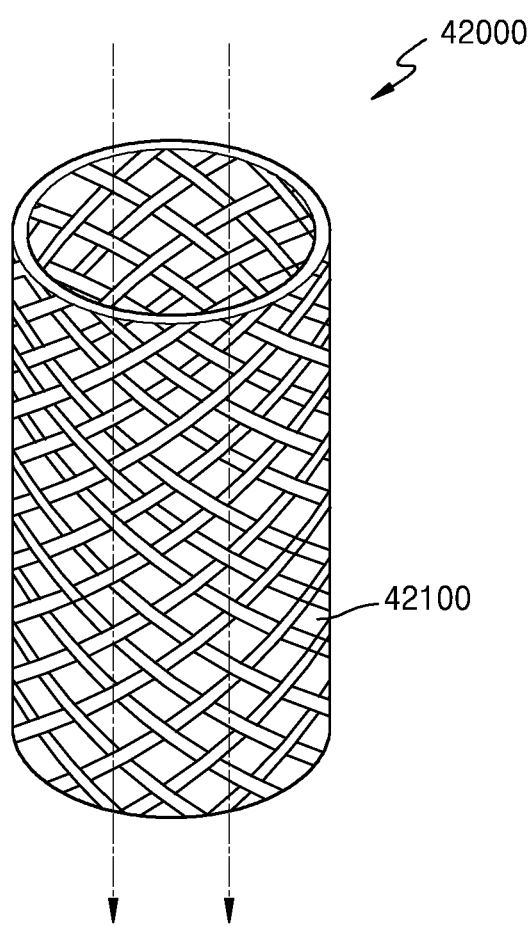

Referring to FIG. 28B, the cooling structure 42000 may be manufactured as a structure in which a plurality of fibers are entangled with one another. At this time, the aerosol may flow between the fibers, and a vortex may be formed according to the shape of the cooling structure 42000. The vortex expands an area of contact of the aerosol in the cooling structure 42000 and increases the time that the aerosol stays in the cooling structure 42000. Therefore, heated aerosol may be effectively cooled.

Figure 28C:
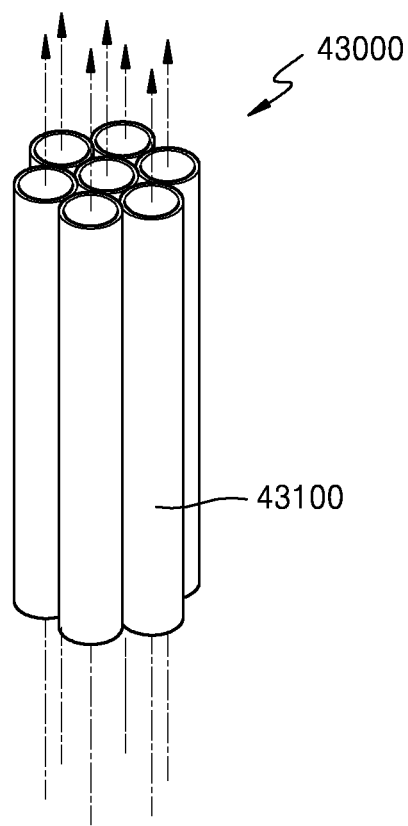

Referring to FIG. 28C, the cooling structure 43000 may be manufactured in the form of a plurality of bundles 43100.

Figure 28D:
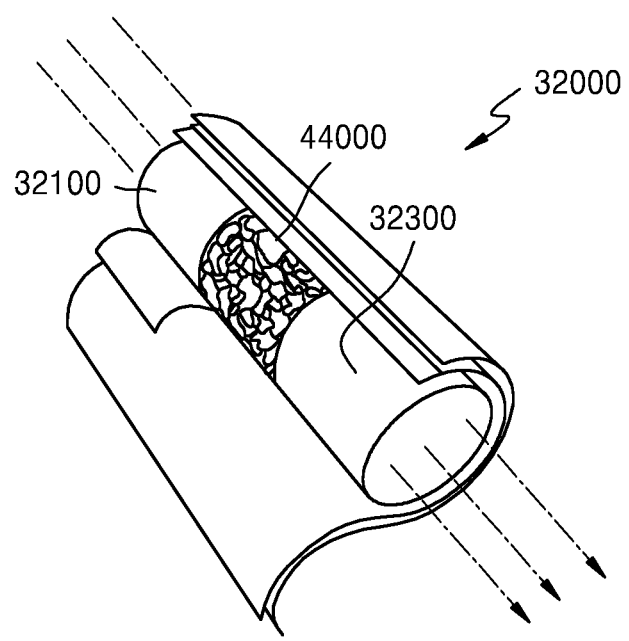

Referring to FIG. 28D, a cooling structure 44000 may be filled with granules formed of polylactic acid, cut leaves, or charcoal. Also, the granules may be fabricated by using a mixture of polylactic acid, cut leaves, and charcoal. On the other hand, the granules may further include an element capable of increasing the aerosol cooling effect other than polylactic acid, the cut leaves, and/or charcoal.

Figure 28E:
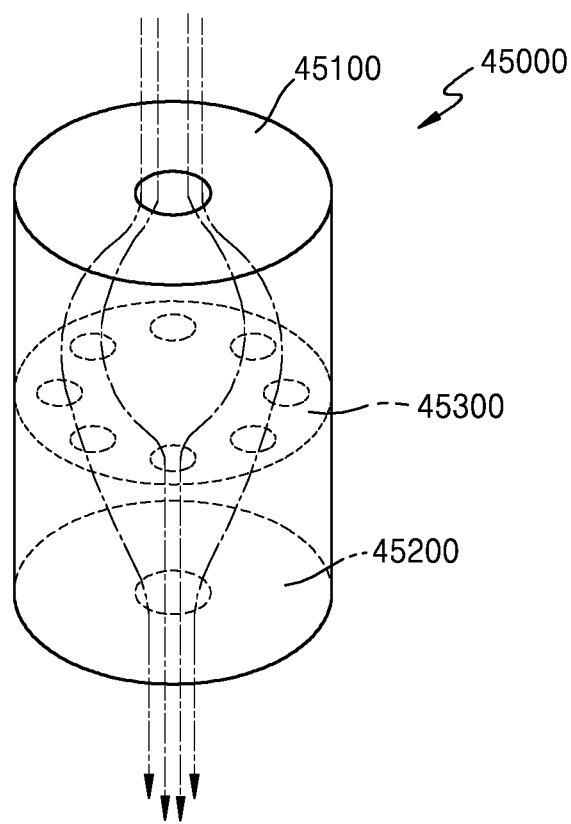

Referring to FIG. 28E, a cooling structure 45000 may include a first cross-section 45100 and a second cross-section 45200.

The first cross-section 45100 borders the first filter segment 32100 and may include gaps into which an aerosol may be introduced. The second cross-section 45200 borders the second filter segment 32300 and may include gaps through which an aerosol may be discharged. For example, each of the first cross-section 45100 and the second cross-section 45200 may include a single gap having the same diameter, but the diameters and the numbers of the gaps included in the first cross-section 45100 and the second cross-section 45200 are not limited thereto.

In addition, the cooling structure 45000 may include a third cross-section 45300 between the first cross-section 45100 and the second cross-section 45200, the third cross-section 45300 including a plurality of gaps. For example, the diameters of the plurality of gaps included in the third cross-section 45300 may be smaller than the diameters of the gaps included in the first cross-section 45100 and the second cross-section 45200. Also, the number of gaps included in the third cross-section 45300 may be greater than the number of gaps included in the first cross-section 45100 and the second cross-section 45200.

Figure 28F:
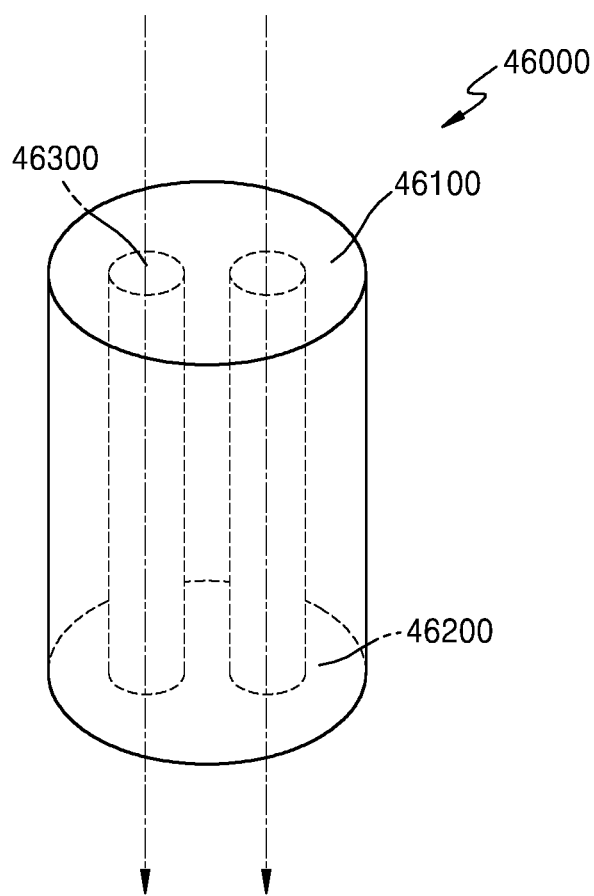

Referring to FIG. 28F, a cooling structure 46000 may include a first cross-section 46100 that borders on the first filter segment 32100 and a second cross-section 46200 that borders on the second filter segment 32300. Also, the cooling structure 46000 may include one or more tubular element 46300. For example, the tubular element 46300 may penetrate through the first cross-section 46100 and the second cross-section 46200. Also, the tubular element 46300 may be packaged with a microporous packaging material and filled with a filler material (e.g., the granules described above with reference to FIG. 28D) that may increase the aerosol cooling effect.

As described above, a holder may generate aerosol by heating a cigarette. Also, aerosol may be generated independently by the holder or even when the holder is inserted into a cradle and is tilted. Particularly, when the holder is tilted, a heater may be heated by power of a battery of the cradle.

While the present disclosure has been described with reference to exemplary embodiments, it is to be understood that the present disclosure is not limited to the disclosed example embodiments, but, on the contrary, is intended to cover various modifications and equivalent arrangements included within the spirit and scope of the appended claims. Accordingly, the true scope of protection of the present disclosure should be determined by the technical idea of the appended claims.

Specific implementations described in the embodiments are examples, and do not limit the scope of the embodiments in any way. Moreover, no item or component is essential to the practice of the present disclosure unless the element is specifically described as "essential" or "critical".

The use of the terms "a" and "an" and "the" and similar referents in the context of describing the present disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present disclosure is not limited to the described order of the steps. The use of any and all examples, or exemplary language (e.g., "such as") provided herein, is intended merely to better illuminate the present disclosure and does not pose a limitation on the scope of the present disclosure unless otherwise claimed. Numerous modifications and adaptations will be readily apparent to one of ordinary skill in the art without departing from the spirit and scope of the present disclosure.

The embodiments of the present disclosure may be written as computer programs and can be implemented in general-use digital computers that execute the programs using a computer readable recording medium. In addition, the structure of the data used in the above-described method may be recorded on a computer-readable recording medium through various means. Examples of the computer readable recording medium include magnetic storage media (e.g., ROM, RAM, USB drives, floppy disks, hard disks, etc.), optical recording media (e.g., CD-ROMs, or DVDs), etc.

What is claimed is:

1. A smoking member supporting device, comprising:
a base unit comprising an arrangement surface;
an accommodating unit formed adjacent to the base unit and configured to accommodate a smoking member;
a hook unit formed at an edge of the accommodating unit and configured to keep the smoking member accommodated in the accommodating unit; and
a connecting unit configured to supply power to the smoking member when the smoking member is accommodated in the accommodating unit, wherein the smoking member supporting device controls the smoking member to start pre-heating in response to the smoking member being accommodated in the accommodating unit.

2. The smoking member supporting device of claim 1, wherein the connecting unit is formed on a surface of the accommodating unit.

3. The smoking member supporting device of claim 1, wherein power is supplied from an external power source to the smoking member through the connecting unit.

4. The smoking member supporting device of claim 1, wherein the connecting unit is configured to provide the smoking member with power for heating a smoking material.

5. The smoking member supporting device of claim 1, wherein
the smoking member comprises a heater for heating a smoking material when a user smokes, and
the connecting unit is configured to perform a pre-heating operation for the heater.

6. A smoking member supporting device, comprising:
a base unit comprising an arrangement surface;
an accommodating unit formed adjacent to the base unit and configured to accommodate a smoking member;
a hook unit formed at an edge of the accommodating unit and configured to keep the smoking member accommodated in the accommodating unit;
a connecting unit configured to supply power to the smoking member when the smoking member is accommodated in the accommodating unit; and
a cleaning unit configured to clean the smoking member when the smoking member is accommodated in the accommodating unit.

7. The smoking member supporting device of claim 6, wherein the cleaning unit is formed to correspond to the accommodating unit.

8. The smoking member supporting device of claim 6, wherein the cleaning unit has a brush-like shape comprising a plurality of fiber strands.

9. The smoking member supporting device of claim 6, further comprising a cleaning driving unit configured to move the cleaning unit to clean the smoking member.

10. The smoking member supporting device of claim 1, further comprising:
a supporting unit connected to the base unit and protruding in a lengthwise direction of the smoking member when the smoking member is accommodated.

11. The smoking member supporting device of claim 10, wherein the connecting unit is formed on a surface of the accommodating unit.

12. A smoking member system comprising:
a smoking member comprising:
a main body;
an insertion groove formed at one end of the main body; and
a heater member disposed in the insertion groove; and
a smoking member supporting device comprising:
a base unit comprising an arrangement surface;
an accommodating unit formed adjacent to the base unit and configured to accommodate the smoking member;
a hook unit formed at an edge of the accommodating unit and configured to keep the smoking member accommodated in the accommodating unit; and
a connecting unit configured to supply power to the smoking member when the smoking member is accommodated in the accommodating unit.

13. The smoking member system of claim 12, wherein the smoking member supporting device further comprises a cleaning unit formed in the accommodating unit of the smoking member supporting device,
wherein the smoking member is accommodated in the accommodating unit such that the cleaning unit corresponds to the insertion groove of the smoking member when the smoking member is mounted on the smoking member supporting device.

\* \* \* \* \*